(12) United States Patent
Mühlebach et al.

(10) Patent No.: US 6,323,295 B1
(45) Date of Patent: *Nov. 27, 2001

(54) POLYMERIZABLE COMPOSITION, PROCESS FOR PRODUCING CROSS-LINKED POLYMERS AND CROSSLINKABLE POLYMERS

(75) Inventors: Andreas Mühlebach, Belfaux; Andreas Hafner, Laupen; Paul Adriaan Van Der Schaaf, Fribourg, all of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/875,906

(22) PCT Filed: Jan. 29, 1996

(86) PCT No.: PCT/EP96/00344

§ 371 Date: Aug. 6, 1997

§ 102(e) Date: Aug. 6, 1997

(87) PCT Pub. No.: WO96/24629

PCT Pub. Date: Aug. 15, 1996

(30) Foreign Application Priority Data

Feb. 9, 1995 (CH) .................................................. 405/95

(51) Int. Cl.$^7$ ................... C08F 4/80; C08F 4/06

(52) U.S. Cl. .................. 526/171; 526/172; 526/260; 526/280; 526/283

(58) Field of Search ................... 525/100, 102, 525/245, 283, 289, 195, 255, 268; 526/113, 117, 120, 123, 280, 281, 171, 172, 260, 283

(56) References Cited

FOREIGN PATENT DOCUMENTS

| 0467115 | 1/1992 | (EP) . |
| 93/13171 | * 7/1993 | (WO) . |
| 95/07310 | * 3/1995 | (WO) . |

OTHER PUBLICATIONS

Macromolecular Chemistry and Physics, vol. 195, Aug. 1994, pp. 2875–2885.

* cited by examiner

*Primary Examiner*—Margaret Einsmann
(74) *Attorney, Agent, or Firm*—Kevin T. Mansfield; Luther A. R. Hall

(57) ABSTRACT

Composition comprising (a) catalytic amounts of a one-component catalyst for metathesis polymerization and (b) at least one polymer with strained cycloalkenylene radicals bonded to the polymer backbone via a divalent bridge group, alone or as a mixture with strained cycloolefins. The composition can be polymerized thermally or photochemically by metathesis polymerization and is suitable for the production of shaped articles, coatings and relief images. The polymers (b) are likewise claimed.

44 Claims, No Drawings

POLYMERIZABLE COMPOSITION, PROCESS FOR PRODUCING CROSS-LINKED POLYMERS AND CROSSLINKABLE POLYMERS

The present invention relates to a composition of unsaturated polymers with recurring structural elements which contains a strained cycloalkenyl radical bonded via a divalent bridge group, and a one-component catalyst for metathesis polymerization which is induced thermally or by actinic radiation; a process for the polymerization of the composition; materials coated with the composition or the polymerized composition, and shaped articles of the crosslinked polymers; and crosslinkable polymers.

Thermally induced ring-opening metathesis polymerization using catalytic amounts of metal catalysts has already been known for a relatively long time and described in many cases in the literature [see, for example, Ivin, K. J., Olefin Metathesis 1–12, Academic Press, London (1983)]. Polymers obtainable in this way are prepared industrially and are commercially obtainable, for example under the trade name Vestenamer®. The industrial preparation is carried out using highly reactive two-component catalysts, as a rule transition metal halides, for example $WCl_6$ and metal-alkylenes, for example zinc-, aluminium- or tin-alkyls. The polymerization or gelling starts immediately after a cycloolefin has been combined with the two catalyst components. The mixtures of cycloolefin and catalyst therefore have exceptionally short pot lives, and they are suitable in practice only in the reaction injection moulding process (RIM process). The severe heating of the reaction mixture due to the heat of reaction, which imposes very high technical requirements on a controlled reaction temperature, is also a disadvantage. It is therefore difficult to adhere to a polymer specification.

WO 93/13171 describes air- and water-stable one-component and two-component catalysts based on molybdenum and tungsten compounds containing carbonyl groups and ruthenium and osmium compounds having at least one polyene ligand for thermal metathesis polymerization and a photoactivated metathesis polymerization of strained cycloolefins, in particular norbornene. No other polycyclic—above all non-fused polycyclic—cycloolefins are mentioned. The one-component catalysts of the ruthenium compounds used, that is to say $[Ru(cumene)Cl_2]_2$ and $[(C_6H_6)Ru(CH_3CN)_2Cl]^+PF_6^-$, can indeed be activated by UV irradiation; however, the storage stability of the compositions with norbornene are completely unsatisfactory. These catalysts can replace the known two-component catalysts only in adequately.

Demonceau et al. [Demonceau, A., Noels, A. F., Salve, E., Hubert, A. J., J. Mol. Catal. 76:123–132 (1992)] describe (p-cumene)$RuCl_2P(C_6H_{11})_3$, $(C_6H_5)_3]_3PRuCl_2$ and $(C_6H_5)_3]_3PRuHCl$ as thermal catalysts for the ring-opening metathesis polymerization of norbornene, a fused polycycloolefin. Because their activity is too low, these catalysts have not found acceptance in industrial preparation. It is therefore proposed to increase the activity by the addition of diazoesters. It is also mentioned that only (p-cumene)$RuCl_2P(C_6H_{11})_3$ is capable of polymerizing norbornene in a relatively short time at 60° C. Cyclooctene is also mentioned as a further monomer. No other cycloolefins are mentioned for the methatesis polymerization.

Petasis and Fu [Petasis, N. A., Fu, D., J. Am. Chem. Soc. 115:7208–7214 (1993)] describe the thermal ring-opening metathesis polymerization of norbornene using bis-cyclopentadienyl-bis(trimethylsilyl)methyl-titanium(IV) as a thermally active catalyst. No other cycloolefins are mentioned for the metathesis polymerization.

No other more reactive one-component catalysts have yet been disclosed. It is furthermore also not known to use polymers with a strained cycloalkenylene in the polymer backbone for the preparation of crosslinked polymers. This crosslinking is a novel principle.

It has now been found that polymers with strained cycloalkenylene radicals bonded to a polymer backbone via bridge groups are outstandingly suitable for the preparation of crosslinked polymers under the action particularly of one-component catalysts. The compositions of crosslinkable polymer and catalyst are storage-stable and are even insensitive to air and oxygen, depending on the catalysts used, which allows processing without particular protective measures.

Processing is easy and the processing possibilities are diverse, since no particular measures have to be taken because of too high a reactivity. The polymers are suitable both for the production of solid shaped articles and for coatings with particularly high adhesive strength. The polymers can furthermore be used for the production of images by means of irradiation under a photomask and subsequent development of the non-exposed portions with a suitable solvent.

The invention first relates to a composition comprising (a) catalytic amounts of a one-component catalyst for metathesis polymerization and (b) at least one polymer with recurring structural elements which contain a strained cycloalkenyl radical bonded via a divalent bridge group, alone or mixed with structural elements of strained cycloolefins.

The invention furthermore also relates to the novel polymers with recurring structural elements which contain a strained cycloalkenyl radical bonded via a divalent bridge group, alone or with structural elements of strained cycloolefins. The following definitions and preferred meanings are likewise valid for the polymers.

The strained cycloolefin ring can be monocyclic or polycyclic fused and/or bridged ring systems, for example with two to 6, preferably two to four, and particularly preferably 2 or 3 rings, which are unsubstituted or substituted and can contain heteroatoms, for example O, S, N or Si, in one or more rings and/or fused aromatic or heteroaromatic rings, for example o-phenylene, o-naphthylene, o-pyridinylene or o-pyrimidinylene. The individual cyclic rings can contain 3 to 16, preferably 4 to 12, particularly preferably 5 to 8 ring members. The cyclic olefins can contain further non-aromatic double bonds, preferably 2 to 4 such additional double bonds, depending on the ring size. The ring substituents are those which are inert, that is to say do not impair the chemical stability of the one-component catalysts.

Fused-on alicyclic rings preferably contain 3 to 8, particularly preferably 4 to 7, and especially preferably 5 or 6 ring C atoms. Fused-on aromatics are preferably naphthylene and, in particular, phenylene.

In a preferred embodiment, the cycloalkenyl radicals correspond to the formula A:

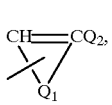

(A)

in which $Q_1$ is a radical having at least one carbon atom which, together with the —CH=CQ$_2$— group, forms an at least 3-membered alicyclic ring which may contain one or more heteroatoms chosen from the group consisting of silicon, phosphorus, oxygen, nitrogen and sulfur; and which is unsubstituted or substituted by halogen, =O, —CN, —NO$_2$, R$_1$R$_2$R$_3$Si—(O)$_u$—, —COOM, —SO$_3$M, —PO$_3$M, —COO(M)$_{1/2}$, —SO$_3$(M$_1$)$_{1/2}$, —PO$_3$(M$_1$)$_{1/2}$, C$_1$–C$_{20}$alkyl, C$_1$–C$_{20}$hydroxyalkyl C$_1$–C$_{20}$haloalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or R$_4$—X—; or in which two adjacent C atoms are substituted by —CO—O—CO— or —CO—NR$_5$—CO—; or in which an alicyclic, aromatic or heteroaromatic ring which is unsubstituted or substituted by halogen, —CN, —NO$_2$, R$_6$R$_7$R$_8$Si—(O)$_u$—, —COOM, —SO$_3$M, —PO$_3$M, —COO(M$_1$)$_{1/2}$, —SO$_3$(M)$_{1/2}$, —PO$_3$(M$_1$)$_{1/2}$, C$_1$–C$_{20}$alkyl, C$_1$–C$_{20}$haloalkyl, C$_1$–C$_{20}$hydroxyalkyl, C$_1$–C$_6$cyanoalkyl, C$_3$–C$_8$cycloalkyl, C$_6$–C$_{16}$aryl, C$_7$–C$_{16}$aralkyl, C$_3$–C$_6$heterocycloalkyl, C$_3$–C$_{16}$heteroaryl, C$_4$–C$_{16}$heteroaralkyl or R$_{13}$—X$_1$— may be fused onto adjacent carbon atoms of the alicyclic ring;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$-O— or —O—SO$_2$—;

R$_1$, R$_2$ and R$_3$ independently of one another are C$_1$–C$_{12}$alkyl, C$_1$–C$_{12}$perfluoroalkyl, phenyl or benzyl;

R$_4$ and R$_{13}$ independently of one another are C$_1$–C$_{20}$alkyl, C$_1$–C$_{20}$haloalkyl, C$_1$–C$_{20}$hydroxyalkyl, C$_3$–C$_8$cycloalkyl, C$_6$–C$_{16}$aryl, C$_7$–C$_{16}$aralkyl;

R$_5$ and R$_{10}$ independently of one another are hydrogen, C$_1$–C$_{12}$alkyl, phenyl or benzyl, where the alkyl groups in their turn are unsubstituted or substituted by C$_1$–C$_{12}$alkoxy or C$_3$–C$_8$cycloalkyl;

R$_6$, R$_7$ and R$_8$ independently of one another are C$_1$–C$_{12}$alkyl, C$_1$–C$_{12}$perfluoroalkyl, phenyl or benzyl;

M is an alkali metal and M$_1$ is an alkaline earth metal; and u is 0 or 1;

where the alicyclic ring formed with Q$_1$ may contain further non-aromatic double bonds;

Q$_2$ is hydrogen, C$_1$–C$_{20}$alkyl, C$_1$–C$_{20}$haloalkyl, C$_1$–C$_{12}$alkoxy, halogen, —CN, R$_{11}$—X$_2$—;

R$_{11}$ is C$_1$–C$_{20}$alkyl, C$_1$–C$_{20}$haloalkyl, C$_1$–C$_{20}$hydroxyalkyl, C$_3$–C$_8$cycloalkyl, C$_6$–C$_{16}$aryl or C$_7$–C$_{16}$aralkyl;

X$_2$ is —C(O)—O— or —C(O)—NR$_{12}$—;

R$_{12}$ is hydrogen, C$_1$–C$_{12}$alkyl, phenyl or benzyl;

where the abovementioned cycloalkyl, heterocycloalkyl, aryl, heteroaryl, aralkyl and heteroaralkyl groups are unsubstituted or substituted by C$_1$–C$_{12}$alkyl, C$_1$–C$_{12}$alkoxy, —NO$_2$, —CN or halogen and where the heteroatoms of the abovementioned heterocycloalkyl, heteroaryl and heteroaralkyl groups are chosen from the group consisting of —O—, —S—, —NR$_9$— and —N=; and R$_9$ is hydrogen, C$_1$–C$_{12}$alkyl, phenyl or benzyl.

It is known to the expert that cyclohexene can be polymerized by metathesis only with difficulty or not at all. Cyclohexene radicals of the formula A are therefore not preferred. Structural units of the formula A in which R$_{01}$ and R$_{02}$ together do not form a double bond are preferred.

The position of the double bond in the ring of the formula A with respect to the free bond essentially depends on the ring size and the preparation method for the compounds of the formula A.

If an asymmetric centre is present in the compounds of the formula A, this means that the compounds can occur in optically isomeric forms. Some compounds of the formula A can occur in tautomeric forms (for example keto-enol tautomerism). If an aliphatic C=C double bond is present, geometric isomerism (E form or Z form) can also occur. Exoendo configurations are furthermore also possible. Formula A thus includes all the possible stereoisomers which are present in the form of enantiomers, tautomers, diastereomers, E/Z isomers or mixtures thereof.

In the definitions of the substituents, the alkyl, alkenyl and alkynyl groups can be straight-chain or branched. The same also applies to the alkyl or each alkyl part of alkoxy-, alkylthio-, alkoxycarbonyl- and of other alkyl-containing groups. These alkyl groups preferably contain 1 to 12, more preferably 1 to 8, and particularly preferably 1 to 4 C atoms. These alkenyl and alkynyl groups preferably contain 2 to 12, more preferably 2 to 8, and particularly preferably 2 to 4 C atoms.

Alkyl includes, for example, methyl, ethyl, isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxy-iso-butyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and halogenated, in particular fluorinated or chlorinated, alkanes, for example isopropyl, n-propyl, n-butyl, iso-butyl, sec-butyl, tert-butyl, and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkeny includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl and n-octadec-4-enyl.

Cycloalkyl is preferably C$_5$–C$_8$cycloalkyl, in particular C$_5$- or C$_6$cycloalkyl. Some example are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methylnitrile), cyanoethyl (ethylnitrile), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl preferably contains 7 to 12 C atoms, and particularly preferably 7 to 10 C atoms. It can be, for example, benzyl, phenethyl, 3-phenylpropyl, α-methylbenzyl, phenbutyl or α,α-dimethylbenzyl.

Aryl preferably contains 6 to 10 C atoms. It can be, for example, phenyl, pentalene, indene, naphtalene, azulene or anthracene.

Heteroaryl preferably contains 4 or 5 C atoms and one or two heteroatoms from the group consisting of O, S and N. It can be, for example, pyrrole, furan, thiophene, oxazole, thiazole, pyridine, pyrazine, pyrimidine, pyridazine, indole, purine or quinoline.

Heterocycloalkyl preferably contains 4 or 5 C atoms and one or two heteroatoms from the group consisting of O, S and N. It can be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyl-oxy, sec-butyloxy or t-butyloxy.

Alkali metal in the context of the present invention is to be understood as meaning lithium, sodium, potassium, rubidium and caesium, in particular lithium, sodium and potassium.

Alkaline earth metal in the context of the present invention is to be understood as meaning beryllium, magnesium, calcium, strontium and barium, in particular magnesium and calcium.

In the above definitions, halogen is to be understood as meaning fluorine, chlorine, bromine and iodine, preferably fluorine, chlorine and bromine.

In the radicals of the formula A $Q_2$ is preferably hydrogen.

Compounds having radicals of the formula A which are furthermore preferred are those in which the alicyclic ring which $Q_1$ forms together with the —CH=$CQ_2$— group contains 3 to 16, more preferably 3 to 12, and particularly preferably 3 to 8 ring atoms, it being possible for this to be a monocyclic or a bicyclic, tricyclic or tetracyclic condensed ring system.

The compositions according to the invention particularly advantageously comprises radicals of the formula A in which $Q_1$ is a radical having at least one carbon atom which, together with the —CH=$CQ_2$— group, forms a 3- to 20-membered alicyclic ring which may contain one or more heteroatoms chosen from the group consisting of silicon, oxygen, nitrogen and sulfur; and which is unsubstituted or substituted by halogen, =O, —CN, —$NO_2$, $R_1R_2R_3Si$—(O)$_u$—, —COOM, —$SO_3M$, —$PO_3M$, —COO($M_1$)$_{1/2}$, —$SO_3$($M_1$)$_{1/2}$, —$PO_3$($M_1$)$1_{,2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X—; or in which two adjacent C atoms in this radical $Q_1$ are substituted by —CO—O—CO— or —CO—$NR_5$—CO—; or in which an alicyclic, aromatic or heteroaromatic ring which is unsubstituted or substituted by halogen, —CN, —$NO_2$, $R_6R_7R_8Si$—, —COOM, —$SO_3M$, —$PO_3M$, —COO($M_1$)$_{1/2}$, —$SO_3$($M_1$)$_{1/2}$, —$PO_3$($M_1$)$_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$— may be fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl, $C_7$–$C_{12}$aralkyl;

$R_5$ and $R_{10}$ independently of one another are hydrogen, $C_1$–$C_6$alkyl, phenyl or benzyl, where the alkyl groups in their turn are unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

where the alicyclic ring formed with $Q_1$ may contain further non-aromatic double bonds;

$Q_2$ is hydrogen, $C_1$–$C_{12}$alkyl, $C_1$–$C_{12}$haloalkyl, $C_1$–$C_6$alkoxy, halogen, —CN, $R_{11}$—$X_2$—;

$R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

where the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and where the heteroatoms of the heterocycloalkyl, heteroaryl and heteroaralkyl groups are chosen from the group consisting of —O—, —S—, —$NR_9$— and —N=; and $R_9$ is hydrogen, $C_1$–$C_6$alkyl, phenyl or benzyl.

Compounds having a radical of the formula A from this group which are preferred are those in which $Q_1$ is a radical having at least one carbon atom which, together with the —CH=$CQ_2$— group, forms a 3- to 10-membered alicyclic ring which may contain a heteroatom chosen from the group consisting of silicon, oxygen, nitrogen and sulfur and is unsubstituted or substituted by halogen, —CN, —$NO_2$, $R_1R_2R_3Si$—, —COOM, —$SO_3M$, —$PO_3M$, —COO($M_1$)$_{1/2}$, —$SO_3$($M_1$)$_{1/2}$, -$PO_3$($M_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an alicyclic, aromatic or heteroaromatic ring which is unsubstituted or substituted by halogen, —CN, —$NO_2$, $R_6R_7R_8Si$—, —COOM, —$SO_3M$, —$PO_3M$, —COO($M_1$)$_{1/2}$, —$SO_3$($M_1$)$_{1/2}$, —$PO_3$($M_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$— may be fused onto adjacent carbon atoms;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —$SO_2$—;

$R_6$, $R_7$ and $R_8$ independently of one another are $C_1$–$C_4$alkyl, $C_1$–$C_4$perfluoroalkyl, phenyl or benzyl;

and $Q_2$ is hydrogen.

In a particularly advantageous embodiment of the novel composition the cycloalkenyl radical of the formula A is $C_3$–$C_{12}$—, more preferably $C_3$–$C_8$cycloalkenyl, 2,2,2-bicyclooctenyl or norbornenyl. Examples are cyclopropenyl, cyclobutenyl, cyclopentenyl, cycloheptenyl, cycloheptadienyl, cyclooctenyl, cyclooctadienyl, cyclononenyl, cyclodecenyl, cyclodecenyl, 2,2,2-bicyclooctenyl and norbornenyl.

With particular preference the cycloalkenyl radical of the formula A is unsubstituted or substituted cyclopropenyl, cyclobutenyl, cyclopentenyl, cycloheptenyl, cyclooctenyl, cyclopentadienyl, cyclohexadienyl, cycloheptadienyl, cyclooctadienyl and norbornenyl or norbornenyl derivatives such as, for example, 7-oxa-2,2,1-cycloheptenyl and also the corresponding benzo derivatives. Substituents are preferably $C_1$–$C_4$alkyl and $C_1$–$C_4$alkoxy. Norbornenyl and norbornenyl derivatives are particularly suitable as radicals of the formula A. Of these norbornenyl derivatives, preferred derivatives are those which either correspond to the formula B:

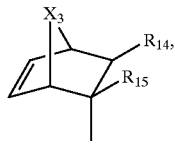
(B)

in which
  $X_3$ is —$CHR_{16}$—, oxygen or sulfur;
  $R_{14}$ and $R_{15}$ independently of one another are hydrogen, —CN, trifluoromethyl, $(CH_3)_3Si$—O—, $(CH_3)_3Si$— or —$COOR_{17}$; and
  $R_{16}$ and $R_{17}$ independently of one another are hydrogen, $C_1$–$C_{12}$alkyl, phenyl or benzyl;
or correspond to the formula C:

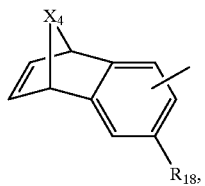
(C)

in which
  $X_4$ is —$CHR_{19}$—, oxygen or sulfur;
  $R_{19}$ is hydrogen, $C_1$–$C_{12}$alkyl, phenyl or benzyl; and
  $R_{18}$ is hydrogen, $C_1$–$C_6$alkyl or halogen.

With particular preference, the cycloalkenyl radical of the formula I is norbornenyl of the formula D or methyinorbornenyl of the formula E:

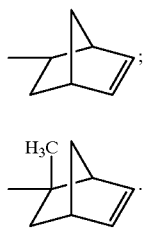
(D)
(E)

The bivalent bridge group can, for example, be a divalent hydrocarbon radical, uninterrupted or interrupted by —O—, having from 1 to 100, preferably 2 to 50 and, with particular preference, 2 to 20 C atoms which is attached directly or by way of an ether, thioether, amine, ester, amide, urethane or urea group to the polymer backbone and is attached directly or by way of an ether, thioether, amine, ester, amide, urethane or urea group to the cycloolefin; or the bridge group can be an ether, thioether, amine, ester, amide, urethane or urea group.

The bivalent bridge group can, for example, be of the formula F:

—$(X_{100})_g$—$(R_{01})_h$—$(X_{101})_i$— (F), in which
  g, h and i independently of one another are 0 or 1, and g and i are not simultaneously 0;
  $X_{100}$ and $X_{101}$ independently of one another are —O—, —S—, —NH—, —N($C_1$–$C_4$alkyl)—, —C(O)O—, —O(O)CO, —NH(O)C—, —C(O)NH—, —N($C_1$–$C_4$alkyl)-(O)C—, —C(O)—N($C_1$–$C_4$alkyl)-, —O—C(O)—O—, —NH—C(O)—O—, —O—C(O)—NH, —N($C_1$–$C_4$alkyl)-(O)C—O— or —O—C(O)—N($C_1$–$C_4$alkyl)-; and
  $R_{01}$ is a direct bond, $C_1$–$C_{18}$alkylene, polyoxaalkylene having 2 to 12 oxaalkylene units and 2 to 6 C atoms in the oxaalkylene, unsubstituted or $C_1$–$C_4$- or $C_1$–$C_4$alkoxy-substituted $C_5$–$C_8$cycloalkylene, unsubstituted or $C_1$–$C_4$- or $C_1$–$C_4$alkoxy-substituted $C_5$–$C_8$cycloalkylene —$CH_2$—, unsubstituted or $C_1$–$C_4$- or $C_1$–$C_4$alkoxy-substituted —$CH_2$—($C_5$–$C_8$cycloalkylene)-$CH_2$—, unsubstituted or $C_1$–$C_4$- or $C_1$–$C_4$alkoxy-substituted heterocycloalkylene having 5 or 6 ring members and heteroatoms selected from the group —O—, —S— and N, unsubstituted or $C_1$–$C_4$- or $C_1$–$C_4$alkoxy-substituted phenylene, benzylene or xylylene, or unsubstituted or $C_1$–$C_4$- or $C_1$–$C_4$alkoxy-substituted heteroarylene having 5 or 6 ring members and heteroatoms selected from the group —O—, —S— and N. $R_{01}$ as alkylene is preferably $C_1$–$C_{12}$- and particularly preferably $C_1$–$C_6$alkylene which can be linear or branched. Examples are methylene, ethylene, 1,2- or 1,3-propylene, 1,2-, 1,3- or 1,4 butylene, pentylene, hexylene, heptylene, octylene, nonylene, decylene, undecylene, dodecylene, tetradecylene, hexadecylene and octadecylene.

$R_{01}$ as polyoxaalkylene contains preferably 2 to 6 and particularly preferably 2 to 4 oxaalkylene units and 2 or 3 C atoms in the oxaalkylene.

$R_{01}$ as cycloalkylene and in the radicals containing cycloalkylene is preferably $C_5$- or $C_6$cycloalkylene, for example pentylene and hexylene.

$R_{01}$ as heterocycloalkylene and heteroarylene is preferably 5- or 6-membered cycloalkylene having one heteroatom from the group N and O.

In a preferred embodiment $R_{01}$ is $C_1$–$C_{12}$alkylene, polyoxaalkylene having 2 to 6 oxaalkylene units and 2 C atoms in the oxaalkylene, unsubstituted or $C_1$–$C_4$[lacuna]- or $C_1$–$C_4$alkoxy-substituted cyclopentylene, cyclohexylene, cyclohexylene-$CH_2$—, —$CH_2$-cyclohexylene-$CH_2$—, phenylene, benzylene or xylylene.

Particularly preferred bridge groups are for example 1,4-$C_6H_4$—[O—(O)C]$_2$—, —C(O)—O—$C_2$–$C_6$alkylene-O—(O)C— and —C(O)—O—$CH_2$—.

The polymer backbone of the polymers to be used according to the invention can be built up in different ways. The polymers can be homo- or copolymers, containing structural elements with a strained cycloalkenyl radical bonded to the monomer unit via a divalent bridge group to the extent of at least 1 and advantageously of at least 5 mol %, preferably 5 to 100 mol %, more preferably 10 to 100 mol %, even more preferably 20 to 100 mol %, particularly preferably 20 to 80 mol %, and especially preferably 20 to 70 mol %, based on the polymer. The polymers can be random polymers or block copolymers.

The polymers used in the composition according to the invention include oligomers and polymers. The number of recurring structural units can accordingly be 2 to 10 000, preferably 5 to 5000, particularly preferably 10 to 1000, and especially preferably 20 to 500.

The polymer backbone can be derived, for example, from polymers which are functionalized with —OH, —NH$_2$, —NH(C$_1$–C$_4$alkyl), —C(O)OH, —C(O)—NH$_2$ or —C(O)—NH(C$_1$–C$_4$alkyl).

The polymer backbone can be formed, for example, from polymers from the group of homo- and copolymers of olefinically unsaturated alcohols such as, for example, allyl alcohol, homo- and copolymers of vinyl alcohol, homo- and copolymers of unsaturated carboxylic acids such as, for example, acrylic acid, methacrylic acid, maleic acid, maleic anhydride and the ester derivatives and amide derivatives thereof, homo- and copolymers of hydroxystyrene or aminostyrene or styrenesulfonic or carboxylic acids, homo- and copolymers of hydroxylated butadiene, homo- and copolymers of vinylpyrrolidone, polysiloxanes having hydroxy- or aminoalkyl side chains, and homo- and copolymers of polyepoxides, or from polysaccharides such as, for example, cellulose, cellulose ester or cellulose ether, starch or chitosan.

In a preferred embodiment the polymers to be used in accordance with the invention contain from 1 to 100 mol-%, based on the polymer, of structural elements of the formula G, from 99 to 0 mol-% of structural elements of the formula H, and from 100 to 0 mol-% of structural elements of the formula I:

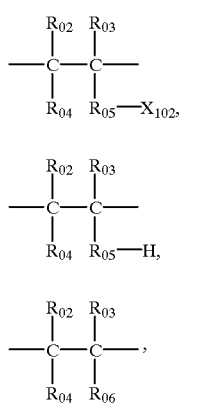

in which
the R$_{02}$s independently of one another are H, F or C$_1$–C$_{12}$alkyl;
the R$_{03}$s independently of one another are H, F, Cl, CN or C$_1$–C$_{12}$alkyl;
the R$_{04}$s independently of one another are H, F, C$_1$–C$_{12}$alkyl, —COOH, —C(O)O—C$_1$–C$_{12}$alkyl, C(O)—NH$_2$ or —C(O)—NH—C$_1$–C$_{12}$alkyl;
R$_{05}$ is a bivalent bridge group;
R$_{06}$ is H, F, Cl, CN, C$_1$–C$_{12}$alkyl, C$_1$–C$_{12}$alkoxy, unsubstituted phenyl or phenyl which is substituted by Cl, Br, C$_1$–C$_4$alkyl, C$_1$–C$_4$alkoxy, —C(O)OC$_1$–C$_{12}$alkyl, —C(O)—NH$_2$, C(O)—NH—C$_1$–C$_{12}$alkyl, —SO$_3$H or —SO$_3$—C$_1$–C$_{12}$alkyl, or is —C(O)OH, —C(O)O—C$_2$–C$_{12}$hydroxyalkyl, —C(O)O—C$_1$–C$_{12}$alkyl, —C(O)—NH$_2$ or —C(O)—NH—C$_1$–C$_{12}$alkyl;
R$_{04}$ and R$_{06}$ together are —O—CH$_2$—O— or —O—C$_2$–C$_{12}$alkylidene-O—; and
X$_{102}$ is a radical of the formula I.
X$_{102}$ is with particular preference norbornenyl, which is unsubstituted or substituted by C$_1$–C$_4$alkyl.

The content of structural elements is guided essentially by the intended use. The structural elements of the formula G are preferably present in an amount of from 100 to 1, more preferably from 100 to 5, particularly preferably from 80 to 10 and, with particular preference, from 70 to 20 mol-%, the structural elements of the formula H preferably in an amount of from 0 to 99, more preferably from 0 to 95, particularly preferably from 20 to 90 and, with particular preference, from 30 to 80 mol-%, and the structural elements of the formula I preferably in an amount of from 0 to 99, more preferably from 0 to 95, particularly preferably from 20 to 90 and, with particular preference, from 30 to 80 mol-%, based on 1 mol of the polymer. The percentages add up to 100%.

R$_{02}$ is preferably H, C$_1$–C$_4$alkyl or F. R$_{03}$ is preferably H, F, Cl or C$_1$–C$_4$alkyl. R$_{04}$ is preferably H, F, C$_1$–C$_4$alkyl, —COOH or —C(O)—C$_1$–C$_6$alkyl. R$_{06}$ is preferably H, F, Cl, CN, C$_1$–C$_4$alkyl, C$_1$–C$_4$alkoxy, phenyl which is unsubstituted or is substituted by Cl, Br, C$_1$–C$_4$alkyl, C$_1$–C$_4$alkoxy, —COOH, —C(O)OC$_1$–C$_{14}$alkyl, —C(O)—NH$_2$, C(O)—NH—C$_1$–C$_4$alkyl, —SO$_3$H or —SO$_3$—C$_1$–C$_4$alkyl, or is —COOH, —C(O)O—C$_1$–C$_4$alkyl, —C(O)NH$_2$ or —C(O)—NH—C$_1$–C$_4$alkyl.

R$_{04}$ and R$_{06}$ together are preferably —O—CH$_2$—O— or —O—C$_2$–C$_6$-alkylidene-O—, for example ethylidene, propylidene, butylidene, pentylidene, hexylidene, cyclopentylidene or cyclohexylidene.

R$_{05}$ is preferably of the formula A, and R$_{01}$, X$_{100}$ and X$_{101}$, are subject to the preferences described above.

In a particularly preferred embodiment, in the formulae (G) and (H), the R$_{02}$s are H, the R$_{03}$s independently of one another are H or methyl, R$_{04}$ is H, —C(O)—O—C$_1$–C$_4$alkyl or —C(O)—OH, R$_{05}$ is p-C$_6$H$_4$—O—, —C(O)—O—C$_2$–C$_6$alkylene-O—C(O)— or —C(O)—O—CH$_2$—, and X$_{102}$ is a radical of the formula A, and especially norbornenyl or 1-methyl-norbornene-1-yl.

In another particularly preferred form, in the formulae (G) and (H), the R$_{02}$s are H, the R$_{03}$s are H or methyl, R$_{04}$ is H, R$_{05}$ is —(CH$_2$)$_d$—O—C(O)— with d equal to 0 or an integer from 1 to 12, preferably 1 to 6, —(CH$_2$)$_d$—O—(C$_e$H$_{2e}$—O—)$_f$(O)— with e equal to an integer from 2 to 6, preferably 2 or 3, and f equal to an integer from to 12, preferably 1 to 4, and X$_{102}$ is a radical of the formula A, and especially norbornenyl or 1-methyl-norbornene-1-yl.

The polyepoxides can be built up from diepoxides, as comonomers (α), having preferably 6 to 40, and particularly preferably 8 to 30 C atoms and diols, as comonomers (β), having preferably 2 to 200, more preferably 2 to 100, and particularly preferably 2 to 50 C atoms. Diepoxides with a strained cycloolefin ring preferably contain 6 to 40, and particularly preferably 10 to 30 C atoms. The diepoxides are preferably the diglycidyl ethers, which can easily be prepared. The monomeric diepoxides can be, for example, the diglycidyl ethers of aliphatic, cycloaliphatic, aromatic or araliphatic diols. Diols with a strained cycloolefin ring preferably contain 5 to 40, and particularly preferably 7 to 30 C atoms. The diols can be, for example, aliphatic, cycloaliphatic, aromatic or araliphatic diols. Diols and diepoxides are familiar to the expert and are not listed here. Among the diepoxides, the diglycidyl ethers and diglycidyl esters are preferred.

The polyepoxides can contain, for example, recurring structural elements selected from the group of structural elements of the formulae J, K, L and M:

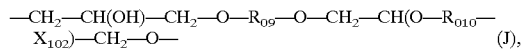
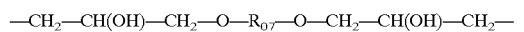

O— (L),

—R$_{08}$—O— (M), with the proviso that at least structural elements of the formulae J and K are contained, in which R$_{07}$ and R$_{09}$ independently of one another are a divalent radical, reduced by the glycidyloxy groups, of a diglycidyl ether and R$_{06}$ and R$_{08}$ independently of one another are a divalent radical, reduced by the hydroxyl groups, of a diol, R$_{010}$ is a divalent bridge group, and X$_{102}$ is a radical of the formula A.

The polymer can contain in each case up to 50 mol % of the structural elements of the formulae J and K per mole of the polymer. If structural elements of the formulae L and M are present, advantageous mixing ratios are 2.5 to 47.5, preferably 5 to 40 mol % of structural elements of the formulae and M, per mole of the polymer.

R$_{06}$ and R$_{08}$ are preferably C$_2$–C$_{18}$-, preferably C$_2$–C$_{12}$alkylene, polyoxaalkylene having 2 to 50, preferably 2 to 10 oxaalkylene units and 2 to 6, preferably 2 to 4 C atoms in the oxyalkylene, C$_3$–C$_{12}$, preferably C$_5$–C$_8$cycloalkylene, C$_5$–C$_8$cycloalkylene-CH$_2$—, —CH$_2$—(C$_5$–C$_8$cycloalkylene)-CH$_2$—, C$_6$–C$_{14}$arylene, bisphenylene, benzylene, xylylene or —C$_6$H$_4$—X$_{01}$—C$_6$H$_4$—, where X$_{01}$ is O, S, SO, SO$_2$, CO, CO$_2$, NH, N(C$_1$–C$_4$-akyl), alkylidene having 1 to 18, preferably 1 to 12 C atoms or C$_5$–C$_7$cycloalkylidene. Some examples are ethylene, propylene, butylene, di-, tri- and tetraoxaethylene, cyclopentylene, cyclohexylene, cyclohexylene-CH$_2$—, —CH$_2$-cyclohexylene-CH$_2$—, phenylene, —C$_6$H$_4$—O—C$_6$H$_4$—, —C$_6$H$_4$—C$_6$H$_{10}$—C$_6$H$_4$—, —C$_6$H$_4$—CH(CH$_3$)—C$_6$H$_4$—, —C$_6$H$_4$—C(CH$_3$)$_2$—C$_6$H$_4$— and —C$_6$H$_4$—CH$_2$—C$_6$H$_4$—.

R$_{07}$ and R$_{09}$ are preferably C$_2$–C$_{18}$-, preferably C$_2$–C$_{12}$alkylene, polyoxaalkylene having 2 to 50, preferably 2 to 10 oxaalkylene units and 2 to 6, preferably 2 to 4 C atoms in the oxyalkylene, C$_3$–C$_{12}$, preferably C$_5$–C$_8$cycloalkylene, C$_5$–C$_8$cycloalkylene-CH$_2$—, —CH$_2$—(C$_5$–C$_8$cycloalkylene)-CH$_2$—, C$_6$–C$_{14}$arylene, bisphenylene, benzylene, xylylene or —C$_6$H$_4$—X$_{01}$—C$_6$H$_4$—, where X$_{01}$ is O, S, SO, SO$_2$, CO, CO$_2$, NH N(C$_1$–C$_4$-akyl), alkylidene having 1 to 18, preferably 1 to 12 C atoms or C$_5$–C$_7$cycloalkylidene. Some examples are ethylene, propylene, butylene, di-, tri- and tetraoxaethylene, cyclopentylene, cyclohexylene, cyclohexylene-CH$_2$—, —CH$_2$-cyclohexylene-CH$_2$—, phenylene, —C$_8$H$_4$—O—C$_6$H$_4$—, —C$_8$H$_4$—CH(CH$_3$)—C$_6$H$_4$—, —C$_6$H$_4$—C(CH$_3$)$_2$—C$_6$H$_4$—, —C$_6$H$_4$—C$_6$H$_{10}$—C$_6$H$_4$— and —C$_6$H$_4$—CH$_2$—C$_6$H$_4$—.

X$_{102}$ is particularly preferably a norborenyl or 1-methylnorbornene-1-yl radical.

The bivalent bridge group R$_{010}$ is preferably a radical of the formula —(C$_e$H$_{2e}$—O—)$_f$C(O)— with e equal to 0 or an integer from 2 to 6, preferably 2 or 3, and f equal to a number from 1 to 12, preferably 1 to 4.

The novel polymers according to the invention can be prepared by known processes, for example by polymerization of the corresponding monomers having cycloalkenyl radicals with or without comonomers. More advantageous is the subsequent reaction of polymers containing functional groups with reactive strained cycloolefins, for example alcohols, amines, carboxylic acids or their ester- or amide-forming derivatives or isocyanates. Functional polymers can be modified beforehand with diisocyanates or carboxylic anhydrides and only then reacted with the strained cycloolefin.

The choice of the polymers to be used according to the invention depends chiefly on the intended use and the desired properties. The wide selection by modifications of the polymers allows tailor-made polymers to be provided for the most diverse uses. A further modification possibility results from the concomitant use of strained cycloolefins which are capable of metathesis polymerization, which means that, overall, adaptations specific to desired uses can be carried out. If strained polyolefins having at least 2 double bonds are used concomitantly, a greater density of crosslinking after polymerization of the composition according to the invention may frequently be observed.

A very large number of strained cycloolefins which the composition according to the invention can comprise as comonomers are known.

The cyclic olefins can be monocyclic or polycyclic fused and/or bridged ring systems, for example with two to four rings, which are unsubstituted or substituted and can contain heteroatoms, for example O, S, N or Si, in one or more rings and/or fused aromatic or heteroaromatic rings, for example o-phenylene, o-naphthylene, o-pyridinylene or o-pyrimidinylene. The individual cyclic rings can contain 3 to 16, preferably 3 to 12, and particularly preferably 3 to 8 ring members. The cyclic olefins can contain further non-aromatic double bonds, preferably 2 to 4 such additional double bonds, depending on the ring size. Ring substituents are those which are inert, that is to say do not impair the chemical stability and the heat stability of the catalysts. The cycloolefins are strained rings or ring systems.

Fused-on alicyclic rings contain preferably 3 to 8, particularly preferably 4 to 7, and especially preferably 5 or 6 ring C atoms.

In a preferred embodiment, the comonomeric strained cycloolefins correspond to the formula I:

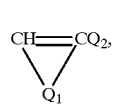

(I')

in which

Q$_1$ and Q$_2$ have the meanings and preferred meanings as defined for formula A.

The composition according to the invention is particularly suitable for the polymerization of norbornene and norbornene derivatives. Of these norbornene derivatives, preferred derivatives are those which either correspond to the formula II:

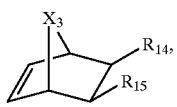

(II)

in which

X$_3$ is —CHR$_{16}$—, oxygen or sulfur;

R$_{14}$ and R$_{15}$ independently of one another are hydrogen, —CN, trifluoromethyl, (CH$_3$)$_3$Si—O—, (CH$_3$)$_3$Si— or —COOR$_{17}$; and R$_{16}$ and R$_{17}$ independently of one another are hydrogen, C$_1$–C$_{12}$alkyl, phenyl or benzyl;

or correspond to the formula III:

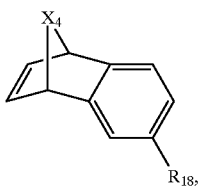
(III)

in which

X$_4$ is —CHR$_{19}$—, oxygen or sulfur;
R$_{19}$ is hydrogen, C$_1$–C$_{12}$alkyl, phenyl or benzyl; and
R$_{18}$ is hydrogen, C$_1$–C$_6$alkyl or halogen;

or correspond to the formula IV:

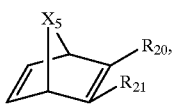
(IV)

in which

X$_5$ is CHR$_{22}$—, oxygen or sulfur;
R$_{22}$ is hydrogen, C$_1$–C$_{12}$alkyl, phenyl or benzyl;
R$_{20}$ and R$_{21}$ independently of one another are hydrogen, CN, trifluoromethyl, (CH$_3$)$_3$Si—O—, (CH$_3$)$_3$Si— or —COOR$_{23}$; and
R$_{23}$ is hydrogen, C$_1$–C$_{12}$alkyl, phenyl or benzyl;

or correspond to the formula V:

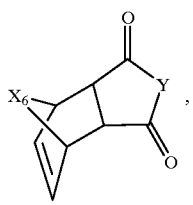
(V)

in which

X$_6$ is —CHR$_{24}$—, oxygen or sulfur;
R$_{24}$ is hydrogen, C$_1$–C$_{12}$alkyl, phenyl or benzyl;
Y is oxygen or

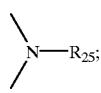

and
R$_{25}$ is hydrogen, methyl, ethyl or phenyl.

The following compounds of the formula I are particularly suitable, bi- and polycyclic systems being obtainable by Diels-Alder reactions:

(1)

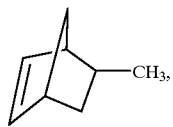
(2)

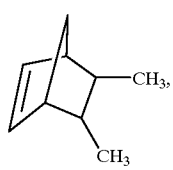
(3)

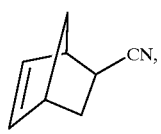
(4)

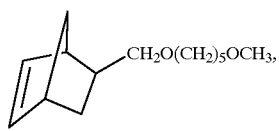
(5)

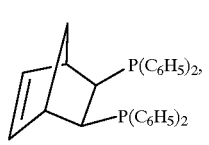
(6)

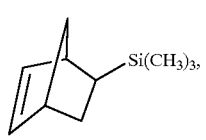
(7)

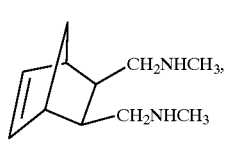
(8)

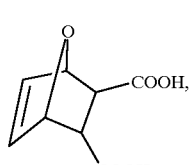
(9)

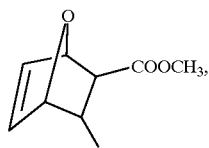
(10)

-continued
(11) 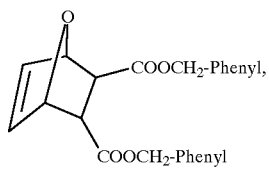 COOCH₂-Phenyl,
COOCH₂-Phenyl
(12) 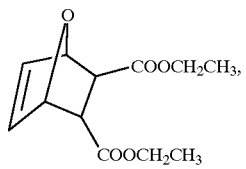 COOCH₂CH₃,
COOCH₂CH₃
(13) 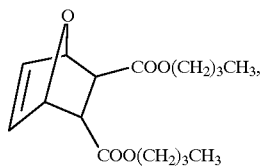 COO(CH₂)₃CH₃,
COO(CH₂)₃CH₃
(14) 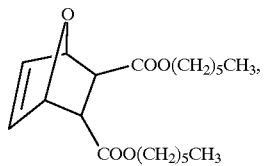 COO(CH₂)₅CH₃,
COO(CH₂)₅CH₃
(15) 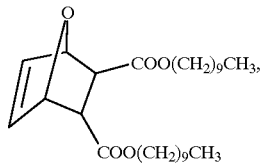 COO(CH₂)₉CH₃,
COO(CH₂)₉CH₃
(16) 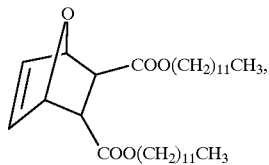 COO(CH₂)₁₁CH₃,
COO(CH₂)₁₁CH₃
(17) 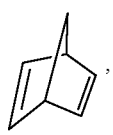,
(18) 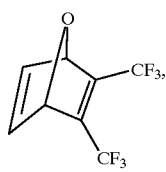 CF₃,
CF₃
-continued
(19) 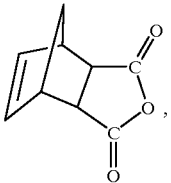,
(20) 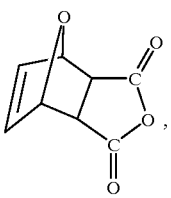,
(21) 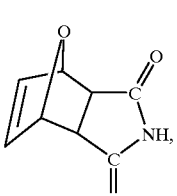,
(22) 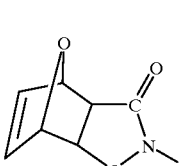,
(23) 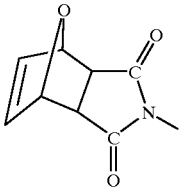,
(24) 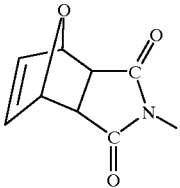,
(25) 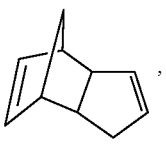,
(26) 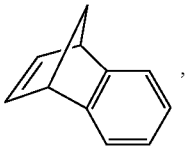,

(27) 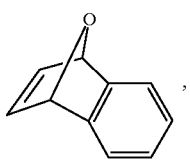
(28) 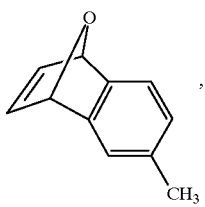
(29) 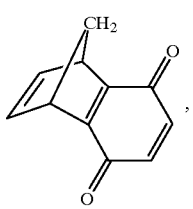
(30) 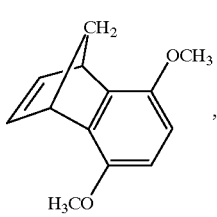
(31) 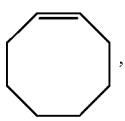
(32) 
(33) 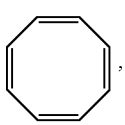
(34) 
(35) 
(36) 
(37) 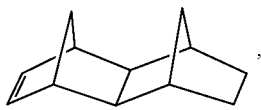
(38) 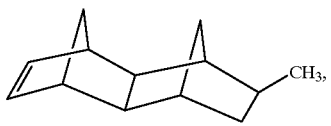
(39) 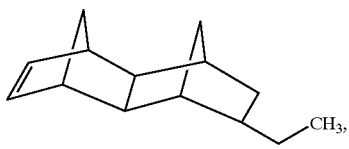
(40) 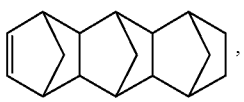
(41) 
(42) 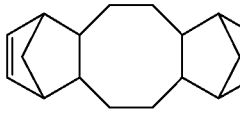
(43) 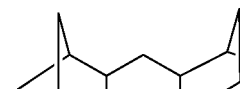
(44) 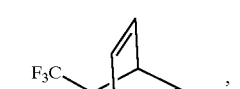
(45) 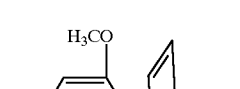
(46) 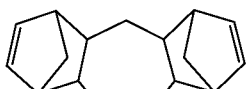

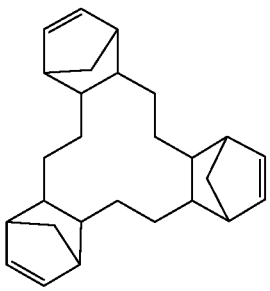
(47)

and

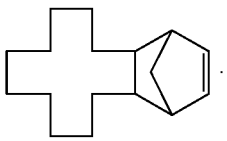
(48)

The comonomeric polyfunctional strained cycloolefins can be compounds of the formula (f1):

$$(T)_n\text{-}U \quad (f1),$$

in which T is the radical of a strained cycloolefin, U is a direct bond or an n-valent bridge group and n is an integer from 2 to 8.

The cyclic olefins can be monocyclic or polycyclic fused and/or bridged ring systems, for example with two to four rings, which are unsubstituted or substituted and can contain heteroatoms, for example O, S, N or Si, in one or more rings and/or fused alicyclic, aromatic or heteroaromatic rings, for example o-cyclopentylene, o-phenylene, o-naphthylene, o-pyridinylene or o-pyimidinylene. The individual cyclic rings can contain 3 to 16, preferably 3 to 12, and particularly preferably 3 to 8 ring members. The cyclic olefins can contain further non-aromatic double bonds, preferably 2 to 4 such additional double bonds, depending on the ring size. The ring substituents are those which are inert, that is to say which do not impair the chemical stability of the one-component catalysts.

Fused-on alicyclic rings preferably contain 3 to 8, particularly preferably 4 to 7, and especially preferably 5 or 6 ring C atoms.

In a preferred embodiment, the radicals T in formula (f1) correspond to cycloolefin radicals of the formula (f2):

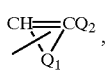
(f2)

in which $Q_1$ and $Q_2$ have the abovementioned meanings, including the preferred meanings.

The position of the double bond in the ring of the formula (f2) with respect to the free bond essentially depends on the ring size and the preparation method for the compounds of the formula I.

The cycloalkenyl radical of the formula (f2) is particularly preferably unsubstituted or substituted by cyclopropenyl, cyclobutenyl, cyclopentenyl, cycloheptenyl, cyclooctenyl, cyclopentadienyl, cyclohexadienyl, cycloheptadienyl, cyclooctadienyl and norbornenyl or norbornenyl derivatives, for example 7-oxa-2,2,2-cycloheptene and the corresponding benzo derivatives. Substituents are preferably $C_1$–$C_4$alkyl and $C_1$–$C_4$alkoxy.

Particularly suitable radicals of the formula (f2) are norbornenyl and norbornenyl derivatives. Of these norbornenyl derivatives, particularly preferred derivatives are those which either correspond to the formula (f3):

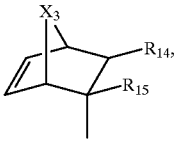
(f3)

in which
$X_3$ is —$CHR_{16}$—, oxygen or sulfur;
$R_{14}$ and $R_{15}$ independently of one another are hydrogen, —CN, trifluormethyl, $(CH_3)_3Si$—O—, $(CH_3)_3S$— or —$COOR_{17}$; and
$R_{16}$ and $R_{17}$ independently of one another are hydrogen, $C_1$–$C_{12}$alkyl, phenyl or benzyl;
or correspond to the formula (f4):

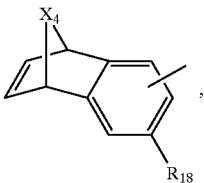
(f4)

in which
$X_4$ is —$CHR_{19}$—, oxygen or sulfur;
$R_{19}$ is hydrogen, $C_1$–$C_{12}$alkyl, phenyl or benzyl; and
$R_{18}$ is hydrogen, $C_1$–$C_6$alkyl or halogen.

The cycloalkenyl radical T in the formula (f1) is particularly preferably norbornenyl of the formula ($nr_4$):

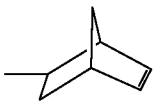
($nr_4$)

In formula (f1), n is preferably an integer from 2 to 6, particularly preferably 2 to 4, and especially preferably 2 or 3.

In formula (t), U is preferably an n-valent bridge group. Possible divalent bridge groups are, for example, those of the formula (f5):

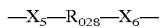
$$-X_5-R_{028}-X_6- \quad (f5),$$

in which
$X_5$ and $X_2$ independently of one another are a direct bond, —O—, —$CH_2$—O—, —C(O)O—, —O(O)C—, —$CH_2$—O(O)C—, —C(O)—$NR_{029}$—, —$R_{029}N$—(O)C—, —NH—C(O)—$NR_{029}$—, —O—C(O)—NH—, —$CH_2$—O—C(O)—NH— or —NH—C(O)—O—, and $R_{028}$ is $C_2$–$C_{18}$alkylene, $C_5$–$C_8$cycloalkylene which is unsubstituted or substituted by $C_1$–$C_4$alkyl or $C_1$–$C_4$alkoxy, $C_6$–$C_{18}$arylene or $C_7$–$C_{19}$aralkylene which are unsubstituted or substituted by $C_1$–$C_4$alkyl or $C_1$–$C_4$alkoxy, or polyoxaalkylene having 2 to 12 oxaalkylene units and 2 to 6 C atoms in the alkylene, and $R_{029}$ is H or $C_1$–$C_6$alkyl.

Alkylene $R_{028}$ preferably contains 2 to 12, and particularly preferably 2 to 8 C atoms. The alkylene can be linear or branched. Preferred cycloalkylene is cyclopentylene, and in particular cyclohexylene. Some examples of arylene are phenylene, naphthylene, biphenylene, biphenylene ether and anthracenylene. An example of aralkylene is benzylene. The polyoxaalkylene preferably contains 2 to 6, and particularly preferably 2 to 4 units, and preferably 2 or 3 C atoms in the alkylene.

In a preferred embodiment, in formula (f5), a) $X_5$ and $X_6$ are a direct bond and $R_{028}$ is $C_2$–$C_{18}$alkylene, more preferably $C_2$–$C_{12}$alkylene, or b) $X_5$ and $X_6$ are —O—, —$CH_2$—O—, —C(O)O—, —O(O)C—, —$CH_2$—O(O)C—, —$CH_2$—O—C(O)—NH—, —C(O)—$NR_{029}$, or —O—C(O)—NH— and $R_{028}$ is $C_2$–$C_{12}$alkylene, or phenylene, naphthylene or benzylene which are unsubstituted or substituted by $C_1$–$C_4$alkyl or $C_1$–$C_4$alkoxy, or —$R_{030}$—(O—$R_{030}$—)$_x$—$OR_{030}$—, in which x is a number from 2 to 4 and $R_{030}$ is —$C_2$–$C_4$alkylene.

Some examples of compounds of the formula (f1) with a divalent bridge group are:

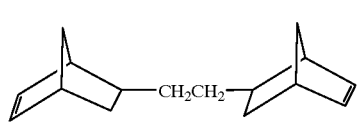 (43)

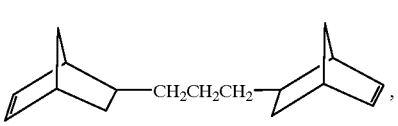 (44)

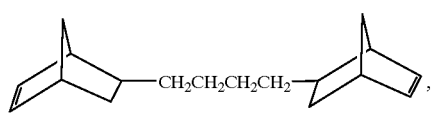 (45)

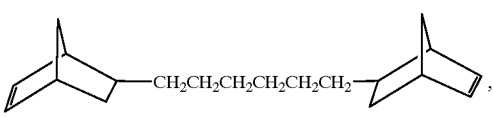 (46)

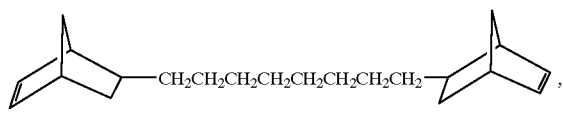 (47)

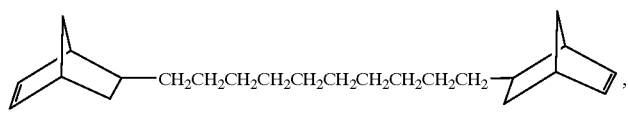 (48)

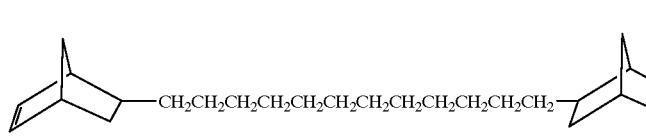 (49)

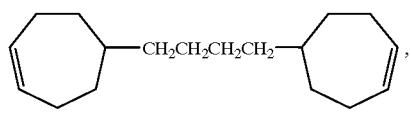 (50)

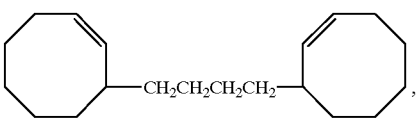 (51)

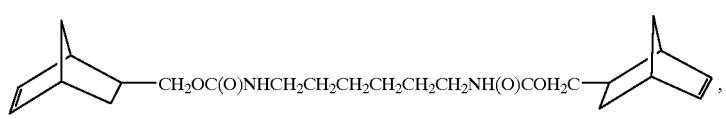 (52)

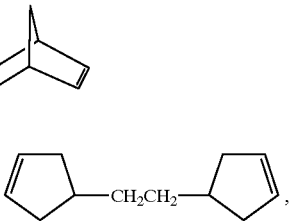 (53)

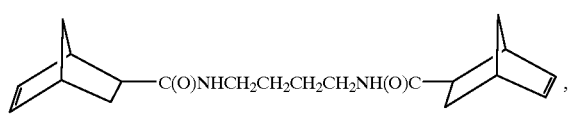 (54)

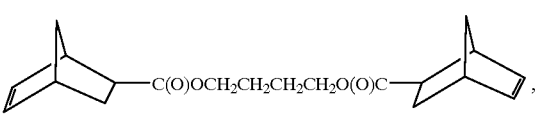 (55)

(56)

(57)
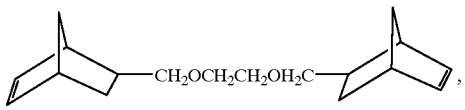,

(58)
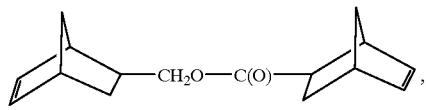,

(59)
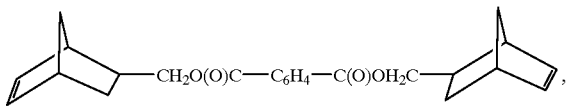,

(60)
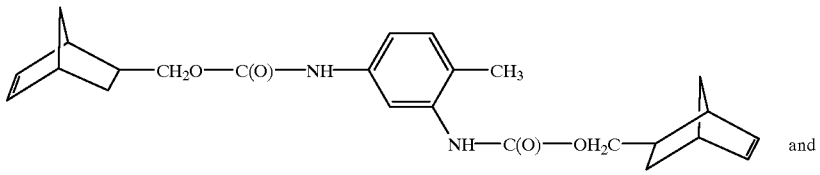 and

(61)
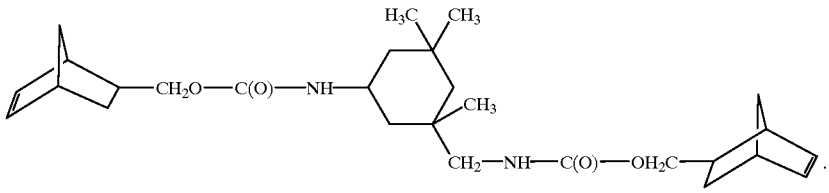.

The compounds of the formula (f1) with a bridge group of the formula (f5) which is a pure hydrocarbon bridge are obtainable, for example, by means of a Diels-Alder reaction of a cyclic diene with a linear or branched aliphatic diene (see also EP-287,762), substance mixtures which are either further processed directly or separated beforehand by means of customary methods often being formed. Compounds of the formula (f1) with a bridge group of the formula (f5) in which $X_5$ and $X_6$ are not a direct bond are obtainable from the corresponding halides or dihalides, alcohols or diols, amines or diamines, carboxylic acids or dicarboxylic acids, or isocyanates or diisocyanates, via etherification, esterification or amidation reactions in a manner known per se.

Possible trivalent bridge groups are, for example, those of the formula (f6):

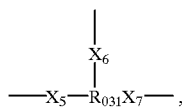,                        (f6)

in which $X_5$, $X_6$ and $X_7$ are —O—, —CH$_2$-O—, —C(O)O—, —O(O)C—, —CH$_2$—O(O)C—, —C(O)—NR$_{029}$—, —R$_{029}$N—(O)C—, —NH—C(O)—NR$_{029}$—, —O—C(O)—NH—, —CH$_2$—O—C(O)—NH— or —NH—C(O)—O—, and $R_{031}$ is a trivalent aliphatic hydrocarbon radical having 3 to 20, preferably 3 to 12 C atoms, a trivalent cycloaliphatic radical which has 3 to 8, preferably 5 or 6 ring C atoms and is unsubstituted or substituted by $C_1$-$C_4$alkyl or $C_1$-$C_4$alkoxy, or a trivalent aromatic radical having 6 to 18, preferably 6 to 12 C atoms, which is unsubstituted or substituted by $C_1$-$C_4$alkyl or $C_1$-$C_4$alkoxy, a trivalent araliphatic radical having 7 to 19, preferably 7 to 12 C atoms, which is unsubstituted or substituted by $C_1$-$C_4$alkyl or $C_1$-$C_4$alkoxy, or a trivalent heteroaromatic radical having 3 to 13 C atoms and 1 to 3 heteroatoms from the group consisting of —O—, —N— and —S—, which is unsubstituted or substituted by $C_1$-$C_4$alkyl or $C_1$-$C_4$alkoxy, and $R_{031}$ is H or $C_1$-$C_6$alkyl.

In a preferred embodiment, $X_5$, $X_6$ and $X_7$ are —O—, —CH$_2$—O—, —C(O)O—, —O(O)C—, —CH$_2$—O(O)C—, —C(O)—NR$_{029}$—, —O—C(O)—NH— or —CH$_2$—O—C(O)—NH—.

Preferred radicals $R_{031}$ are derived, for example, from triols, such as glycerol, trimethylolpropane, butanetriol, pentanetriol, hexanetriol, trihydroxycyclohexane, trihydroxybenzene and cyanuric acid; triamines, such as diethylenetriamine; tricarboxylic acids, such as cyclohexanetricarboxylic acid or trimellitic acid; and triisocyanates, such as benzene triisocyanate or cyanuric triisocyanate.

Some examples of compounds of the formula (f1) with a trivalent bridge group are:

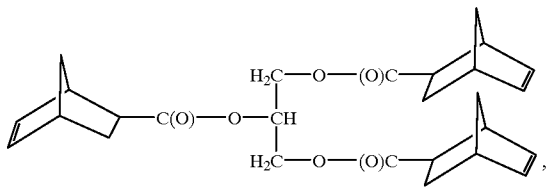

(62)

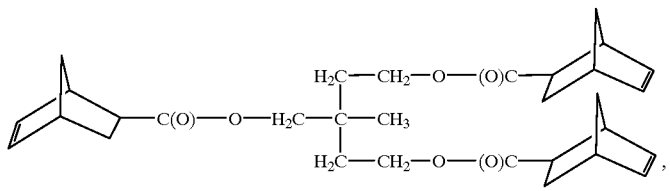

(63)

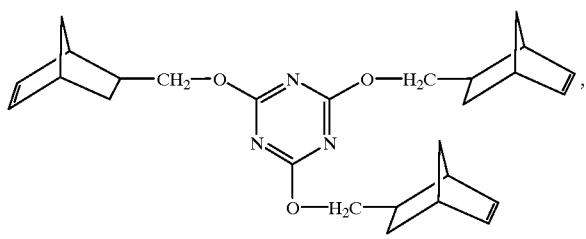

(64)

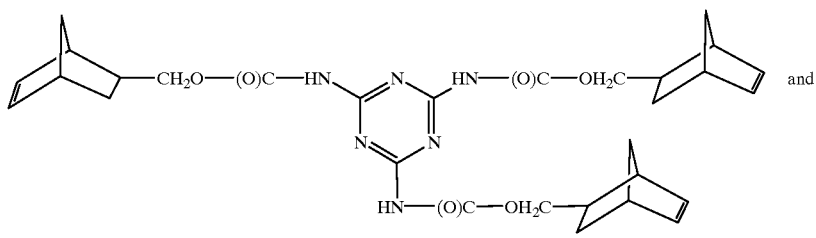

(65)

and

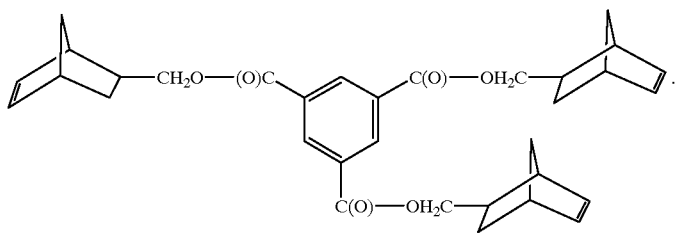

(66)

Possible tetravalent bridge groups are, for example, those of the formula (f7):

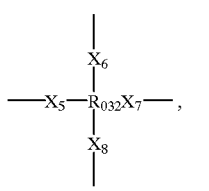

(f7)

in which $X_5$, $X_6$, $X_7$ and $X_8$ are —C(O)O—, —CH$_2$—O(O)C— or —C(O)—NR$_{029}$—, and $R_{032}$ is a tetravalent aliphatic hydrocarbon radical having 4 to 20, preferably 4 to 12 C atoms, a tetravalent cycloaliphatic radical having 4 to 8, preferably 5 or 6 ring C atoms, which is unsubstituted or substituted by $C_1$–$C_4$alkyl or $C_1$–$C_4$alkoxy, or a tetravalent aromatic radical having 6 to 18, preferably 6 to 12 C atoms, which is unsubstituted or substituted by $C_1$–$C_4$alkyl or $C_1$–$C_4$alkoxy, a tetravalent araliphatic radical having 7 to 19, preferably 7 to 12 C atoms, which is unsubstituted or substituted by $C_1$–$C_4$alkyl or $C_1$–$C_4$alkoxy, or a tetravalent heteroaromatic radical having 3 to 13 C atoms and 1 to three heteroatoms from the group consisting of —O—, —N— and —S—, which is unsubstituted or substituted by $C_1$–$C_4$alkyl or $C_1$–$C_4$alkoxy, and $R_{029}$ is H or $C_1$–$C_6$alkyl.

Some examples of tetrafunctional compounds from which $R_{032}$ can be derived are pentaerythritol, pyromellitic acid and 3,4,3',4'-biphenyltetracarboxylic acid.

Preparation methods which can be used are the same methods as for the preparation of the abovementioned compounds with a di- or trivalent radical.

Examples of compounds of the formula (f1) with a tetravalent bridge group are:

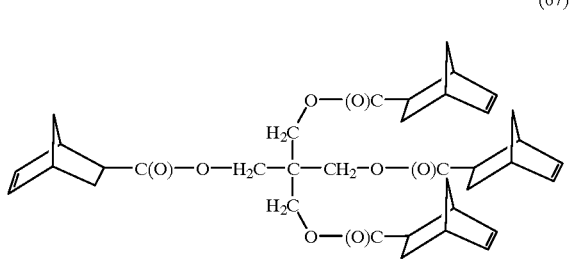
(67)

and

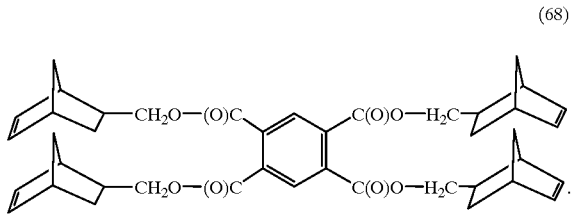
(68)

Polyols, such as dipentaerythritol or hexahydrohexane, which can be reacted with corresponding cycloolefinmonocarboxylic acids, may be mentioned as an example of compounds which are more than tetravalent and from which the bridge group can be derived.

Polymers and comonomers which contain only carbon and hydrogen are particularly preferred according to the invention. Norbornene is especially preferably contained as a comonomer in amounts of, for example, 20 to 60% by weight.

The comonomeric cycloolefins can be contained in an amount of 0.01 to 99% by weight, preferably 0.1 to 95% by weight, particularly preferably 1 to 90% by weight, and especially preferably 5 to 80% by weight, based on the polymers and monomers present in the composition.

The composition according to the invention can comprise solvents, especially if it is used for the production of coatings.

Suitable inert solvents are, for example, protic-polar and aprotic solvents, which can be used alone or in mixtures of at least two solvents. Examples are: ethers (dibutyl ether, tetrahydrofuran, dioxane, ethylene glycol monomethyl or dimethyl ether, ethylene glycol monoethyl or diethyl ether, diethylene glycol diethyl ether and triethylene glycol dimethyl ether), halogenated hydrocarbons (methylene chloride, chloroform, 1,2-dichlorethane, 1,1,1-trichlorethane and 1,1,2,2-tetrachlorethane), carboxylic acid esters and lactones (ethyl acetate, methyl propionate, ethyl benzoate, 2-methoxyethyl acetate, γ-butyrolactone, δ-valerolactone and pivalolactone), carboxylic acid amides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone and N-methylcaprolactam), sulfoxides (dimethyl sulfoxide), sulfones (dimethyl sulfone, diethyl sulfone, trimethylene sulfone and tetramethylene sulfone), tertiary amines (N-methylpiperidine and N-methylmorpholine), aliphatic and aromatic hydrocarbons, for example petroleum ether, pentane, hexane, cyclohexane, methylcyclohexane, benzene or substituted benzenes (chlorobenzene, o-dichlorobenzene, 1,2,4-trichlorobenzene, nitrobenzene, toluene and xylene) and nitriles (acetonitrile, propionitrile, benzonitrile and phenylacetonitrile). Preferred solvents are aprotic polar and non-polar solvents.

The choice of solvents depends chiefly on the properties of the one-component catalysts, which must not be deactivated by the solvents used. Ruthenium and osmium catalysts can be used together with polar protic solvents, for example water or alkanols. These catalysts are also insensitive to air, oxygen and moisture, and corresponding crosslinkable compositions can be processed without particular protective measures. In the case of the other one-component catalysts, the exclusion of oxygen and moisture is advisable. The compositions are stable to storage, storage in the dark being advisable because of the sensitivity to light.

The composition according to the invention can comprise formulation auxiliaries and additions to improve the physical or mechanical properties. The compounds mentioned above as solvents are suitable as such substances. Known auxiliaries are stabilizers, for example antioxidants and light stabilizers, plasticizers, dyes, pigments, thixotropic agents, viscosity improvers, antistatics, lubricants and mould release auxiliaries.

The compositions accord mg to the invention can be polymerized even if they also comprise fillers or reinforcing fillers in relatively large amounts. They can comprise these fillers in amounts of 0.1 to 90% by weight, preferably 0.5 to 80% by weight, more preferably 1 to 70% by weight, particularly preferably 5 to 60% by weight, and especially preferably 10 to 50% by weight, based on the monomers present.

Suitable reinforcing fillers are, in particular, those having a length to width ratio of at least 2. These are often fibrous or needle-shaped fillers. Some examples are fibres of plastics, carbon fibres, glass fibres, silicatic fibres, such as asbestos, whisker and wood fibres.

Suitable fillers are, for example, metal powders, wood flour, glass powders, glass beads, semimetal and metal oxides, for example $SiO_2$ (aerosils and quartz), corundum and titanium oxide, semimetal and metal nitrides, for example silicon nitride, boron nitride and aluminium nitride, semimetal and metal carbides, metal carbonates (dolomite and $CaCO_3$), metal sulfates (barite and gypsum), rock powders and naturally occurring or synthetic minerals, chiefly from the silicate series, for example talc, wollastonite, bentonite and others.

Catalytic amounts for the one-component catalyst in the context of the present invention preferably means an amount of 0.001 to 20 mol %, more preferably 0.01 to 15 mol %, particularly preferably 0.01 to 10 mol %, and especially preferably 0.01 to 5 mol %, based on the amount of monomer. Because of the high photocatalytic activity in ruthenium and osmium catalysts containing phosphene groups, amounts of 0.001 to 2% by weight are especially preferred in this case.

The compositions according to the invention advantageously comprise the novel thermal and/or photochemical one-component catalysts below:

1. Heat-stable ruthenium or osmium compounds which can be activated by radiation and have at least one photolabile ligand bonded to the ruthenium or osmium atom, the remaining coordination sites thereof being satisfied by non-photolabile ligands.

Heat stability in the context of the invention means that the photocatalytically active metal compounds form no active species for the ring-opening metathesis polymerization when heated. For example, at room temperature to slightly elevated temperature, such as about +40° C., the catalyst can initiate no ring-opening metathesis polymerization with exclusion of light in the course of weeks. Only an insignificant amount of monomer (less than 0.2% by weight) is reacted during this period. The heat stability can be determined, for example, by storing a toluene solution with 20% by weight of monomer and 0.33% by weight of metal catalyst in the dark at 50° C. for 96 hours, and any amount of polymer formed, detectable from a buildup in viscosity and quantitatively determinable by precipitation in a precipitant, for example ethanol, filtration and drying, is not more than 0.5% by weight, and preferably not more than 0.2% by weight.

Organic or inorganic compounds, atoms or ions which are coordinated onto a metal centre are designated as ligands for the ruthenium and osmium compounds to be used according to the invention.

Photolabile ligand in the context of the present invention means that when the catalyst is irradiated by light in the visible or ultraviolet spectral range, the ligand dissociates from the catalyst and forms a catalytically active species for the metathesis polymerization. Nonionic photolabile ligands are preferred according to the invention.

The photolabile ligands can be, for example, nitrogen ($N_2$), monocyclic, polycyclic or fused areas having 6 to 24, preferably 6 to 18, and particularly preferably 6 to 12 C atoms, which are unsubstituted or substituted by OH, $C_1$–$C_4$alkyl, $C_1$–$C_4$alkoxy, $C_6$–$C_{12}$aryl or halogen, or monocyclic heteroarenes, fused heteroarenes or fused arene-heteroarenes having 3 to 22, preferably 4 to 16, and in particular 4 to 10 C atoms and 1 to 3 heteroatoms chosen from the group consisting of O, S and N, which are unsubstituted or substituted by $C_1$–$C_4$alkyl, $C_1$–$C_4$alkoxy or halogen; or aliphatic, cycloaliphatic, aromatic or araliphatic nitriles having 1 to 22, preferably 1 to 18, particularly preferably 1 to 12, and especially preferably 1 to 7 C atoms, which are unsubstituted or substituted by $C_1$–$C_4$alkyl, $C_1$–$C_4$alkoxy or halogen. The preferred substituents are methyl, ethyl, methoxy, ethoxy, fluorine, chlorine and bromine. The arenes and heteroarenes are preferably substituted by one or two radicals, and particularly preferably are unsubstituted. Among the heteroarenes, the electron-rich heteroarenes are preferred. The arenes and heteroarenes can be both π- and σ-bonded; in the last case, they are then the corresponding aryl and heteroaryl radicals. The aryl preferably contains 6 to 18, particularly preferably 6 to 12 C atoms. The heteroaryl preferably contains 4 to 16 C atoms.

Some examples of arenes and heteroarenes are benzene, p-cumene, biphenyl, naphthalene, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazines, thianthrene and purine. Preferred arenes and heteroarenes are benzene, naphthalene, thiophene and benzothiophene. The arene is especially preferably benzene and the heteroarene is especially preferably thiophene.

The nitriles can be substituted, for example by methoxy, ethoxy, fluorine or chlorine; the nitriles are preferably unsubstituted. The alkylnitriles are preferably linear. Some examples of nitriles are acetonitrile, propionitrile, butyronitrile, pentylnitrile, hexylnitrile, cyclopentyl- and cyclohexylnitrile, benzonitrile, methylbenzonitrile, benzylnitrile and naphthylnitrile. The nitriles are preferably linear $C_1$–$C_4$alkylnitriles or benzonitrile. Of the alkylnitriles, acetonitrile is particularly preferred.

In a preferred sub-group, the photolabile ligands are $N_2$, unsubstituted or $C_1$–$C_4$alkyl-mono- to -trisubstituted benzene, thiophene, benzonitrile or acetonitrile.

Non-photolabile ligand (also called highly coordinating ligand) in the context of the present invention means that when the catalyst is irradiated in the visible or near-ultraviolet spectral range, the ligand does not dissociate or dissociates to only an insignificant extent from the catalyst.

The non-photolabile ligands can be solvating inorganic and organic compounds which contain the heteroatoms O, S or N and are often also used as solvents, or cyclopentadienyl or indenyl which are unsubstituted or substituted by $C_1$–$C_4$alkyl, $C_1$–$C_4$alkoxy, $(C_1$–$C_4$alkyl$)_3$Si or $(C_1$–$C_4$alkyl)$_3$SiO—. Examples of such compounds are $H_2O$, $H_2S$ and $NH_3$; halogenated or unhalogenated, in particular fluorinated or chlorinated, aliphatic or cycloaliphatic alcohols or mercaptans having 1 to 18, preferably 1 to 12, and particularly preferably 1 to 6 C atoms, aromatic alcohols or thiols having 6 to 18, preferably 6 to 12 C atoms, and araliphatic alcohols or thiols having 7 to 18, preferably 7 to 12 C atoms; aliphatic, cycloaliphatic, araliphatic or aromatic ethers, thioethers, sulfoxides, sulfones, ketones, aldehydes, carboxylic acid esters, lactones, optionally N—$C_1$–$C_4$mono- or -dialkylated carboxylic acid amides having 2 to 20, preferably 2 to 12, and in particular 2 to 6 C atoms and optionally N—$C_1$–$C_4$alkylated lactams; aliphatic, cycloaliphatic, araliphatic or aromatic, primary, secondary and tertiary amines having 1 to 20, preferably 1 to 12, and particularly preferably 1 to 6 C atoms; and substituted or unsubstituted cyclopentadienyls, for example cyclopentadienyl, indenyl and mono- or polymethylated or trimethylsilylated cyclopentadienyls or indenyls.

Examples of such non-photolabile ligands are methanol, ethanol, n- and i-propanol, n-, i- and t-butanol, 1,1,1-trifluoroethanol, bistrifluoromethylmethanol, tristrifluoromethylmethanol, pentanol, hexanol, methyl- or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n- or di-t-butyl ether, tetrahydrofuran, tetrahydropyran, dioxane, diethyl thioether, tetrahydrothiophene, dimethyl sulfoxide, diethyl sulfoxide, tetra- and pentamethylene sulfoxide, dimethyl sulfone, diethyl sulfone, tetra- and pentamethylene sulfone, acetone, methyl ethyl ketone, diethyl ketone, phenyl methyl ket one, methyl isobutyl ketone, benzyl methyl ketone, acetaldehyde, propionaldehyde, trifluoroacetaldehyde, benz-aldehyde, ethyl acetate, butyrolactone, dimethylformamide, dimethylacetamide, pyrrolidone and N-methylpyrrolidone, indenyl, cyclopentadienyl, methyl- or dimethyl- or pentamethylcyclopentadienyl and trimethylsilylcyclopentadienyl.

The primary amines can be those of the formula $R_{25}NH_2$, the secondary amines those of the formula $R_{25}R_{26}NH$ and the tertiary amines those of the formula $R_{25}R_{26}R_{27}N$, in which $R_{25}$ is $C_1$–$C_{18}$alkyl, $C_5$- or $C_6$cycloalkyl which is unsubstituted or substituted by $C_1$–$C_4$alkyl or $C_1$–$C_4$alkoxy, or $C_6$–$C_{18}$aryl or $C_7$–$C_{12}$aralkyl which are unsubstituted or substituted by $C_1$–$C_4$alkyl or $C_1$–$C_4$alkoxy, $R_{26}$ independently has the meaning of $R_{25}$, or $R_{25}$ and $R_{26}$ together are tetramethylene, pentamethylene, 3-oxa-1,5-pentylene or —$CH_2$—$CH_2$—NH—$CH_2$—$CH_2$— or —$CH_2$—$CH_2$—N($C_1$–$C_4$alkyl)-$CH_2$—$CH_2$—, $R_{25}$ and $R_{26}$ independently of one another have the abovementioned meanings, and $R_{27}$ independently has the meaning of $R_{25}$. The alkyl preferably contains 1 to 12, and particularly preferably 1 to 6 C atoms. The aryl preferably contains 6 to 12 C atoms and the aralkyl preferably contains 7 to 9 C atoms. Examples of amines are methyl-, dimethyl-, trimethyl-, ethyl-, diethyl-, triethyl-, methylethyl-, dimethylethyl, n-propyl-, di-n-propyl-, tri-n-butyl-, cyclohexyl-, phenyl- and benzylamine, and pyrrolidone, N-methylpyrrolidine, piperidine, piperazine, morpholine and N-methylmorpholine.

In a preferred sub-group, the non-photolabile ligands are $H_2O$, $NH_3$ and unsubstituted or partly or completely fluorinated $C_1$–$C_4$alkanols. $H_2O$, $NH_3$, cyclopentadienyl, methanol and ethanol are especially preferred.

The ruthenium and osmium compounds to be used according to the invention can be mono- or polynuclear, for example those having two or three metal centres. The metal atoms can be bonded here via a bridge group or metal-metal bonds. Among the compounds with a plurality of metal centres, those of the formula VIIIa or VIIIb:

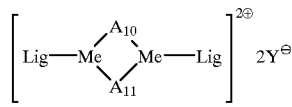

(VIIIa)

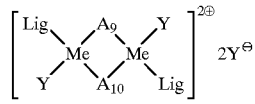

(VIIIb)

in which Lig is a photolabile ligand and Me is Ru or Os, $A_9$, $A_{10}$ and $A_{11}$ are a divalent bridge group, and Y is a monovalent non-coordinating anion, are preferred. The bridge group is preferably ionic, and particularly preferably a halide, especially preferably chloride, bromide or iodide. The photolabile ligand is preferably identical or different arenes, and Y can be the anions listed below, and especially chloride, bromide or iodide. An example of such complexes is $(C_6H_6)ClRu(Cl)_2Ru(C_6H_6)Cl$.

Preferred catalysts according to the invention correspond to the formula IX:

$$[(Me^{+n})(L_1^{z1})_m(L_2^{z2})_o(L_3^{z3})_p(L_4^{z4})_q(L_5^{z5})_r(L_6^{z6})_s](L_7^{z7})_t \quad (IX)$$

in which
  Me is ruthenium or osmium;
  n is 0, 1, 2, 3, 4, 5, 6, 7 or 8;
  $L_1$ is a photolabile ligand;
  $L_2$, $L_3$, $L_4$, $L_5$ and $L_6$ independently of one another are a non-photolabile or a photolabile ligand;
  m is 1, 2, 3, 4, 5 or 6;
  o, p, q, r and s independently of one another are 0, 1, 2, 3, 4 or 5;
  $z_1$, $z_2$, $z_3$, $z_4$, $z_5$, $z_6$ and $z_7$ independently of one another are −2, −1, 0, +1 or +2; and
  $L_7$ is a non-coordinating cation or anion; where the sum of m+o+p+q+r+s is an integer from 2 to 6 and t is the quotient of $n+m \cdot z_1+o \cdot z_2+p \cdot z_3+q \cdot z_4+r \cdot z_5+s \cdot z_6)/z_7$.

In the formula IX, $L_7$ is preferably halogen (for example Cl, Br and I), the anion of an oxygen acid $BF_4$, $PF_6$, $SiF_6$ or $AsF_6$.

The anions of oxygen acids can be, for example, sulfate, phosphate, perchlorate, perbromate, periodate, antimonate, arsenate, nitrate, carbonate, the anion of a $C_1$–$C_8$carboxylic acid, for example formate, acetate, propionate, butyrate, benzoate, phenylacetate or mono-, di- or trichloro- or -fluoroacetate, sulfonates, for example methylsulfonate, ethylsulfonate, propylsulfonate, butylsulfonate, trifluoromethylsulfonate (triflate) or phenylsulfonate or benzylsulfonate which are unsubstituted or substituted by $C_1$–$C_4$alkyl, $C_1$–$C_4$alkoxy or halogen, in particular fluorine, chlorine or bromine, for example tosylate, mesylate, brosylate, p-methoxy- or p-ethoxyphenylsulfonate, pentafluorophenylsulfonate or 2,4,6-triisopropylsulfonate, and phosphonates, for example methylphosphonate, ethylphosphonate, propylphosphonate, butylphosphonate, phenylphosphonate, p-methylphenylphosphanate or benzylphosphonate.

Preferably, in the formula IX, Me is ruthenium, in particular $Ru^{2+}$.

A group of compounds of the formula IX which is to be singled out in particular is that in which the ligands $L_1$, $L_2$, $L_3$, $L_4$, $L_5$ and $L_6$ independently of one another are aliphatic, cycloaliphatic, aromatic or araliphatic nitriles having 1 to 22 C atoms, which are unsubstituted or substituted by $C_1$–$C_4$alkyl, $C_1$–$C_4$alkoxy or halogen, or $C_6$–$C_{18}$aryl; or $L_1$, $L_2$ and $L_3$ together are monocyclic, polycyclic or fused arenes having 6 to 24, preferably 6 to 18, and particularly preferably 6 to 12 C atoms, which are unsubstituted or substituted by —OH, $C_1$–$C_4$alkyl, $C_1$–$C_4$alkoxy, $C_6$–$C_{12}$aryl or halogen, or monocyclic heteroarenes, fused heteroarenes or fused arene-heteroarenes having 4 to 22 C atoms and 1 to 3 heteroatoms chosen from the group consisting of O, S, and N, which are unsubstituted or substituted by —OH, $C_1$–$C_4$alkyl, $C_1$–$C_4$alkoxy or halogen, and $L_4$, $L_5$ and $L_6$ together have the same meaning, or individually, independently of one another, are $N_2$ or the said nitrile or the said $C_6$–$C_{18}$aryl.

A preferred sub-group of the above compounds of the formula IX are those in which the ligands $L_1$, $L_2$, $L_3$, $L_4$, $L_5$ and $L_6$ independently of one another are $N_2$, $C_1$–$C_{20}$alkylnitrile, $C_6$–$C_{12}$arylnitrile, $C_7$–$C_{12}$aralkylnitrile, $C_6$–$C_{12}$aryl or $L_1$, $L_2$ and $L_3$ each together are the groups $A_1$ or $A_2$:

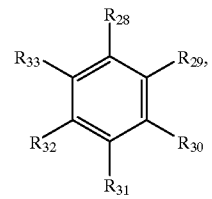

(A₁)

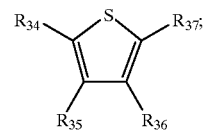

(A₂)

in which
  $R_{28}$, $R_{29}$, $R_{30}$, $R_{31}$, $R_{32}$, $R_{33}$, $R_{34}$, $R_{35}$, $R_{36}$ and $R_{37}$ independently of one another are hydrogen $C_1$–$C_{20}$alkyl, $C_1$–$C_{20}$alkoxy, aryl or $SiR_{38}R_{39}R_{40}$ where, in the case of groups $A_1$ and $A_2$ on adjacent carbon atoms, an aromatic or heteroaromatic ring, the heteroatoms of which are chosen from oxygen, sulfur and nitrogen, can be fused on; and $R_{38}$, $R_{39}$ and $R_{40}$ independently of one another are $C_1$–$C_{12}$alkyl, phenyl or benzyl, preferably $C_1$–$C_8$alkyl, phenyl or benzyl, particularly preferably $C_1$–$C_4$alkyl, phenyl or benzyl.

$L_1$, $L_2$, $L_3$, $L_4$, $L_5$ and $L_6$ independently of one another are $C_1$–$C_{12}$alkylnitrile, $C_6$–$C_{12}$arylnitrile, or $L_1$, $L_2$ and $L_3$ each together are the groups $A_1$ or $A_2$ and $L_4$, $L_5$ and $L_6$ likewise together have this meaning or each individually are $N_2$, the said nitriles or the said arene or heteroarene of the formulae $A_1$ and $A_2$, in which $R_{28}$, $R_{29}$, $R_{30}$, $R_{31}$, $R_{32}$, $R_{33}$, $R_{34}$, $R_{35}$, $R_{36}$ and $R_{37}$ independently of one another are hydrogen, $C_1$–$C_6$alkyl, $C_1$–$C_6$alkoxy, $SiR_{38}R_{39}R_{40}$ or phenyl, where, in the case of the groups $A_1$ and $A_2$ on adjacent carbon atoms, a benzene ring can be fused on, and $R_{38}$, $R_{39}$ and $R_{40}$ are methyl, ethyl or phenyl.

In an especially preferred embodiment of the process according to the invention, the catalyst used is that of the formula IX, in which $L_1$, $L_2$, $L_3$, $L_4$, $L_5$ and $L_6$ independently of one another are methylnitrile, ethylnitrile or phenylnitrile, or $L_1$, $L_2$ and $L_3$ each together are the groups $A_1$ or $A_2$ and $L_4$, $L_5$ and $L_6$ likewise together have this meaning or each individually are the said nitriles, in which $R_{28}$, $R_{29}$, $R_{30}$, $R_{31}$, $R_{32}$, $R_{33}$, $R_{34}$, $R_{35}$, $R_{36}$ and $R_{37}$ independently of one another are hydrogen, methyl, methoxy or phenyl, where, in the case of the groups $A_1$ and $A_2$ on adjacent carbon atoms, a benzene ring can be fused on.

Another particularly preferred sub-group of the compounds of the formula IX are those in which $L_1$, $L_2$ and $L_3$ together are monocyclic, polycyclic or fused arenes having 6 to 24, preferably 6 to 18, and particularly preferably 6 to 12 C atoms, which are unsubstituted or substituted by $C_1$–$C_4$alkyl, $C_1$–$C_4$alkoxy, $C_6$–$C_{12}$aryl or halogen, or monocyclic heteroarenes, fused heteroarenes or fused areneheteroarenes having 4 to 22, preferably 4 to 16, and in particular 4 to 10 C atoms and 1 to 3 heteroatoms chosen from the group consisting of O, S and N, which are unsubstituted or substituted by $C_1$–$C_4$alkyl, $C_1$–$C_4$alkoxy or halogen, and $L_4$, $L_5$ and $L_6$ is a non-photolabile ligand, the previous preferred meanings also applying here.

In this sub-group, $L_1$, $L_2$ and $L_3$ are preferably benzene or naphthalene, and the non-photolabile ligand is preferably $H_2O$, $NH_3$, $C_1$–$C_4$alkanol or -alkanethiol which are unsubstituted or substituted by fluorine, aliphatic ethers, thioethers, sulfoxides or sulfones having 2 to 8 C atoms, dimethylformamide or N-methylpyrrolidone.

In another preferred sub-group of compounds of the formula X, the compounds are ruthenium and osmium compounds of the formula X:

$$[L_1Me(L_8)_5]^{2\square}[Y_1^x]_{2/x} \qquad (X),$$

in which $L_1$ is a photolabile ligand and $L_8$ is a non-photolabile ligand, Me is Ru or Os, $Y_1$ is a non-coordinating anion and x is the numbers 1, 2 or 3. For the photolabile ligands, non-photolabile ligands, Me and $Y_1$, the abovementioned preferred meanings apply. Particularly preferably, $L_1$ is $N_2$ or a nitrile, for example $C_1$–$C_4$alkylnitrile (acetonitrile), benzonitrile or benzylnitrile, $L_8$ is $NH_3$ or an amine having 1 to 12 C atoms, $Y_1$ is a non-coordinating anion and x is the number 1 or 2.

Catalysts which are particularly suitable for the present invention are (tos is tosylate and tis is 2,4,6-triisopropylphenylsulfonate): $Ru(CH_3CN)_6(tos)_2$, $Ru(CH_3CH_2CN)_6(tos)_2$, $Ru(CH_3CN)_6(CF_3SO_3)_2$, $Ru(CH_3CH_2CN)_6(CF_3SO_3)_2$, $Ru(C_6H_6)_2(tos)_2$, $[Ru(C_6H_6)(C_6H_5OCH_3)](BF_4)_2$, $[Ru(C_6H_6)(C_6H_5i$-propyl$)](BF_4)_2$, $[Ru(C_6H_6)(1,3,5$-trimethylphenol$)](BF_4)_2$, $[Ru(C_6H_6)$(hexamethylbenzene)$](BF_4)_2$, $[Ru(C_6H_6)$(biphenyl)$](BF_4)_2$, $[Ru(C_6H_6)$(chrysene)$](BF_4)_2$, $[Ru(C_6H_6)$(naphthalene)$]$ $(BF_4)_2$, $[Ru$(cyclopentadienyl)(4-methylcumyl)$]PF_6$, $[Ru$(cyanophenyl)$_6](tos)_2$, $[Ru$(cyanophenyl)$_6](CF_3SO_3)_2$, $[Ru(C_6H_6)$(tetramethylthiophene)$_3](tos)_2$, $[Ru(C_6H_6)(CH_3CN)_3](tos)_2$, $[Ru(C_6H_6)$(tetramethylthiophene)$_3](CF_3SO_3)_2$ and $[Ru(C_6H_6)(CH_3CN)_3](CF_3SO_3)_2$, $[Ru(C_6H_6)(CH_3OH)_3]$ $(tos)_2$, $[Ru$(cumene)$(CH_3OH)_3](tis)_2$, $[Os(NH_3)_5N_2](PF_6)_2$, $[Ru(NH_3)_5N_2](PF_6)_2$, $[Ru(NH_3)_5(CH_3CN)]BF_4$, $[Ru(C_6H_6(NH_3)_3](tis)_2$, $[Ru(C_6H_6$(tetrahydrothiophene)$_3](CF_3SO_3)_2$, $[Ru((CH_3)_2S)_3C_6H_6](tos)_2$, $[Ru$(dimethylsulfoxide)$_3C_6H_6]$ $(PF_6)_2$, $[Ru$(dimethylformamide)$_3C_6H_6](PF_6)_2$, $[Ru(C_6H_6)Cl_2]_2$ and $[Os(C_6H_6)Cl_2]_2$.

Ruthenium and osmium catalysts to be used according to the invention are either known and in some cases commercially obtainable, or can be prepared analogously to known processes. Such catalysts and their preparation are described, for example, in Gilkerson and Jackson [Gilkerson, W. R., Jackson, M. D., J. Am. Chem. Soc. 101:4096–411 (1979)], Bennett and Matheson [Bennett, M. A., Matheson, T. W., J. Organomet. Chem. 175:87–93 (1979)], Bennett and Smith [Bennett, M. A., Smith, A. K., J. C. S. Dalton Trans. 233–24 (1974)] and Luo et al. [Luo, S., Rauchfuss, T. B., Wilson, S. R., J. Am. Chem. Soc. 114:8515–8520 (1992)].

2. Heat-stable molybdenum(VI) or tungsten(VI) compounds which can be activated by heat or with radiation and have at least two methyl groups or two monosubstituted methyl groups bonded to the metal, the substituent containing no hydrogen atom in the α-position.

The other valencies of the molybdenum- and tungsten are preferably satisfied by heat-stable neutral ligands, a very large number of which are known. The number of neutral ligands can even exceed the stoichiometrically possible number (solvates). Heat stability has been explained above. At temperatures above 50° C., for example 60 to 300° C., these molybdenum and tungsten compounds are also activated by heat.

The molybdenum and tungsten compounds to be used according to the invention can be those which contain one metal atom, or two metal atoms bonded via a single, double or triple bond. The methyl group or monosubstituted methyl group bonded to the metal is bonded at least twice, particularly preferably two to six times, and especially preferably two to four times, as a ligand. This ligand preferably is that of the formula XI:

$$\text{—CH}_2\text{—R} \qquad (XI),$$

in which R is H, $-CF_3$, $-SiR_{38}R_{39}R_{40}$, $-CR_{41}R_{42}R_{43}$ or $C_6$–$C_{16}$aryl or $C_4$–$C_{15}$heteroaryl having 1 to 3 heteroatoms from the group consisting of O, S and N, which are unsubstituted or substituted by $C_1$–$C_6$alkyl or $C_1$–$C_6$alkoxy; and $R_{41}$, $R_{42}$ and $R_{43}$ independently of one another are $C_1$–$C_{10}$alkyl, which is unsubstituted or substituted by $C_1$–$C_{10}$alkoxy, or $R_{41}$ and $R_{42}$ have this meaning and $R_{43}$ is $C_6$–$C_{10}$aryl or $C_4$–$C_9$heteroaryl, which is unsubstituted or substituted by $C_1$–$C_6$alkyl or $C_1$–$C_6$alkoxy; and $R_{38}$, $R_{39}$ and $R_{40}$ have the abovementioned meanings.

Alkyl $R_{38}$ to $R_{43}$ can be linear or branched and preferably contain 1 to 8, and particularly preferably 1 to 4 C atoms. Aryl $R_{38}$ to $R_{43}$ is preferably phenyl or naphthyl.

Aryl R in formula XI is preferably phenyl or naphthyl. Heteroaryl R in formula XI is preferably pyridinyl, furanyl, thiophenyl or pyrrolyl.

Preferred substituents for $R_{38}$ to $R_{43}$ in the context of the definitions are methyl, ethyl, methoxy and ethoxy. Examples of the radicals $R_{38}$ to $R_{43}$ have been given above.

In a preferred embodiment, the group R in formula XI is H, —C(CH$_3$)$_3$, —(CH$_3$)$_2$C$_6$H$_5$, phenyl which is unsubstituted or substituted by methyl, ethyl, methoxy or ethoxy, —CF$_3$ or —Si(CH$_3$)$_3$.

The other valencies of the Mo(VI) and W(VI) atoms may be satisfied by identical or different ligands from the group consisting of =O, =N—R$_{44}$, secondary amines having 2 to 18 C atoms, R$_{45}$O—, R$_{45}$S—, halogen, substituted or unsubstituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen; and R$_{44}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen.

Secondary amines are preferably those of the formula R$_{46}$R$_{47}$N—, in which R$_{46}$ and R$_{47}$ independently of one another are linear or branched C$_1$–C$_{18}$alkyl; C$_5$- or C$_6$cycloalkyl; benzyl or phenylethyl which are unsubstituted or substituted by C$_1$–C$_6$alkoxy, or halogen, or (C$_1$–C$_6$alkyl)$_3$Si; or R$_4$e and R$_{47}$ together are tetramethylene, pentamethylene or 3-oxapentane-1,5-diyl. The alkyl preferably contains 1 to 12, and particularly preferably 1 to 6 C atoms. Some examples are dimethyl-, diethyl-, di-n-propyl-, di-i-propyl-, di-n-butyl-, methylethyl-, dibenzyl-, benzylmethyl-, diphenyl-, phenyl-methylamino and di(trimethylsilyl) amino.

Halogen as a ligand or substituent is preferably F or Cl and particularly preferably Cl.

The cyclopentadienyl can be unsubstituted or substituted by one to five C$_1$–C$_4$alkyl, in particular methyl, or —Si(C$_1$–C$_4$alkyl), in particular —Si(CH$_3$)$_3$. Bridged cyclopentadienyls are, in particular, those of the formula R$_{48}$—A—R$_{48}$, in which R$_{48}$ is cyclopentadienyl which is unsubstituted or substituted by one to five C$_1$–C$_4$alkyl, in particular methyl, or —Si(C$_1$–C$_4$alkyl), in particular —Si(CH$_3$)$_3$, and A is —CH$_2$—, —CH$_2$—CH$_2$—, —Si(CH$_3$)$_2$—, —Si(CH$_3$)$_2$—Si(CH$_3$)$_2$— or —Si(CH$_3$)$_2$—O—Si(CH$_3$)$_2$—.

Ethers as neutral ligands can be dialkyl ethers having 2 to 8 C atoms or cyclic ethers with 5 or 6 ring members. Some examples are diethyl ether, methyl ethyl ether, diethyl ether, di-n-propyl ether, di-i-propyl ether, di-n-butyl ether, ethylene glycol dimethyl ether, tetrahydrofuran and dioxane.

Nitriles as neutral ligands can be aliphatic or aromatic nitriles having 1 to 12, preferably 1 to 8 C atoms. Some examples are acetonitrile, propionitrile, butyinitrile, benzonitrile and benzylnitrile.

Tertiary amines and phosphines as neutral ligands can be those having 3 to 24, preferably 3 to 18 C atoms. Some examples are trimethylamine and -phosphine, triethylamine and -phosphine, tri-n-propylamine and -phosphine, tri-n-butylamine and -phosphine, triphenylamine and -phosphine, tricyclohexylamine and -phosphine, phenyidimethylamine and -phosphine, benzyldimethylamine and -phosphine, 3,5-dimethylphenyl-dimethylamine and -phosphine.

The tridentate monoanionic ligands can be, for example, hydro(tris-pyrazol-1-yl)borates or alkyl(trispyrazol-1-yl)borates, which are unsubstituted or substituted by one to three C$_1$–C$_4$alkyl [see Trofimenko, S., Chem. Rev., 93:943–980 (1993)], or [C$_5$(R'$_5$)Co(R$_{50}$R$_{51}$P=O)$_3$]$^-$, in which R' is H or methyl and R$_{50}$ and R$_{51}$ independently of one another are C$_1$–C$_4$alkyl, C$_1$–C$_4$alkoxy or phenyl [see Kläui, W., Angew. Chem. 102:661–670 (1990)].

Halogen as a substituent for the radicals R$_{44}$ and R$_{45}$ is preferably fluorine, and particularly preferably chlorine. The substituents alkyl, alkoxy or alkoxy in alkoxymethyl or -ethyl preferably contain 1 to 4, and in particular 1 or 2 C atoms. Examples are methyl, ethyl, n- and i-propyl, n-, i- and t-butyl, methoxy, ethoxy, n- and i-propyloxy and n-, i- and t-butyloxy.

Alkyl R$_{44}$ and R$_{45}$ preferably contain 1 to 12, particularly preferably 1 to 8, and especially preferably 1 to 4 C atoms. The alkyl is preferably branched alkyl. Some examples of R$_{44}$ are methoxy, ethoxy, n- and i-propyloxy, n-, i- and t-butyloxy, hexafluoro-i-propyloxy and hexa- and perfluorobutyloxy.

Some examples of substituted phenyl and benzyl R$_{44}$ and R$_{45}$ are p-methylphenyl or benzyl, p-fluoro- or p-chlorophenyl or -benzyl, p-ethylphenyl or -benzyl, p-n- or i-propylphenyl or -benzyl, p-i-butylphenyl or -benzyl, 3-methylphenyl or -benzyl, 3-i-propylphenyl or -benzyl, 2,6-dimethylphenyl or -benzyl, 2,6-di-i-propylphenyl or -benzyl, 2,6-di-n- or -t-butylphenyl and -benzyl. R$_{45}$ is particularly preferably phenyl which is unsubstituted or substituted by C$_1$–C$_4$alkyl or C$_1$–C$_4$alkoxy.

In a preferred embodiment, the molybdenum and tungsten compounds are those, in particular, of one of the formulae XII to XIIc:

(XII)

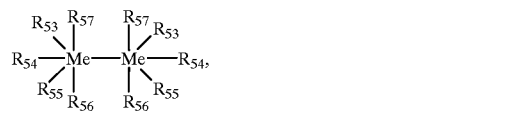

(XIIa)

(XIIb)

(XIIc)

in which
Me is Mo(VI) or W(VI);
at least two, preferably 2 to 4, of the radicals R$_{53}$ to R$_5$8 are a radical —CH$_2$—R of the formula XI, in which R has the abovementioned meanings;
in each case two of the other radicals of R$_{53}$ to R$_{58}$ are =O or =N—R$_{44}$, and R$_{44}$ has the abovementioned meanings; and/or the other radicals of $R_{53}$ to $R_{58}$ are secondary amino having 2 to 18 C atoms, $R_{45}O$— or $R_{45}S$—, halogen, cyclopentadienyl or bridged biscyclopentadienyl or a neutral ligand, in which $R_{45}$ has the abovementioned meanings. For the radicals R, $R_{44}$ and $R_{45}$, the abovementioned preferred meanings apply.

In a particularly preferred embodiment, molybdenum or tungsten compounds of the formula XII which are employed in the composition according to the invention are those in which a) $R_{53}$ to $R_{58}$ are a radical of the formula XI —$CH_2$—R, or b) $R_{53}$ and $R_{54}$ are a radical of the formula XI —$CH_2$—R, $R_{55}$ and $R_{56}$ together are the radical =N—$R_{44}$, and $R_{57}$ and $R_{58}$ together independently of one another are $R_{45}$—O— or halogen, or c) $R_{53}$ and $R_{54}$ together and $R_{55}$ and $R_{56}$ together are the radical =N—$R_{44}$, and $R_{57}$ and $R_{58}$ are a radical of the formula XI —$CH_2$—R, in which R, $R_{44}$ and $R_{45}$ have the above meanings. For R, $R_{44}$ and $R_{45}$, the above preferred meanings apply.

Particularly preferred compounds of the formula XIIc are those in which $R_{53}$, $R_{54}$ and $R_{55}$ are a radical of the formula XI, the radical of the formula XI particularly preferably being —$CH_2$—$Si(C_1$-$C_4alkyl)_3$.

Molybdenum or tungsten compounds which are especially preferably used in the composition according to the invention are those of the formulae XII, XIIIa or XIIIb:

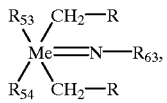

(XIII)

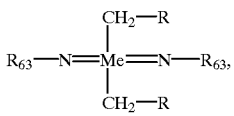

(XIIIa)

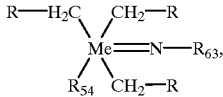

(XIIIb)

in which

Me is Mo(VI) or W(VI),

R is H, —$C(CH_3)_3$, —$C(CH_3)_2$—$C_6H_5$, —$C_6H_5$ or —Si$(C_1$-$C_4alkyl)_3$, $R_{63}$ is phenyl or phenyl which is substituted by 1 to 3 $C_1$-$C_4$alkyl or $C_1$-$C_4$alkoxy, $R_{53}$ is linear or branched $C_1$-$C_4$alkoxy which is unsubstituted or substituted by fluorine, and $R_{54}$ has the same meaning as $R_{53}$ or is F, Cl or Br. $R_{53}$ is particularly preferably branched alkoxy, which is unsubstituted or partly or completely substituted by F, for example i-propyloxy, i- and t-butyloxy, hexafluoropopyloxy and nonafluoropropyloxy. $R_{54}$ is preferably Cl.

Some examples of molybdenum and tungsten compounds are:

$Mo_2[CH_2Si(CH_3)_3]_6$, W(=N—$C_6H_5$)(OC$(CH_3)_3$)(Cl)[$(CH_2Si(CH_3)_3)$]$_2$,

W(=N—$C_6H_5$)(OC$(CH_3)(CF_3)_2$)$_2$($CH_2Si(CH_3)_3$)$_2$,

Mo(=N-3,5-diisopropyl$C_6H_5$)$_2$[$(CH_2C(CH_3)_2$—$C_6H_5$)]$_2$,

Mo(=N-3,5-diisopropyl$C_6H_5$)$_2$[$(CH_2$—$C_6H_5$)]$_2$,

Mo(=N-3,5-dimethyl$C_6H_5$)$_2$[$(CH_2$—$C_6H_5$)]$_2$,

Mo(=N-3,5-dimethyl$C_6H_5$)$_2$($CH_3$)$_2$(tetrahydrofuran).

[$(CH_3)_3SiCH_2$]$_3$Mo≡Mo[$CH_2Si(CH_3)_3$]$_3$, W(=N$C_6H_5$)[$CH_2Si(CH_3)_3$]$_3$Cl.

The molybdenum and tungsten catalysts to be used according to the invention are known or can be prepared by known and analogous processes starting from the metal halides by means of Grignard reactions [see, for example, Huq, F., Mowat, W., Shortland, A., Skapski, A. C., Wilkinson, G., J. Chem. Soc., Chem. Commun. 1079–1080 (1971) or Schrock, R. R., Murdzeck, J. S., Bazan, G. C., Robbins, J., DiMare, M., O'Regan, M., J. Am. Chem. Soc., 112:3875–3886 (1990)].

3. Heat-stable titanium(IV), niobium(V), tantalum (V), molybdenum(VI) or tungsten(VI) compounds in which a silylmethyl group and at least one halogen are bonded to the metal. These one-component catalysts are particularly photocatalytically active.

The titanium(IV), niobium(V) and tantalum(V) compounds to be used according to the invention are those which contain one metal atom. The molybdenum(VI) and tungsten (VI) compounds to be used according to the invention can be those which contain one metal atom, or two metal atoms bonded via a single, double or triple bond. The other valencies of the titanium, niobium, tantalum, molybdenum and tungsten are preferably satisfied by heat-stable neutral ligands, the definition of heat stability having been given above. The halogen bonded to the metal atom is preferably F, Cl, Br and I, more preferably F, Cl and Br, and particularly preferably F or Cl. The silylmethyl ligand is preferably that of the formula XIV:

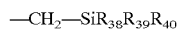

(XIV), in which $R_{38}$, $R_{39}$ and $R_{40}$ independently of one another are $C_1$-$C_{18}$alkyl, $C_5$- or $C_6$cycloalkyl, or phenyl or benzyl which are unsubstituted or substituted by $C_1$-$C_6$alkyl or $C_1$-$C_6$alkoxy.

Alkyl $R_{38}$ to $R_{40}$ can be linear or branched and preferably contains 1 to 12, particularly preferably 1 to 8, and in particular 1 to 4 C atoms. The particularly preferred alkyl is methyl and ethyl.

Preferred substituents for phenyl and benzyl $R_{38}$ to $R_{40}$ in the context of the definitions are methyl, ethyl, methoxy and ethoxy.

In a preferred embodiment $R_{38}$ to $R_4$ in the group of formula XIV are $C_1$-$C_4$alkyl, phenyl or benzyl.

Some examples of the group of the formula XIV are —$CH_2$—$Si(CH_3)_3$, —$CH_2$—$Si(C_2H_5)_3$, —$CH_2$—Si(n-$C_3H_7$)$_3$, —$CH_2$—Si(n-$C_4H_9$)$_3$, —$CH_2$—$Si(CH_3)_2$(n-$C_4H_9$), —$CH_2$—$Si(CH_3)_2$(t-$C_4H_9$), —$CH_2$—$Si(CH_3)_2$($C_2H_5$), —$CH_2$—$Si(CH_3)_2$[$C(CH_3)_2CH(CH_3)_2$], —$CH_2$—$Si(CH_3)_2$(n-$C_{12}H_{26}$), —$CH_2$—$Si(CH_3)_2$(n-$C_{18}H_{37}$), —$CH_2$—Si($C_6H_5$)$_3$, —$CH_2$—Si($CH_2$—$C_6H_5$)$_3$, —$CH_2$—Si($C_6H_5$)($CH_3$)$_2$ and —$CH_2$—Si($CH_2$—$C_6H_5$)($CH_3$)$_2$. —$CH_2$—Si($CH_3$)$_3$ is especially preferred.

The other valencies of the Ti(IV), Nb(V), Ta(V), Mo(VI) and W(VI) atoms may be satisfied by identical or different neutral ligands, for example selected from the group consisting of =O, =N—$R_{44}$, secondary amines having 2 to 18 C atoms, $R_{45}O$—, $R_{45}S$—, halogen, substituted or unsubstituted cyclopentadienyl, bridged biscyclopentadienyl, tridentate monoanionic ligands and neutral ligands, for example ethers, nitriles, CO and tertiary phosphines and amines, in which the $R_{45}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl or halogen; and $R_{44}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$-alkyl)amino-$C_1$–$C_3$alkyl or halogen, or benzyl or phenylethyl, which are unsubstituted or substituted by $C_1$–$C_6$alkyl, $C_1$–$C_6$alkoxy, $C_1$–$C_6$alkoxymethyl, $C_1$–$C_6$alkoxyethyl or halogen, with the proviso that in the case of the titanium compounds, the ligand is not $=O$ or $=N$—$R_{44}$.

The meanings and preferred meanings of $R_{44}$ and $R_{45}$, of secondary amines, of halogen as further ligand on the metal atoms or as substituent, of cyclopentadienyl, ethers, nitriles, tertiary amines and phosphines as neutral ligands and of tridentate monoanionic ligands have been given above. The meanings and preferred meanings of alkyl, alkoxy or alkoxy as substituent in alkoxymethyl or -ethyl have likewise been given above.

In a preferred embodiment, the metal compounds are those, in particular, of the formulae XV, XVa or XVb:

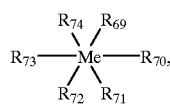
(XV)

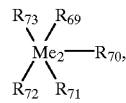
(XVa)

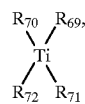
(XVb)

in which
Me$_1$ is Mo(VI) or W(VI);
Me$_2$ is Nb(V) or Ta(V);
one of the radicals $R_{69}$ to $R_{74}$ is a radical —CH$_2$—SiR$_{38}$R$_{39}$R$_{40}$ of the formula XIV;
at least one of the radicals $R_{69}$ to $R_{74}$ F, Cl or Br;
$R_{38}$, $R_{39}$ and $R_{40}$ independently of one another are $C_1$–$C_6$alkyl, $C_5$- or $C_6$cycloalkyl, or phenyl or benzyl which are unsubstituted or substituted by $C_1$–$C_6$alkyl or $C_1$–$C_6$alkoxy;
in formula XV two or in each case two, and in formula XVa two of the other radicals of $R_{69}$ to $R_{74}$ each together are $=O$ or $=N$—$R_{44}$, and $R_{44}$ is linear or branched $C_1$–$C_{18}$alkyl which is unsubstituted or substituted by $C_1$–$C_6$alkoxy, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, and the other radicals are secondary amino having 2 to 18 C atoms, $R_{45}$O— or $R_{45}$S—, halogen, unsubstituted or substituted cyclopentadienyl or bridged biscyclopentadienyl or a neutral ligand, in which the $R_{45}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$-alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$-alkyl)amino-$C_1$–$C_3$alkyl or halogen; or in the formulae XV, XVa and XVb, the other radicals independently of one another are secondary amino having 2 to 18 C atoms, $R_{45}$O— or $R_{45}$S—, halogen, unsubstituted or substituted cyclopentadienyl or bridged biscyclopentadienyl or a neutral ligand, in which the $R_{45}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$-alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$-alkyl)amino, di($C_1$–$C_6$-alkyl)amino-$C_1$–$C_3$-alkyl or halogen.

For the radicals $R_{69}$ to $R_{74}$, the abovementioned preferred meanings apply.

In a particularly preferred embodiment, metal compounds of the formulae XV, XVa or XVb which are used in the process according to the invention are those in which
$R_{69}$ is a radical of the formula XIV —CH$_2$—SiR$_{38}$R$_{39}$R$_{40}$ and $R_{70}$ is F, Cl or Br; and
(a) in formula XV $R_{71}$ and $R_{72}$, and $R_{73}$ and $R_{74}$ in each case together are the radical $=N$—$R_{44}$, or $R_{71}$ and $R_{72}$ together are the radical $=N$—$R_{44}$, and $R_{73}$ and $R_{74}$ independently of one another are unsubstituted or substituted cyclopentadienyl, $R_{45}$—O— or halogen, or
b) in formula XVa $R_7$, and $R_{72}$ together are the radical $=N$—$R_{44}$, and $R_{44}$ is unsubstituted or substituted cyclopentadienyl, $R_{45}$—O— or halogen, or in formula XVa $R_{71}$, $R_{72}$ and $R_{73}$ independently of one another are unsubstituted or substituted cyclopentadienyl, $R_{45}$—O— or halogen, or
c) in formula XVb $R_{71}$ and $R_{72}$ independently of one another are unsubstituted or substituted cyclopentadienyl, $R_{45}$—O— or halogen,
in which $R_{38}$ to $R_{44}$ have the above meanings. For $R_{38}$, $R_{39}$, $R_{40}$, $R_{44}$ and $R_{45}$, the above preferred meanings apply.

Metal compounds which are especially preferably used in the process according to the invention are those of the formulae XVI, XVIa, XVIb, XVIc or XVId:

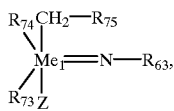
(XVI)

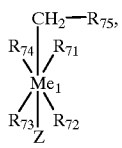
(XVIa)

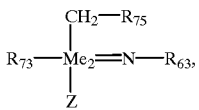
(XVIb)

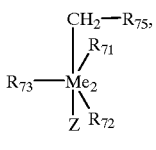
(XVIc)

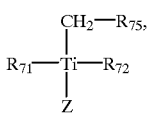
(XVId)

in which
- $Me_1$ is Mo(VI) or W(VI);
- $Me_2$ is Nb(V) or Ta(V);
- $R_{75}$ is —Si($C_1$–$C_4$alkyl)$_3$;
- Z is F, Cl or Br;
- $R_{63}$ is phenyl or phenyl which is substituted by 1 to 3 $C_1$–$C_4$alkyl or $C_1$–$C_4$alkoxy,
  - (a) $R_{73}$ and $R_{74}$ in formula XVI together are the group =$NR_{63}$ or individually independently of one another are F, Cl, Br, linear or branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;
  - (b) $R_{71}$, $R_{72}$, $R_{73}$ and $R_{74}$ in formula XVIa independently of one another are F, Cl, Br, linear or, in particular, branched $C_1$–$C_4$-alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;
  - (c) $R_{73}$ in formula XVIb is F, Cl, Br, linear or branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl;
  - (d) $R_{71}$, $R_{72}$ and $R_{73}$ in formula XVIc independently of one another are Fl, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl; and
  - (e) $R_{71}$ and $R_{72}$ in formula XVId independently of one another are F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl. The alkoxy is particularly preferably branched alkoxy, which is optionally partly or completely substituted by F, for example i-propyloxy, i- and t-butyloxy, hexafluoropopyloxy and nonafluoropropyloxy. The phenyloxy radical is, in particular, phenyloxy substituted in the 2,6-positions by $C_1$–$C_4$alkyl, for example 2,6-dimethylphenyloxy. Examples of substituted cyclopentadienyl radicals are mono- to pentamethylcyclopentadienyl and trimethylsilylcyclopentadienyl. $R_{63}$ is preferably phenyl or phenyl which is substituted by $C_1$–$C_4$alkyl, in particular phenyl, 3,5-dimethyl-, 2,6-dimethyl-, 3,5-diethyl- and 2,6-diethylphenyl.

Especially preferred compounds in the process according to the invention are those of the formulae XVII, XVIIa, XVIIb, XVIIc and XVIId:

$(R_{63}—N=)_2Me_1X_a CH_2Si(CH_3)_3$ (XVII), $(R_{63}—N=)R_{71}Me_1X_a(OR_{62})CH_2Si(CH_3)_3$ (XVIIa), $R_{72}R_{73}Me_2X_a(OR_{62})CH_2Si(CH_3)_3$ (XVIIb), $R_{63}—N=Me_2X_a(OR_{62})CH_2Si(CH_3)_3$ (XVIIc), $R_{71}—TiX_a(OR_{62})CH_2Si(CH_3)_3$ (XVIIId), in which
- $Me_1$ is Mo(VI) or W(VI);
- $Me_2$ is Nb(V) or Ta(V);
- $X_a$ is F or Cl;
- $R_{63}$ is phenyl or phenyl which is substituted by 1 or 2 $C_1$–$C_4$alkyl groups;
- $R_{62}$ is branched $C_3$- or $C_4$alkyl which is unsubstituted or partly or completely substituted by fluorine, or phenyloxy or phenyloxy which is substituted by 1 to 3 methyl or ethyl groups;
- $R_{72}$ and $R_{73}$ independently of one another are cyclopentadienyl which is unsubstituted by substituted by 1 to 5 methyl groups $X_a$ or $R_{62}O$—; and
- $R_{71}$ is cyclopentadienyl which is unsubstituted or substituted by 1 to 5 methyl groups, $X_a$ or $R_{72}O$—.

Some examples of titanium(IV), niobium(V), tantalum (V), molybdenum(VI) and tungsten(VI) compounds are [Cp is cyclpentadienyl and Me is Nb(V) or Ta(V)]:

$Cp_2Ti[CH_2Si(CH_3)_3]Cl$, $(C_6H_5O)CpTi[CH_2Si(CH_3)_3]Cl$, $Cp_2Me(CH_3)[(CH_2Si(CH_3)_3]Cl$, $(C_6H_5O)_2CpMe[(CH_2Si(CH_3)_3]Cl$, $Cp_2Ti[CH_2Si(CH_3)_3]F$, $CpTi[CH_2Si(CH_3)_3]F_2$, $(2,6-(CH_3)_2—C_6H_3O)_2Ti[CH_2Si(CH_3)_3]Cl$, $[(CH_3)_3CO]CpTi[CH_2Si(CH_3)_3]Cl$, $(2,6-(CH_3)_2—C_6H_3O)Ti[CH_2Si(CH_3)_3]_2Br$, $[(CH_3)_2CHO]_2Ti[CH_2Si(CH_3)_3]Cl$, $CpMe(OC(CH_3)(CF_3)_2]_2[(CH_2Si(CH_3)_3]Cl$, $[(CF_3)_2CHO]_2Ti[(CH_2Si(CH_3)_3]Cl$, $CpMe[OC(CH_3)(CF_3)_2]_2[(CH_2Si(CH_3)_3]Cl$, $[OC(CH_3)_3]_2Me[CH_2Si(CH_3)_3]C_{12}$, $(2,6-(CH_3)_2—C_6H_3O)CpTi[CH_2Si(CH_3)_3]Cl$, $[(CF_3)_2CHO]CpTi[(CH_2Si(CH_3)_3]Cl$, $W(=N—C_6H_5)[(OC(CH_3)_3][CH_2—Si(CH_3)_3]Cl_2$, $[(CH_3)_2CHO]CpTi[CH_2Si(CH_3)_3]Cl$, $W(=N—C_6H_5)[(OC(CH_3)_3]_2[CH_2—Si(CH_3)_3]Cl$, $Cp_2Me[OC(CH_3)_3][(CH_2Si(CH_3)_3]Cl$, $Me(=N—C_6H_5)[OCH(CH_3)_2][(CH_2Si(CH_3)_3]Cl$, $Cp_2Me[OC(CH_3)_3][CH_2Si(CH_3)_3]Cl$, $Me(=N—C_6H_5)[OCH(CF_3)_2][(CH_2Si(CH_3)_3]Cl$, $[(CF_3)_2(CH_3)CO]CpTi$

[CH$_2$Si(CH$_3$)$_3$]Cl, (=N-2,6-(CH$_3$)$_2$C$_6$H$_3$)CpMe[(CH$_2$Si(CH$_3$)$_3$)]Cl, Me[CH$_2$Si(CH$_3$)$_3$][OCH(CH$_3$)](CF$_3$O)$_2$Cl, Mo(=N-2,6-di-i-C$_3$H$_7$—C$_6$H$_3$)$_2$[CH$_2$—Si(CH$_3$)$_3$]Cl, CpMe[OC(CH$_3$)$_3$]$_2$[(CH$_2$Si(CH$_3$)$_3$]Br, CpMe[OC(CH$_3$)$_3$]$_2$[(CH$_2$Si(CH$_3$)$_3$]Cl, Me(=N-2,6-di-i-C$_3$H$_7$—C$_6$H$_3$)[(CH$_2$Si(CH$_3$)$_3$]Cl$_2$, Me(2,6-di-i-C$_3$H$_7$-phenyloxy)$_2$Me[CH$_2$Si(CH$_3$)$_3$]Cl$_2$, [(CH$_3$)$_2$CHO]$_2$Ti[CH$_2$Si(CH$_3$)$_3$]F, Mo(=N—C$_6$H$_5$)$_2$[CH$_2$—Si(CH$_3$)$_3$]Cl, Me(2,6-(CH$_3$)$_2$phenyloxy)(CH$_3$O)$_2$[(CH$_2$Si(CH$_3$)$_3$]Cl, Me(=N-2,6-di-i-C$_3$H$_7$—C$_6$H$_3$)[(CH$_3$)$_3$CO][(CH$_2$Si(CH$_3$)$_3$]Cl, CP$_2$Ti[CH$_2$Si(CH$_3$)$_3$]Br, CP$_2$Me[(CH$_2$Si(CH$_3$)$_3$]Cl$_2$, Me(=N-2,6-(CH$_3$)$_2$C$_6$H$_3$)((CF$_3$)$_2$C(CH$_3$)O)[CH$_2$Si(CH$_3$)$_3$]Cl, Me(=N-2,6-(CH$_3$)$_2$C$_6$H$_3$)(2,6-(CH$_3$)$_2$—C$_6$H$_3$O)[CH$_2$Si(CH$_3$)$_3$]Cl, CpTi[CH$_2$Si(CH$_3$)$_3$]Cl$_2$, (=N-2,6-(CH$_3$)$_2$C$_6$H$_3$)Me[2,6-(CH$_3$)$_2$C$_6$H$_3$O)][(CH$_2$Si(CH$_3$)$_3$]Cl, Ti[CH$_2$Si(CH$_3$)$_3$]Cl$_3$, Ti[CH$_2$Si(CH$_3$)$_3$]Br$_3$, Mo(=N-2,6-di-i-C$_3$H$_7$—C$_6$H$_3$)[(OCH$_2$C(CH$_3$)$_3$]$_2$[CH$_2$—Si(CH$_3$)$_3$]Cl.

The titanium, niobium, tantalum, molybdenum and tungsten compounds to be used according to the invention are known or can be prepared by known and analogous processes starting from unsubstituted or correspondingly substituted metal halides by means of Grignard reactions [Schrock, R. R., Murdzeck, J. S., Bazan, G. C., Robbins, J., DiMare, M., O'Regan, M., J. Am. Chem. Soc., 112:3875–3886 (1990)].

4. Other suitable photactive one-component catalysts are niobium(V) or tantalum(V) compounds which have at least two methyl groups or two monosubstituted methyl groups bonded to the metal, the substituent containing no hydrogen atom in the α-position. These compounds are also thermal catalysts.

The niobium(V) and tantalum(V) compounds to be used according to the invention contain one metal atom. The methyl group or monosubstituted methyl group bonded to the metal is bonded at least twice, particularly preferably two to five times, and especially preferably twice or three times as a ligand. This ligand preferably is that of the formula XI:

—CH$_2$—R (XI), in which R has the meanings and preferred meanings given above.

The other valencies of the niobium and tantalum atom are preferably satisfied by heat-stable neutral ligands, a very large number of which are known. The number of neutral ligands can even exceed the stoichiometrically possible number (solvates). The definition of heat stability has been given above.

The other valencies of the Nb(V) and Ta(V) atoms may be satisfied by identical or different neutral ligands, for example selected from the group consisting of =O, =N—R$_{44}$, secondary amines having 2 to 18 C atoms, R$_{45}$O—, R$_{45}$S—, halogen, substituted or unsubstituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$-alkoxyethyl or halogen; and R$_{44}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$-alkyl)amino, di(C$_1$–C$_6$alkyl)amino-C$_1$–C$_3$alkyl, or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl or halogen.

The meanings and preferred meanings of R$_{44}$ and R$_{45}$ of secondary amines, of halogen as further ligand on the metal atoms or as substituent, of cyclopentadienyl, ethers, nitriles, tertiary amines and phosphines as neutral ligands have been given above. The meanings and preferred meanings of alkyl, alkoxy or alkoxy as substituent in alkoxymethyl or -ethyl have likewise been given above.

In a preferred embodiment, the niobium and tantalum compounds are, in particular, those of the formula XVIII:

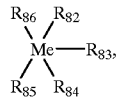

(XVIII)

in which
Me is Nb(V) or Ta(V),
at least two, preferably 2 or 3, of the radicals R$_{82}$ to R$_{86}$ are a radical —CH$_2$—R of the formula XI, in which R has the meanings and preferred meanings given above;
two of the other radicals of R$_{82}$ to R$_{86}$ together are =O or =N—R$_{44}$, and R$_{44}$ is linear or branched C$_1$–C$_{18}$alkyl which is unsubstituted or substituted by C$_1$–C$_6$alkoxy, C$_5$- or C$_6$cycloalkyl which is unsubstituted or substituted by C$_0$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$-alkyl)amino, di(C$_1$–C$_6$-alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–Cr$_6$-alkyl)amino, di(C$_1$–C$_6$alkyl)amino-C$_1$–C$_3$alkyl or halogen; and/or the other radicals of R$_{82}$ to R$_{86}$ independently of one another are secondary amino having 2 to 18 C atoms, R$_{45}$O—, R$_{45}$S—, halogen, cyclopentadienyl or bridged biscyclopentadienyl or a neutral ligand, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen.

In a particularly preferred embodiment, the niobium and tantalum compounds are those of the formula XVIII, in which
a) R$_{82}$ to R$_{86}$ are in each case a radical of the formula XI —CH$_2$—R, or
b) R$_{82}$ and R$_{83}$ are in each case a radical of the formula XI —CH$_2$—R, R$_{84}$ and R$_{85}$ together are the radical =N—R$_{44}$, and R$_{86}$ is unsubstituted or substituted cyclopentadienyl, R$_{45}$—O— or halogen, or c) R$_{82}$, R$_{83}$ and R$_{84}$ are in each case a radical of the formula XI —CH$_2$—R, and R$_{85}$ and R$_{86}$ together are the radical =N—R$_{44}$, or R$_{82}$, R$_{83}$, R$_{84}$ and R$_{85}$ are a radical of the formula XI —CH$_2$—R and R$_{86}$ is unsubstituted or substituted cyclopentadienyl, R$_{45}$—O— or halogen, in which R, R$_{44}$ and R$_{45}$ have the above meanings. For R, R$_{44}$ and R$_{45}$, the above preferred meanings apply.

Niobium and tantalum compounds which are especially preferably used in the process according to the invention are those of the formulae IXX, IXXa or IXXb:

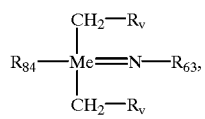
(IXX)

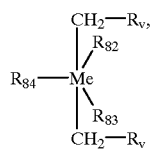
(IXXa)

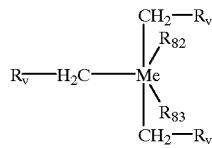
(IXXb)

in which

Me is Nb(V) or Ta(V),

R$_v$ is H, —C(CH$_3$)$_3$, —C(CH$_3$)$_2$—C$_6$H$_5$, —C$_6$H$_5$ or —Si(C$_1$–C$_4$alkyl)$_3$, R$_{63}$ is phenyl or phenyl which is substituted by 1 to 3 C$_1$–C$_4$alkyl or C$_1$–C$_4$alkoxy, R$_{84}$ in formula IXX is the group —CH$_2$—R or F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl;

R$_{82}$, R$_{83}$ and R$_{84}$ in formula IXXa independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl; and R$_{82}$ and R$_{83}$ in formula IXXb independently of one another are F, Cl, Br, linear or, in particular, branched C$_1$–C$_4$alkoxy which is unsubstituted or substituted by fluorine, phenyloxy which is unsubstituted or substituted by C$_1$–C$_4$alkyl or C$_1$–C$_4$alkoxy, or cyclopentadienyl which is unsubstituted or substituted by C$_1$–C$_4$alkyl. The alkoxy is particularly preferably branched alkoxy, which is unsubstituted or completely or partly substituted by F, for example i-propyloxy, i- and t-butyloxy, hexafluoropopyloxy and nonafluoropropyloxy.

Some examples of niobium(V) and tantalum(V) compounds are [Cp is cyclopentadienyl and Me is Nb(V) or Ta(V)]:

Cp$_2$Me[(CH$_2$C(CH$_3$)$_2$—C$_6$H$_5$)]$_3$, Me[CH$_2$Si(CH$_3$)$_3$]$_3$(OCH(CH$_3$)$_2$]$_2$, CpMe[OCH(CH$_3$)$_2$]$_2$[(CH$_2$—C$_6$H$_5$)]$_2$, CpMe[OCH(CF$_3$)$_2$]$_2$[(CH$_2$—C$_6$H$_5$)]$_2$, Cp$_2$Me[(CH$_2$Si(CH$_3$)$_3$)]$_3$, Cp$_2$Me(CH$_3$)$_2$[OC(CH$_3$)$_3$], Me(2,6-(CH$_3$)$_2$phenyloxy)$_2$(CH$_3$)$_3$, Me[CH$_2$Si(CH$_3$)$_3$]$_3$[OCH$_2$C(CH$_3$)$_3$]$_3$, Me(=N-2,6-(CH$_3$)$_2$C$_6$H$_3$[(CH$_2$—C$_6$H$_5$)]$_3$, Cp$_2$Me(CH$_3$)$_3$, Cp$_2$Me[(CH$_2$—C$_6$HS)]$_3$, Me(=N—C$_6$H$_5$)[OC(CH$_3$)$_3$][CH$_2$Si(CH$_3$)$_3$)]$_2$, Me[CH$_2$Si(CH$_3$)$_3$]$_5$, Me[CH$_2$Si(CH$_3$)$_3$]$_3$Cl$_2$, Me(=N-2,6-di-i-C$_3$H$_7$—C$_6$H$_3$)[(CH$_2$—C$_6$H$_5$)]$_3$, Me(=N-2,6-(CH$_3$)$_2$C$_6$H$_3$)[(CH$_2$—C$_6$H$_5$)]$_3$, Cp$_2$Me[3,5-(CH$_3$)$_2$C$_6$H$_3$O)][(CH$_2$Si(CH$_3$)$_3$)]$_2$, Me(2,6-di-i-C$_3$H$_7$-phenyloxy)$_2$(CH$_3$)$_3$, Me(=N—C$_6$H$_5$)(OC(CH$_3$)(CF$_3$)$_2$][(CH$_2$Si(CH$_3$)$_3$)]$_2$, CpMe[OCH(CH$_3$)$_2$]$_2$[(CH$_2$Si(CH$_3$)$_3$)]$_2$, Me(=N-2,6-di-i-C$_3$H$_7$—C$_6$H$_3$)[(CH$_2$C(CH$_3$)$_2$—C$_6$H$_5$)]$_2$Cl, Me(=N-2,6-(CH$_3$)$_2$C$_6$H$_3$)(CH$_3$)$_3$.

The niobium and tantalum compounds to be used according to the invention are known or can be prepared by known and analogous processes starting from the optionally substituted metal halides via Grignard reactions and/or substitution reactions [Schrock, R. R., Murdzeck, J. S., Bazan, G. C., Robbins, J., DiMare, M., O'Regan, M., J. Am. Chem. Soc., 112:3875–3886 (1990); Schrock, R. R., J. Am. Chem. Soc., 100:3359 (1978)].

5. Other suitable photoactive one-component catalysts are titanium(IV) compounds which contain at least two methyl groups or two monosubstituted methyl groups bonded to the metal, the substituent containing no hydrogen atom in the α-position. These compounds are also thermal catalysts.

The titanium(IV) compounds to be used according to the invention contain one metal atom. The methyl group or monosubstituted methyl group bonded to the metal is bonded at least twice, particularly preferably two to four times, and especially preferably twice or three times as a ligand. This ligand preferably is that of the formula XI:

—CH$_2$—R (XI), in which R has the meanings and preferred meanings given above.

The other valencies of the titanium atom are preferably satisfied by heat-stable neutral ligands, a very large number of which are known. The number of neutral ligands can even exceed the stoichiometrically possible number (solvates). The definition of heat stability has been given above.

The other valencies of the Ti(IV) atoms may be satisfied by identical or different neutral ligands, for example selected from the group consisting of secondary amines having 2 to 18 C atoms, R$_{45}$O—, R$_{45}$S—, halogen, substituted or unsubstituted cyclopentadienyl, bridged biscyclopentadienyl, tridentate monoanionic ligands and neutral ligands, for example ethers, nitriles, CO and tertiary phosphines and amines, in which the R$_{45}$ independently of one another are linear or branched C$_1$–C$_{18}$alkyl which is unsubstituted or substituted by C$_1$–C$_6$alkoxy or halogen, C$_5$- or C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$ alkoxyethyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$-alkoxyethyl or halogen.

The meanings and preferred meanings of R$_{45}$, of secondary amines, of halogen as further ligand on the metal atoms or as substituent, of cyclopentadienyl, ethers, nitriles, tertiary amines and phosphines as neutral ligands and of tridentate monoanionic ligands have been given above. The meanings and preferred meanings of alkyl, alkoxy or alkoxy as substituent in alkoxymethyl or -ethyl have likewise been given above.

In a preferred embodiment, the titanium(IV) compounds are, in particular, those of the formula XX:

(XX)

in which
at least two, preferably 2 or 3 of the radicals $R_{87}$ to $R_{90}$ are a radical —$CH_2$—R of the formula XI, in which R has the meanings and preferred meanings given above; and the other radicals $R_{87}$ to $R_{90}$ are secondary amino having 2 to 18 C atoms, $R_{45}O$—, $R_{45}S$—, halogen, cyclopentadienyl or bridged biscyclopentadienyl or a neutral ligand, in which the $R_{45}$ independently of one another are linear or branched $C_1$–$C_{18}$alkyl which is unsubstituted or substituted by $C_1$–$C_6$alkoxy or halogen, $C_5$- or $C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

In a particularly preferred embodiment, titanium(IV) compounds of the formula XX which are used in the process according to the invention are those in which
a) $R_{87}$ to $R_{90}$ are a radical of the formula XI —$CH_2$—R, or
b) $R_{87}$ and $R_{88}$ are a radical of the formula XI —$CH_2$—R, and $R_{89}$ and $R_{90}$ independently of one another are unsubstituted or substituted cyclopentadienyl, $R_{45}$—O— or halogen, or
c) $R_{87}$, $R_{88}$ and $R_{89}$ are a radical of the formula XI —$CH_2$—R, and $R_{90}$ is unsubstituted or substituted cyclopentadienyl, $R_{45}$—O— or halogen,
where R and $R_{45}$ have the above meanings. For R and $R_{45}$, the above preferred meanings apply.

Titanium(IV) compounds which are especially preferably used in the process according to the invention are those of the formulae XXIa or XXIb:

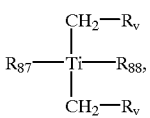

(XXIa)

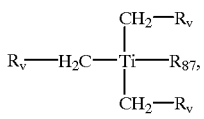

(XXIb)

in which
$R_v$ is H, —$C(CH_3)_3$, —$C(CH_3)_2$—$C_6H_5$, —$C_6H_5$ or —Si($C_1$–$C_4$alkyl)$_3$, and $R_{87}$ and $R_{88}$ independently of one another are F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl. The alkoxy is particularly preferably branched alkoxy, which is unsubstituted or partly or completely substituted by F, for example i-propyloxy, i- and t-butyloxy, hexafluoropropyloxy and nonafluoropropyloxy.

In a preferred embodiment of the invention, the titanum(IV) compounds contain a halogen atom, in particular F, Cl or Br, bonded to the titanium if the radical R in the group —$CH_2$—R is —$SiR_{38}R_{39}R_{40}$. In this case, especially preferred compounds are those of the formula XXII:

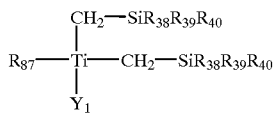

(XXII)

in which
$Y_1$ is F, Cl or Br,
$R_{38}$, $R_{39}$ and $R_{40}$ independently of one another are $C_1$–$C_{18}$alkyl, $C_5$- or $C_6$cycloalkyl or phenyl or benzyl which are unsubstituted or substituted by $C_1$–$C_6$alkyl or $C_1$–$C_6$alkoxy; and
$R_{87}$ is the group —$CH_2$—$SiR_{38}R_{39}R_{40}$, F, Cl, Br, linear or, in particular, branched $C_1$–$C_4$alkoxy which is unsubstituted or substituted by fluorine, phenyloxy which is unsubstituted or substituted by $C_1$–$C_4$alkyl or $C_1$–$C_4$alkoxy, or cyclopentadienyl which is unsubstituted or substituted by $C_1$–$C_4$alkyl. $R_{38}$, $R_{39}$ and $R_{40}$ are preferably $C_1$–$C_4$alkyl, phenyl or benzyl, and $R_{87}$ is preferably Cl, $C_3$- or $C_4$alkyl which is unsubstituted or substituted by fluorine, or phenyl or benzyl which are unsubstituted or substituted by $C_1$–$C_4$alkyl or $C_1$–$C_4$alkoxy.

Some examples of titanium(IV) compounds are [Cp is cyclopentadienyl]:

Ti[$CH_2Si(CH_3)_3$]$_4$, Ti[$OCH(CF_3)_2$]$_2$[($CH_2Si(CH_3)_3$)]$_2$, CpTi[($CH_2C(CH_3)_2$—$C_6H_5$)]$_2$Cl, CpTi[($CH_2$—$C_6H_5$)]$_3$, TiCl$_2$[$CH_2Si(CH_3)_3$)]$_2$, [$OCH(CF_3)_2$]Ti[($CH_2$—$C_6H_5$)]$_3$, CpBrTi[($CH_2C(CH_3)_2$—$C_6H_5$)]$_2$, CpTi[3,5-dimethylC$_6$H$_3$O)][($CH_2Si(CH_3)_3$]$_2$, Ti[$OCH(CH_3)_2$]$_2$[($CH_2$—$C_6H_5$)]$_2$, ClTi[$OCH(CH_3)_2$][($CH_2Si(CH_3)_3$)]$_2$, CpTi[$OCH(CF_3)_2$][($CH_2$—$C_6H_5$)]$_2$, CpTi(methyl)$_3$, CpTi(methyl)$_2$[$OCH(CH_3)_2$], Ti[$CH_2Si(CH_3)_3$]$_2$Br$_2$, Ti(2,6-dimethylphenyloxy)$_2$(CH$_3$)$_2$, Ti[$CH_2Si(CH_3)_3$]$_3$[$OCH(CH_3)$], Ti(2,6-diisopropylphenyloxy)$_2$(CH$_3$)$_2$, Cp$_2$Ti[$CH_2Si(CH_3)_3$]$_2$ and Cp$_2$Ti[$CH_2$—$C_6H_5$]$_2$.

The titanium(IV) compounds to be used according to the invention are known or can be prepared by known and analogous processes starting from the metal halides via Grignard reactions or other known substitution reactions [see Clauss, K., Bestian, H., Justus Liebigs Ann. Chem. 654:8–19 (1962)].

6. Other suitable photocatalytically active compounds are ruthenium or osmium compounds which contain at least one phosphine group, at least one photolabile ligand and optionally neutral ligands bonded to the metal atom, 2 to 5 ligands in total being bonded, and which contain acid anions for charge balancing. In total in the context of the invention means the sum of the phosphine groups, photolabile ligands and neutral ligands. The neutral ligands are also called non-photolabile ligands. Preferably 2 to 4, and particularly preferably 2 or 3 ligands are bonded in total.

The osmium compounds are also thermally active catalysts. The ruthenium compounds are thermal catalysts if the phosphine group contains no linear alkyl or alkoxy groups, but bulky groups, for example secondary and tertiary alkyl or alkoxy groups (i-propyl, i- and t-butyl), or cycloalkyl groups, or phenyl groups or pheyloxy groups which are unsubstituted or substituted by 1 to 3 $C_1$–$C_4$alkyl or -alkoxy.

The phosphine group is preferably tertiary phosphines and phosphites having 3 to 40, more preferably 3 to 30, and particularly preferably 3 to 24 C atoms.

The other valencies of the ruthenium and osmium are preferably satisfied by heat-stable neutral ligands, a very large number of which are known. The number of neutral ligands can even exceed the stoichiometrically possible number (solvates).

The ruthenium and osmium compounds to be used according to the invention can contain a monophosphine bonded one to three times, and preferably two or three times, and a diphosphine bonded once to the metal atom. Preferably 1 to 2 photolabile ligands are bonded in the ruthenium and osmium catalysts. The phosphine ligands preferably are those of the formulae XXIII and XXIIIa:

  (XXIII)

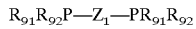  (XXIIIa)

in which $R_{91}$, $R_{92}$ and $R_{93}$ independently of one another are H, $C_1$–$C_{20}$alkyl, $C_1$–$C_{20}$alkoxy, $C_4$–$C_{12}$Cycloalkyl or cycloalkoxy which are unsubstituted or substituted by $C_1$–$C_6$alkyl, $C_1$–$C_6$haloalkyl or $C_1$–$C_6$alkoxy or $C_6$–$C_{16}$aryl or $C_6$–$C_{16}$aryloxy which are unsubstituted or substituted by $C_1$–$C_6$alkyl, $C_1$–$C_6$haloalkyl or $C_1$–$C_6$alkoxy, or $C_7$–$C_{18}$aralkyl or $C_7$–$C_{16}$aralkyloxy which are unsubstituted or substituted by $C_1$–$C_6$alkyl, $C_1$–$C_6$haloalkyl or $C_1$–$C_6$alkoxy; the radicals $R_{91}$ and $R_{92}$ together are tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy, or tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy and fused with 1 or 2 1,2-phenylene, or tetramethylenedioxyl which is unsubstituted or substituted by $C_1$–$C_6$alkyl, $C_1$–$C_6$haloalkyl or $C_1$–$C_6$alkoxy and is fused in the 1,2- and 3,4-positions with 1,2-phenylene, and $R_{93}$ has the above-mentioned meaning; and $Z_1$ is linear or branched $C_2$–$C_{12}$alkylene which is unsubstituted or substituted by $C_1$–$C_4$alkoxy, 1,2- or 1,3-cycloalkylene having 4 to 8 C atoms, which is unsubstituted or substituted by $C_1$–$C_4$alkyl or $C_1$–$C_4$alkoxy, or 1,2- or 1,3-heterocycloalkylene having 5 or 6 ring members and one heteroatom from the group consisting of O or N, which is unsubstituted or substituted by $C_1$–$C_4$alkyl or $C_1$–$C_4$alkoxy.

The radicals $R_{91}$, $R_{92}$ and $R_{93}$ are preferably identical radicals.

If $R_{91}$, $R_{92}$ and $R_{93}$ are substituted, the substituents are preferably $C_1$–$C_4$alkyl, $C_1$–$C_4$haloalkyl or $C_1$–$C_4$alkoxy. Halogen is preferably Cl, and particularly preferably F. Examples of preferred substituents are methyl, methoxy, ethyl, ethoxy and trifluoromethyl. $R_{91}$, $R_{92}$ and $R_{93}$ are preferably substituted by 1 to 3 substituents.

Alkyl $R_{91}$, $R_{92}$ and $R_{93}$ can be linear or branched and can preferably contain 1 to 12, more preferably 1 to 8, and particularly preferably 1 to 6 C atoms. Examples of alkyl are methyl, ethyl, n- and i-propyl, n-, i- and t-butyl, the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and i-propyl, n-, i- and t-butyl, 1-, 2- or 3-pentyl and 1-, 2-, 3- or 4-hexyl.

Alkoxy $R_{91}$, $R_{92}$ and $R_{93}$ can be linear or branched and can preferably contain 1 to 12, more preferably 1 to 8, and particularly preferably 1 to 6 C atoms. Examples of alkoxy are methoxy, ethoxy, n- and i-propyloxy, n-, i- and t-butyloxy, the isomers of pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy and eicosyloxy. Preferred examples are methoxy, ethoxy, n- and i-propyloxy, n-, i- and t-butyloxy, 1-, 2- or 3-pentyloxy and 1-, 2-, 3- or 4-hexyloxy.

Cycloalkyl $R_{91}$, $R_{92}$ and $R_{93}$ are preferably $C_5$–$C_8$cycloalkyl, and particularly preferably $C_5$- or $C_6$cycloalkyl. Some examples are cyclobutyl, cycloheptyl, cyclooctyl and, in particular, cyclopentyl and cyclohexyl. Examples of substituted cycloalkyl are methyl-, dimethyl-, trimethyl-, methoxy-, dimethoxy-, trimethoxy-, trifluoromethyl-, bistrifluoromethyl and tristrifluoromethyl-cyclopentyl and -cyclohexyl.

Cycloalkyloxy $R_{91}$, $R_{92}$ and $R_{93}$ are preferably $C_5$–$C_8$cycloalkyloxy, and particularly preferably $C_5$- or $C_6$cycloalkyloxy. Some examples are cyclobutyloxy, cycloheptyloxy, cyclooctyloxy and, in particular, cyclopentyloxy and cyclohexyloxy. Examples of substitued cycloalkyl are methyl-, dimethyl-, trimethyl-, methoxy-, dimethoxy-, trimethoxy-, trifluoromethyl-, bistrifluoromethyl and tristrifluoromethylcyclopentyloxy and -cyclohexyloxy.

Aryl $R_{91}$, $R_{92}$ and $R_{93}$ are preferably $C_6$–$C_{12}$aryl and particularly preferably phenyl or naphthyl. Examples of substituted aryl are methyl-, dimethyl-, trimethyl-, methoxy-, dimethoxy-, trimethoxy-, trifluoromethyl-, bistrifluoromethyl and tristrifluoromethylphenyl.

Aryloxy $R_{91}$, $R_{92}$ and $R_{93}$ are preferably $C_6$–$C_{12}$aryloxy, and particularly preferably unsubstituted or substituted phenyloxy or naphthyloxy. Examples of substituted aryloxy are methyl-, dimethyl-, trimethyl-, methylisopropyl-, isopropyl-, diisopropyl-, triisopropyl-, tert-butyl-, methyl-tert-butyl-, di-tert-butyl-, tri-tert-butyl-, methoxy-, dimethoxy-, trimethoxy-, trifluoromethyl-, bistrifluoromethyl and tristrifluoromethylphenyloxy.

Aralkyl $R_{91}$, $R_{92}$ and $R_{93}$ are preferably $C_7$–$C_{13}$aralkyl, the alkylene group in the aralkyl preferably being methylene. The aralkyl is particularly preferably benzyl. Examples of substituted aralkyl are methyl-, dimethyl-, trimethyl-, methoxy-, dimethoxy-, trimethoxy-, trifluoromethyl-, bistrifluoromethyl and tristrifluoromethylbenzyl.

Aralkyloxy $R_{91}$, $R_{92}$ and $R_{93}$ are preferably unsubstituted or substituted $C_7$–$C_{13}$aralkyloxy, the alkylene group in the aralkyloxy preferably being methylene. The aralkyloxy is particularly preferably unsubstituted or substituted benzyloxy. Examples of substituted aralkyloxy are methyl-, dimethyl-, trimethyl-, methoxy-, dimethoxy-, trimethoxy-, trifluoromethyl-, bistrifluoromethyl and tristrifluoromethyl-benzyloxy.

Examples of tetra- or pentamethylene which are bonded to the P atom and are unsubstituted or substituted or fused are:

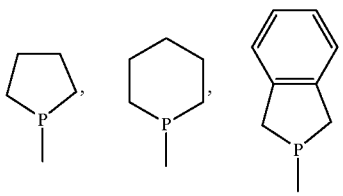

and

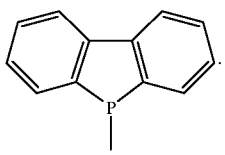

Other suitable phosphines are cycloaliphatics having 6 to 8 ring carbon atoms which are bridged with a =PRa group, for example:

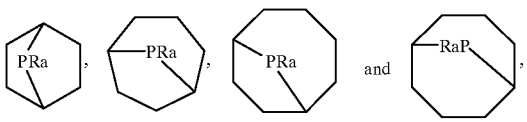

in which Ra is $C_1$–$C_6$alkyl, cyclohexyl, benzyl, or phenyl which is unsubstituted or substitued by 1 or 2 $C_1$–$C_4$alkyl.

Linear or branched alkylene $Z_1$ is preferably 1,2-alkylene or 1,3-alkylene having preferably 2 to 6 C atoms, for example ethylene, 1,2-propylene or 1,2-butylene. Examples of cycloalkylene $Z_1$ are 1,2- and 1,3-cyclopentylene and 1,2- or 1,3-cyclohexylene. Examples of heterocycloalkylene $Z_1$ are 1,2- and 1,3-pyrrolidine, 1,2- and 1,3-piperidine, and 1,2- and 1,3-tetrahydrofuran.

In a preferred embodiment, the phosphine ligands are those of the formula XXIII in which $R_{91}$, $R_{92}$ and $R_{93}$ independently of one another are H, $C_1$–$C_6$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkoxy or trifluoromethyl, or benzyl which is unsubstituted or substituted by $C_1$–$C_4$alkyl, $C_1$–$C_4$alkoxy or trifluoromethyl. Particularly preferred examples of phosphine ligands of the formula XXIII are $(C_6H_5)_3P$, $(C_6H_5CH_2)_3P$, $(C_5H_{11})_3P$, $(CH_3)_3P$, $(C_2H_5)_3P$, $(n-C_3H_7)_3P$, $(I-C_3H_7)_3P$, $(n-C_4H_9)_3P$, $(C_6H_5)_2HP$, $(C_6H_{11})_2HP$, $(C_2H_5)_2HP$, $(n-C_3H_7)_2HP$, $(i-C_3H_7)_2HP$, $(n-C_4H_9)_2HP$, $(C_6H_5)H_2P$, $(n-C_4H_9)H_2P$, $(C_6H_5CH_2)H_2P$, $(C_5H_{11})H_2P$, $(CH_3)H_2P$, $(CH_3)_2HP$, $(C_2H_5)H_2P$, $(n-C_3H_7)H_2P$, $(i-CHC_3H_7)H_2P$, $PH_3$, $(2\text{-methyl-}C_6H_4)_3P$, $(3\text{-}CH_3\text{—}C_6H_4)_3P$, $(4\text{-}C_2H_5\text{—}C_6H_4)_3P$, $(4\text{-}CH_3\text{—}C_6H_3)_3P$, $(2,6\text{-di-}CH_3\text{—}C_6H_3)_3P$, $(2\text{-}C_2H_5\text{—}C_6H_4)_3P$, $(3\text{-}C_2H_5\text{—}C_6H_4)_3P$, $(2\text{-n-}C_3H_7\text{—}C_6H_4)_3P$, $(3\text{-n-}C_3H_7\text{—}C_6H_4)_3P$, $(4\text{-n-}C_3H_7\text{—}C_6H_4)_3P$, $(2\text{-i-}C_3H_7\text{—}C_6H_4)_3P$, $(3\text{-i-}C_3H_7\text{—}C_6H_4)_3P$, $(4\text{-i-}C_3H_7\text{—}C_6H_4)_3P$, $(2\text{-n-}C_4H_9\text{—}C_6H_4)_3P$, $(3\text{-n-}C_4H_9\text{—}C_6H_4)_3P$, $(4\text{-n-}C_4H_9\text{—}C_6H_4)_3P$, $(2\text{-i-}C_4H_9\text{—}C_6H_4)_3P$, $(3\text{-i-}C_4H_9\text{—}C_6H_4)_3P$, $(4\text{-i-}C_4H_9\text{—}C_6H_4)_3P$, $(2\text{-t-}C_4H_9\text{—}C_6H_4)_3P$, $(3\text{-t-}C_4H_9\text{—}C_6H_4)_3P$, $(4\text{-t-}C_4H_9\text{—}C_6H_4)_3P$, $(2\text{-}CH_3\text{-}6\text{-t-}C_4H_9\text{—}C_6H_3)_3P$, $(3\text{-}CH_3\text{-}6\text{-t-}C_4H_9\text{—}C_6H_3)_3P$, $(3\text{-}CH_3\text{-}6\text{-t-}C_4H_9\text{—}C_6H_3)_3P$, $(2,6\text{-di-t-}C_4H_9\text{—}C_6H_3)_3P$, $(2,3\text{-di-t-}C_4H_9\text{—}C_6H_3)_3P$, $(C_6H_{11})_3P$, $(C_6H_{11})_2HP$, $(C_5H_9)P$, $(C_5H_9)_2HP$ and $(2,4\text{-di-t-}C_4H_9\text{—}C_6H_3)_3P$.

In another preferred embodiment, the phosphine ligands are those of the formula XXIII in which $R_{91}a$, $R_{92}$ and $R_{93}$ independently of one another are H, $C_1$–$C_6$alkoxy, cyclopentyloxy or cyclohexyloxy which is unsubstituted or substituted by $C_1$–$C_4$alkyl, phenyloxy or phenyl which is unsubstituted or substituted by $C_1$–$C_4$alkyl, $C_1$–$C_4$alkoxy or trifluoromethyl, or benzyloxy which is unsubstituted or substituted by $C_1$–$C_4$alkyl, $C_1$–$C_4$alkyl, $C_1$–$C_4$alkoxy or trifluoromethyl.

Examples of phosphites are $(CH_3O)_3P$, $(C_2H_5O)_3P$, $(n\text{-}C_3H_7O)_3P$, $(i\text{-}C_3H_7O)_3P$, $(n\text{-}C_4H_9O)_3P$, $(i\text{-}C_4H_9O)_3P$, $(t\text{-}C_4H_9O)_3P$, $(C_6H_5O)_3P$, $(2\text{-}CH_3\text{—}C_6H_4O)_3P$, $(3\text{-}CH_3\text{—}C_6H_4O)_3P$, $(4\text{-}CH_3\text{—}C_6H_4O)_3P$, $(2,4\text{-di-}CH_3\text{—}C_6H_3O)_3P$, $(2,6\text{-di-}CH_3\text{—}C_6H_3O)_3P$, $(2\text{-}C_2H_5\text{—}C_6H_4O)_3P$, $(3\text{-}C_2H_5\text{—}C_6H_4O)_3P$, $(4\text{-}C_2H_5\text{—}C_6H_4O)_3P$, $(2\text{-n-}C_3H_7\text{—}C_6H_4O)_3P$, $(3\text{-n-}C_3H_7\text{—}C_6H_4O)_3P$, $(4\text{-n-}C_3H_7\text{—}C_6H_4O)_3P$, $(2\text{-i-}C_3H_7\text{—}C_6H_4O)_3P$, $(3\text{-i-}C_3H_7\text{—}C_6H_4O)_3P$, $(4\text{-i-}C_3H_7\text{—}C_6H_4O)_3P$, $(2\text{-n-}C_4H_9\text{—}C_6H_4O)_3P$, $(3\text{-n-}C_4H_9\text{—}C_6H_4O)_3P$, $(4\text{-n-}C_4H_9\text{—}C_6H_4O)_3P$, $(2\text{-i-}C_4H_9\text{—}C_6H_4O)_3P$, $(3\text{-i-}C_4H_9\text{—}C_6H_4O)_3P$, $(4\text{-i-}C_4H_9\text{—}C_6H_4O)_3P$, $(2\text{-t-}C_4H_9\text{—}C_6H_4O)_3P$, $(3\text{-t-}C_4H_9\text{—}C_6H_4O)_3P$, $(4\text{-t-}C_4H_9\text{—}C_6H_4O)_3P$, $(2\text{-}CH_3\text{-}6\text{-t-}C_4H_9\text{—}C_6H_3O)_3P$, $(3\text{-}CH_3\text{-}6\text{-t-}C_4H_9\text{—}C_6H_3O)_3P$, $(3\text{-}CH_3\text{-}6\text{-t-}C_4H_9\text{—}C_6H_3O)_3P$, $(2,6\text{-di-t-}C_4H_9\text{—}C_6H_3O)_3P$, $(2,3\text{-di-t-}C_4H_9\text{—}C_6H_3O)_3P$, $(2,4\text{-di-t-}C_4H_9\text{—}C_6H_3O)_3P$, and phosphites of the formula:

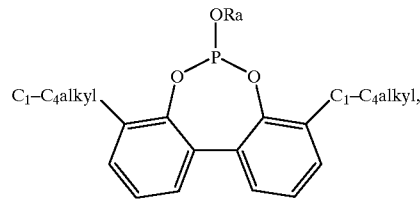

in which Ra is $C_1$–$C_6$alkyl, cyclohexyl, benzyl, or phenyl which is unsubstituted or substituted by 1 or 2 $C_1$–$C_4$alkyl.

Examples of phosphine ligands of the formula XXIIIa are $(C_6H_5)_2P(CH_2)_nP(C_6H_5)$ where n is a number from 1 to 4; $(C_6H_{11})_2P(CH_2)P(C_6H_{11})_2$ and $(CH_3)_2P(CH_2)_nP(CH_3)_2$ where n is a number from 1 to 4.

Organic or inorganic compounds, atoms or ions which are coordinated to a metal centre are designated as ligands for the ruthenium and osmium compounds to be used according to the invention.

The meanings and preferred meanings of photolabile ligands and non-photolabile ligands (also called highly coordinating ligands) have been given above.

In a preferred embodiment, the Ru and Os catalysts to be used according to the invention contain only photolabile ligands, phosphine groups and anions for charge balancing. Especially preferred are the catalysts which contain an arene group as photolabile ligands, a tertiary phosphine group and mono- or divalent anions for charge balancing.

Suitable anions of inorganic or organic acids are, for example, hydride ($H^-$), halide (for example $F^-$, $Cl^-$, $Br^-$ and $I^-$), the anion of an oxygen acid, and $BF_4^-$, $PF_6^-$, $SbF_6^-$ or $AsF_6^-$. It should be mentioned that the abovementioned cyclopentadienyl is a ligand and anion.

Other suitable anions are $C_1$–$C_{12}$-, preferably $C_1$–$C_6$-, and particularly preferably $C_1$–$C_4$alcoholates, which, in particular, are branched, for example corresponding to the formula $R_xR_yR_zC$—$O^-$, in which $R_x$ is H or $C_1$–$C_{10}$alkyl, $R_y$ is $C_1$–$C_{10}$alkyl and $R_z$ is $C_1$–$C_{10}$alkyl or phenyl, and the sum of the C atoms of $R_x$, $R_y$ and $R_z$ is 11. Examples are, in particular, i-propyloxy and t-butyloxy.

Other suitable anions are $C_3$–$C_{18}$-, preferably $C_5$–$C_{14}$- and particularly preferably $C_5$–$C_{12}$acetylides, which can correspond to the formula $R_w$—C≡$C^-$, in which $R_w$ is $C_1$–$C_{16}$alkyl, preferably α-branched $C_3$–$C_{12}$alkyl, for example of the formula $R_xR_yR_zC$—, or are phenyl or benzyl which are unsubstituted or substituted by 1 to 3 $C_1$–$C_4$alkyl or $C_1$–$C_4$alkoxy. Some examples are i-propyl-, i- and t-butyl-, phenyl-, benzyl-, 2-methyl-, 2,6-dimethyl-, 2-i-propyl-, 2-i-propyl-6-methyl-, 2-t-butyl-, 2,6-di-t-butyl- and 2-methyl-6-t-butylphenylacetylide.

The meanings and preferred meanings of anions of oxygen acids have been given above.

$H^-$, $F^-$, $Cl^-$, $Br^-$, $BF_4^-$, $PF_6^-$, $SbF_6^-$, $AsF_6^-$, $CF_3SO_3^-$, $C_6H_5$—$SO_3^-$, 4-methyl-$C_6H_5$—$SO_3^-$, 2,6-dimethyl-$C_6H_5$—$SO_3^-$, 2,4,6-trimethyl-$C_6H_5$—$SO_3^-$ and 4-$CF_3$—$C_6H_5$—$SO_3^-$ and cyclopentadienyl ($Cp^-$) are particularly preferred.

The number of the non-photolabile ligands depends on the number of the phosphine groups, the size of the non-photolabile ligands and the number of photolabile ligands.

In a preferred embodiment, the ruthenium and osmium compounds are particularly preferably those of one of the formulae XXIV to XXIVf:

$$R_{97}L_8Me^{2+}(Z^{n-})_{2/n} \qquad (XXIV),$$

$$R_{97}L_9L_{10}Me^{2+}(Z^{n-})_{2/n} \qquad (XXIVa),$$

$$(R_{97})L_9Me^{2+}(Z^{n-})_{2/n} \qquad (XXIVb),$$

$$(R_{97})L_9Me^{2+}(Z^{n-})_{2/n} \qquad (XXIVc),$$

$$R_{97}L_8L_9Me^{2+}(Z^{n-})_{2/n} \qquad (XXIVd),$$

$$R_{97}L_9L_9Me^{2+}(Z^{n-})_{2/n} \qquad (XXIVe),$$

$$R_{97}L_8L_{10}Me^{2+}(Z^{n-})_{2/n} \qquad (XXIVf),$$

in which $R_{97}$ is a tertiary phosphine of the formula XXIII or XXIIIa;

Me is Ru or Os;

n is the numbers 1, 2 or 3;

Z is the anion of an inorganic or organic acid;
(a) $L_8$ is an arene or heteroarene ligand;
(b) $L_9$ is a monovalent photolabile ligand which is different from $L_8$; and
(c) $L_{10}$ is a monovalent non-photolabile ligand.

For $R_{97}$, $L_8$, $L_9$ and $L_{10}$, the preferred meanings mentioned above for the individual meanings apply.

In the formulae XXIV to XXIVf, n is preferably 1 or 2, and especially 1. For $R_{97}$, the preferred meanings mentioned for the phosphine ligands of the formula XXIII apply, and these are, in particular, tertiary phosphines.

Ruthenium and osmium compounds which are especially preferably used in the process according to the invention are those of one of the formulae XXV to XXVf:

$$(R_{94}R_{95}R_{96}P)L_8Me^{2+}(Z^{1-})_2 \qquad (XXV),$$

$$(R_{94}R_{95}R_{96}P)L_9Me^{2+}(Z^{1-})_2 \qquad (XXVa),$$

$$(R_{94}R_{95}R_{96}P)L_9L_{10}Me^{2+}(Z^{1-})_2 \qquad (XXVb),$$

$$(R_{94}R_{95}R_{96}P)_3L_9Me^{2+}(Z^{1-})_2 \qquad (XXVc),$$

$$(R_{94}R_{95}R_{96}P)L_9L_9Me^{2+}(Z^{1-})_2 \qquad (XXVd),$$

$$(R_{94}R_{95}R_{96}P)L_8L_{10}Me^{2+}(Z^{1-})_2 \qquad (XXVe),$$

$$(R_{94}R_{95}R_{96}P)L_8(L_9)_mMe^{2+}((Z^{1-})_2 \qquad (XXVf),$$

in which

Me is Ru or Os;

Z in formulae XXV to XXVe is $H^-$, cyclopentadienyl, $Cl^-$, $Br^-$, $BF_4^-$, $PF_6^-$, $SbF_6^-$, $AsF_6^-$, $CF_3SO_3^-$, $C_6H_5$—$SO_3^-$, 4-methyl-$C_6H_5$—$SO_3^-$, 3,5-dimethyl-$C_6H_5$—$SO_3^-$, 2,4,6-trimethyl-$C_6H_5$—$SO_3^-$ and 4-$CF_3$—$C_6H_5$—$SO_3^-$ and in formula XXVf is $H^-$, cyclopentadienyl, $BF_4^-$, $PF_6^-$, $SbF_6^-$, $AsF_6^-$, $CF_3SO_3^-$, $C_6H_5$—$SO_3^-$, 4-methyl-$C_6H_5$—$SO_3^-$, 2,6-dimethyl-$C_6H_5$—$SO_3^-$, 2,4,6-trimethyl-$C_6H_5$—$SO_3^-$ or 4-$CF_3$—$C_6H_5$—$SO_3^-$;

$R_{94}$, $R_{95}$ and $R_{96}$ independently of one another are $C_1$–$C_6$alkyl, or cyclopentyl or cyclohexyl or cyclopentyloxy or cyclohexyloxy which are unsubstituted or substituted by 1 to 3 $C_1$–$C_4$alkyl, or phenyl or benzyl or phenyloxy or benzyloxy which are unsubstituted or substituted by 1 to 3 $C_1$–$C_4$alkyl;

$L_8$ is $C_6$–$C_{16}$arene or $C_5$–$C_{16}$heteroarene which are unsubstituted or substituted by 1 to 3 $C_1$–$C_4$alkyl, $C_1$–$C_4$alkoxy, —OH, —F or Cl;

$L_9$ is $C_1$–$C_6$alkyl-CN, benzonitrile or benzylnitrile; and $L_{10}$ is $H_2O$ or $C_1$–$C_6$alkanol.

Preferred arenes and heteroarenes are benzene, toluene, xylene, trimethylbenzene, naphthalene, biphenyl, anthracene, acenaphthene, fluorene, phenanthrene, pyrene, chrysene, fluoranthrene, furan, thiophene, pyrrole, pyridine, γ-pyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazole, quinoline, isoquinoline, acridine, chromene, phenazine, phenoxazine, phenothiazine, triazine, thianthrene and purine. More preferred arenes and heteroarenes are benzene, naphthalene, cumene, thiophene and benzothiophene. The arene is especially preferably benzene or a benzene substituted by $C_1$–$C_4$alkyl, for example toluene, xylene, isopropylbenzene, tert-butylbenzene or cumene, and the heteroarene is preferably thiophene.

If the preparation of the ruthenium and osmium catalysts is carried out in solvents which can coordinate to a metal atom, for example alkanols, solvated Ru/Os cation complexes can form, and these are also included in the context of the use of according to the invention.

Some examples of ruthenium and osmium compounds to be used according to the invention are [Tos is tosylate]: $(C_6H_{11})_3P$(p-cumene)$Ru(PF_6)_2(C_2H_5OH)_2$, $(CH_3)_3P$(p-cumene)$Os(Cl)_2$, $(C_6H_{11})_3P(C_{10}H_8)Ru(Tos)_2$, $(C_6H_{11})_3P$(chrysene)$Ru(Tos)_2$, $(C_6H_{11})_3P(C_6H_6)Ru(Tos)_2$, $(C_6H_{11})_3P$(p-cumene)$RuCl_2$, $(C_6H_{11})_3P$(p-cumene)$Ru(Tos)_2$, $(CH_3)_3P$(p-cumene)$Ru(Cl)_2$, $(C_6H_{11})_3P$(p-cumene)$OsCl_2$, $(C_6H_{11})_3P$(biphenyl)$Ru(Tos)_2$, $(C_6H_{11})_2HP$(p-cumene)$RuCl_2$, $(C_6H_5)_3P$(p-cumene)$Os(Cl)_2$, $[(C_6H_{11})_3P](CH_3$—$CN)_2RuCl_2$, $(C_6H_{11})_3P$(p-cumene)$Ru(Br)_2$, $(C_6H_{11})_3$(p-cumene)$Ru(BF_4)_2(C_2H_5OH)_2$, (i-$C_3H_7)_3P$(p-cumene)$Os(Cl)_2$, $[(C_6H_{11})_3P]_2Ru(CH_3$—$CN(TOS))_2$, (i-$C_3H_7)_3P$(p-cumene)$OS(Cl)_2$, (n-$C_4H_9)_3P$(p-cumene)$Ru(Cl)_2$, (i-$C_3H_7)_3P$(p-cumene)$Ru(Cl)_2$, $(C_6H_{11})_3P(CH_3$—$C_6H_5)Ru(Tos)_2$, $(C_6H_{11})_3P$(anthracene)$Ru(Tos)_2$, $(C_6H_{11})_3P$(i-$C_3H_7$—$C_6H_5)Ru(Tos)_2$ and $[(C_6H_{11})_3P]Ru(CH_3$—$CN)(C_2H_5$—$OH)(Tos)_2$.

The ruthenium and osmium compounds to be used according to the invention are known or can be prepared by known and analogous processes starting from the metal halides (for example $MeX_3$ or $[MeareneX_2]_2$ and reaction with phosphines and ligand forming agents.

7. Further suitable one-component catalysts are divalently cationic ruthenium or osmium compounds with a metal atom to which 1 to 3 tertiary phosphine ligands, in the case of ruthenium compounds with sterically bulky substituents, if desired, non-photolabile neutral ligands and anions for charge balancing are bonded, with the proviso that in ruthenium(trisphenylphosphine)dihalides or -hydride-halides the phenyl groups are substituted by $C_1$–$C_{18}$alkyl, $C_1$–$C_{18}$haloalkyl or $C_1$–$C_{18}$alkoxy.

The ruthenium and osmium compounds preferably contain 2 or 3 tertiary phosphine groups. Phosphine groups in the context of the invention are understood as meaning tertiary phophines and phosphites. The number of additional non-photolabile neutral ligands depends on the one hand on the number of phosphine and phosphite ligands, and on the other hand on the valency of the neutral ligands. Monovalent or divalent neutral ligands are preferred.

In a preferred embodiment, the divalently cationic ruthenium and osmium compounds to be used according to the invention contain 3 phosphine or phosphite groups and two monovalent anions for charge balancing; or 3 phosphine or phosphite groups, two monovalent or one divalent non-photolabile neutral ligand, and two monovalent anions for charge balancing; or 2 phosphine or phosphite groups, one monoanionic, additionally monovalent non-photolabile neutral ligands and one monovalent anion for charge balancing.

The meanings and preferred meanings of non-photolabile ligands (also called highly coordinating lignads) have been given above.

The meanings and preferred meanings of phosphine ligands have been given above. Alkyl $R_{91}$, $R_{92}$ and $R_{93}$ is particularly preferably α-branched alkyl, for example of the formula $-CR_bR_cR_d$, in which $R_b$ is H or $C_1$–$C_{12}$alkyl, $R_c$ is $C_1$–$C_{12}$alkyl, and $R_d$ is $C_1$–$C_{12}$alkyl or phenyl which is unsubstituted or substituted by $C_1$–$C_4$alkyl or $C_1$–$C_4$alkoxy, and the sum of the C atoms in the radical $-CR_bR_cR_d$ is 3 to 18. Examples of alkyl are i-propyl, i- and t-butyl, 1-methyl- or 1,1-dimethylprop-1-yl, 1-methyl- or 1,1-dimethylbut-1-yl, 1-methyl- or 1,1-dimethylpent-1-yl, 1-methyl- or 1,1-dimethylhex-1-yl, 1-methyl- or 1,1dimethylhept-1-yl, 1-methyl- or 1,1-dimethyloct-1-yl, 1-methyl- or 1,1-dimethyinon-1-yl, 1-methyl- or 1,1-dimethyldec-1-yl, 1-methyl- or 1,1-dimethylundec-1-yl, 1-methyl- or 1,1-dimethyidodec-1-yl, 1-methyl- or 1,1-dimethyltridec-1-yl, 1-methyl- or 1,1-dimethyltetradec-1-yl, 1-methyl- or 1,1-dimethylpentadec-1-yl, 1-methyl- or 1,1-dimethylhexadec-1-yl, 1-methylheptadec-1-yl, phenyl-dimethyl-methyl. Preferred examples are i-propyl, i- and t-butyl.

In the case of the osmium compounds used, $R_{91}$, $R_{92}$ and $R_{93}$ can also be linear alkyl having 1 to 18, preferably 1 to 12, more preferably 1 to 8, and particularly preferably 1 to 6 C atoms, for example methyl, ethyl, n-propyl, n-butyl, n-pentyl, n-hexyl, n-heptyl and n-octyl.

Alkoxy $R_{91}$, $R_{92}$ and $R_{93}$ can contain 3 to 12, more preferably 3 to 8, and particularly preferably 3 to 6 C atoms. The alkoxy is particularly preferably α-branched alkoxy, for example of the formula $-OCR_bR_cR_d$, in which $R_b$ is H or $C_1$–$C_{12}$alkyl, $R_c$ is $C_1$–$C_{12}$alkyl, and $R_d$ is $C_1$–$C_{12}$alkyl or phenyl which is unsubstituted or substituted by $C_1$–$C_4$alkyl or $C_1$–$C_4$alkoxy, and the sum of the C atoms in the radical $-CR_bR_cR_d$ is 3 to 18. Examples of alkoxy are i-propyloxy, I- and t-butyloxy, 1-methyl- or 1,1-dimethylprop-1-oxyl, 1-methyl- or 1,1-dimethylbut-1-oxyl, 1-methyl- or 1,1-dimethylpent-1-oxyl, 1-methyl- or 1,1-dimethylhex-1-oxyl, 1-methyl- or 1,1-dimethylhept-1-oxyl, 1-methyl- or 1,1-dimethyloct-1-oxyl, 1-methyl- or 1,1-dimethylnon-1-oxyl, 1-methyl- or 1,1-dimethyldec-1-oxyl, 1-methyl- or 1,1-dimethylundec-1-oxyl, 1-methyl- or 1,1-dimethyldodec-1-oxyl, 1-methyl- or 1,1-dimethyltridec-1-oxyl, 1-methyl- or 1,1-dimethyltetradec-1-oxyl, 1-methyl- or 1,1-dimethylpentadec-1-oxyl, 1-methyl- or 1,1dimethylhexadec-1-oxyl, 1-methylheptadec-1-oxyl, phenyl-dimethyl-methyl. Preferred examples are i-propyloxy, i- and t-butyloxy.

In the case of the osmium compounds used, $R_{91}$, $R_{92}$ and $R_{93}$ can also be linear alkoxy having 1 to 18, preferably 1 to 12, more preferably 1 to 8, and particularly preferably 1 to 6 C atoms, for example methoxy, ethoxy, n-propyloxy, n-butyloxy, n-pentyloxy, n-hexyloxy, n-heptyloxy and n-octyloxy.

Cycloalkyl $R_{91}$, $R_{92}$ and $R_{93}$ are preferably $C_5$–$C_8$cycloalkyl, and particularly preferably $C_5$- or $C_6$cycloalkyl. Some examples are cyclobutyl, cycloheptyl, cyclooctyl and in particular, cyclopentyl and cyclohexyl, which are preferably unsubstituted or substituted by 1 to 3 alkyl, haloalkyl or alkoxy groups.

Cycloalkyloxy $R_{91}$, $R_{92}$ and $R_{93}$ are preferably $C_5$–$C_8$cycloalkyloxy, and particularly preferably $C_5$- or $C_6$cycloalkyloxy. Some examples are cyclobutyloxy, cycloheptyloxy, cyclooctyloxy and, in particular, cyclopentyloxy and cyclohexyloxy, which are preferably unsubstituted or substituted by 1 to 3 alkyl, haloalkyl or alkoxy groups.

In a preferred embodiment, the phosphine ligands are those of the formula XXIII in which $R_{91}$, $R_{92}$ and $R_{93}$ independently of one another are α-branched $C_3$–$C_8$alkyl, cyclopentyl or cyclohexyl which are unsubstituted or substituted by $C_1$–$C_4$alkyl, or phenyl which is unsubstituted or substituted by $C_1$–$C_4$alkyl, $C_1$–$C_4$alkyl, $C_1$–$C_4$alkoxy or trifluoromethyl. Particularly preferred examples of phosphine ligands of the formula XXIII are $(C_6H_5)_3P$, $(C_5H_9)_3P$, $(C_6H_{11})_3P$, $(i-C_3H_7)_3P$, $(i-C_4H_9)_3P$, $(t-C_4H_9)_3P$, $[C_2H_5-CH(CH_3)]_3P$, $[C_2H_5-C(CH_3)_2]_3P$, $(2-methylphenyl)_3P$, $(2,3-dimethylphenyl)_3P$, $(2,4-dimethylphenyl)_3P$, $(2,6-dimethylphenyl)_3P$, $(2-methyl-4-i-propylphenyl)_3P$, $(2-methyl-3-i-propylphenyl)_3P$, $(2-methyl-5-i-propylphenyl)_3P$, $(2,4-di-t-butylphenyl)_3P$, $(2-methyl-6-i-propylphenyl)_3P$, $(2-methyl-3-t-butylphenyl)_3P$, $(2,5-di-t-butylphenyl)_3P$, $(2-methyl-4-t-butylphenyl)_3P$, $(2-methyl-5-i-butylphenyl)_3P$, $(2,3-di-t-butylphenyl)_3P$ and $(2,6-di-t-butylphenyl)_3P$.

In another preferred embodiment, the phosphite ligands are those of the formula XXIII in which $R_{91}$, $R_{92}$ and $R_{93}$ independently of one another are α-branched $C_3$–$C_8$alkoxy, or cyclopentyloxy or cyclohexyloxy which are unsubstituted or substituted by $C_1$–$C_4$alkyl; or phenyloxy which is unsubstituted or substituted by $C_1$–$C_4$alkyl, $C_1$–$C_4$alkoxy or trifluoromethyl. Examples of phosphites have been given above.

Examples and preferred meanings for suitable anions have been given above.

In a preferred embodiment, the ruthenium and osmium compounds are particularly preferably those of the formulae XXVI, XXVIa, XXVIb, XXVIc or XXVId:

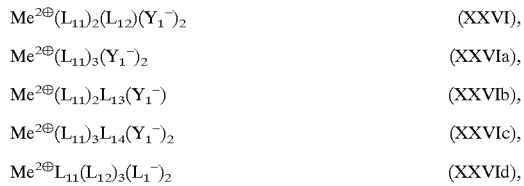

| | |
|---|---|
| $Me^{2\oplus}(L_{11})_2(L_{12})(Y_1^-)_2$ | (XXVI), |
| $Me^{2\oplus}(L_{11})_3(Y_1^-)_2$ | (XXVIa), |
| $Me^{2\oplus}(L_{11})_2L_{13}(Y_1^-)$ | (XXVIb), |
| $Me^{2\oplus}(L_{11})_3L_{14}(Y_1^-)_2$ | (XXVIc), |
| $Me^{2\oplus}L_{11}(L_{12})_3(L_1^-)_2$ | (XXVId), | in which

Me is Ru or Os;

$Y_1$ is the anion of a monobasic acid;

$L_{11}$ is a phosphine of the formula XXIII or XXIIIa, $L_{12}$ is a neutral ligand;

$L_{13}$ is cyclopentadienyl which is unsubstituted or substituted by $C_1$–$C_4$alkyl; and $L_{14}$ is CO.

For the individual meanings of $L_{11}$, $L_{12}$, $L_{13}$ and $Y_1$, the above preferred meanings apply.

In a particularly preferred embodiment, in formula XXVI $L_{12}$ is a $C_1$–$C_4$alkanol, in formula XXVIb, $Y_1$ is Cl or Br, in formula XXVIc $Y_1$ is H, and in the formulae XXVI to XXVIc $L_{11}$ is tri-i-propylphosphine, tricyclohexylphosphine, triphenylphosphine or triphenylphosphine which is substituted by 1 to 3 $C_1$–$C_4$alkyl in the phenyl groups.

Some examples of ruthenium and osmium compounds to be used according to the invention are $[(C_6H_{11})_3P]_2Ru(CH_3OH)_2(Tos)_2$, $[(C_6H_{11})_3P]_2RuCl_2$, $[(C_6H_5)_3P]_3Ru(CO)H_2$, $[(C_6H_5)_3P]_2Ru(Cp)Cl_2$, $(C_6H_{11})PRuCpCl_2$, $[(o\text{-toluoyl})_3P]_3RuCl_2$ and $[(C_6H_{11})_3P]_3Ru(CH_3OH)_2$.

The ruthenium and osmium compounds to be used according to the invention are known or can be prepared by known and analogous processes starting from the metal halides (for example $MeX_3$, $(Me(\text{diolefin})X_2]_2$ or $[Me\text{-}areneX_2]_2$ and reaction with phosphines and ligand-forming agents.

The compositions according to the invention are surprisingly stable to storage and can be marketed as such. However, it is also possible to mix the individual components together before processing. If air- and/or moisture-sensitive catalysts are used, storage with exclusion of air and moisture is advisable. Since the novel crosslinking principle is not based on a free radical, anionic or cationic reaction, practically no interruption or slowing of the reaction is observed on carrying out the polymerization in air, which offers considerable advantages during processing, for example no extensive protective precautions. The possibility of using solvent-free systems in the case of liquid polymers of low molecular weight or in the case of solutions with reactive strained cycloolefins which are capable of metathesis polymerization as comonomers is a great surprising advantage.

The invention also relates to a process for the preparation of crosslinked polymers by metathesis polymerization, wherein a composition of (a) a catalytic amount of a one-component catalyst for metathesis polymerization and (b) at least one polymer with strained cycloalkenyl radicals bonded in the polymer backbone, alone or mixed with strained cycloolefins, (c) is polymerized by heating, (d) is polymerized by irradiation, (e) is polymerized by heating and irradiation, (f) the one-component catalyst is activated by brief heating and the polymerization is brought to completion by irradiation, or (g) the one-component catalyst is activated by brief irradiation and the polymerization is brought to completion by heating.

Heating can mean a temperature of 50 to 300° C., preferably 60 to 250° C., particularly preferably 60 to 200° C., and especially preferably 60 to 150° C. The polymerization times essentially depend on the catalyst activity, and the times can extend from several seconds to minutes and hours.

In the process according to the invention, it is not necessary to maintain the irradiation of the reaction mixture over the entire duration of the reaction. Once the polymerization has been initiated photochemically, the subsequent course of the reaction takes place independently, even in the dark. The irradiation is advantageously carried out with light having a wavelength in the range from 50 nm to 1000 nm, preferably in the range from 200 nm to 500 nm and especially preferably in the UV range. The irradiation time depends on the nature of the light source. Suitable sources of irradiation are, for example, the sun, laser, X-ray and, in particular, UV radiation sources. UV lasers or UV lamps are preferably employed according to the invention. The irradiation of the catalyst can be carried out both before, during and after the addition of the monomer.

Suitable irradiation times are from one second to several hours, in particular minutes to hours. The sequence of the addition of monomers and catalysts is not critical. The monomer can be both initially introduced into the reaction vessel and added after introduction of the catalyst. Likewise, the catalyst can be pre-irradiated and then added to the monomer. It is furthermore also possible to irradiate the solution comprising catalyst and monomer.

In the case of irradiation using photoactive catalysts, the process according to the invention is preferably carried out at room temperature to slightly elevated temperature. An increase in temperature in this case essentially serves to increase the rate of reaction. At the temperatures chosen to accelerate the reaction, a photopolymerization therefore also chiefly takes place. However, it should be mentioned that the catalysts can be converted into thermoactive catalysts by adequate irradiation or elevated temperature. It is furthermore to be noted that some catalysts are capable of initiating the metathesis polymerization both thermally and irradiation.

In particular, the process according to the invention is carried out with irradiation preferably at temperatures of −20 to +110° C., particularly preferably 20 to 80° C.

The irradiation time essentially depends on the desired reaction procedure. Brief irradiation is chosen, for example, if the polymerization is only to be initiated by irradiation and is to be brought to completion by heating. This can mean an irradiation time of up to 60 seconds, preferably 5 to 60 seconds, and particularly preferably 10 to 40 seconds. A longer irradiation time is chosen, for example, if the polymerization is to be carried out chiefly with irradiation and the final polymerization is to be brought to completion only by after-heating.

A quite particular and surprising advantage of the process according to the invention is that one-component catalysts used act as thermal catalysts after the irradiation. This results in the possibility of continuing the polymerization and bringing it to completion by supplying heat after a short irradiation time, which offers economic and industrial advantages in various areas of production of shaped articles or coatings.

The present invention also relates to crosslinked metathesis polymers of a polymer with strained cycloalkenyl radicals bonded in the polymer backbone alone or as a mixture with strained cycloolefins.

The present invention also relates to metathesis polymers, crosslinked using a one-component catalyst, from a composition comprising (a) a catalytic amount of a one-component catalyst for the metathesis polymerization and (b) at least one polymer with strained cycloalkenyl radicals bonded in the polymer backbone alone or as a mixture with strained cycloolefins.

Materials for production of shaped articles by machining, or shaped articles of all types directly, as well as coatings and relief images can be produced with the process according to the invention. The invention also relates to shaped articles of crosslinked metathesis polymers of the composition according to the invention.

The polymers according to the invention can have very different properties, depending on the monomer used. Some are distinguished by a very high permeability to oxygen, low dielectric constants, good heat stability and low absorption of water. Others have outstanding optical properties, for example high transparency and low refractive indices. Furthermore, the low shrinkage is to be singled out in particular. They can therefore be used in very different industrial fields.

As layers on the surfaces of carrier materials, the compositions according to the invention are distinguished by a high adhesive strength. The coated materials are furthermore distinguished by a high surface smoothness and gloss. Among the good mechanical properties, the low shrinkage and the high impact strength are to be singled out in particular, and also the heat stability. The easy removal from the moulds during processing in moulds and the high resistance to solvents are furthermore to be mentioned.

These polymers are suitable for the production of medical equipment, implants or contact lenses; for the production of electronic components; as binders for coatings; as photocurable compositions for model construction or as adhesives for gluing substrates of low surface energy (for example Teflon, polyethylene and polypropylene, silicone rubber), and as photopolymerizable compositions in stereolithography. The compositions according to the invention can also be used for the production of coatings by photopolymerization, it being possible for on the one hand clear (transparent) and even pigmented compositions to be used. Both white and coloured pigments can be used.

The photocurable compositions according to the invention are particularly suitable for the production of protective coatings and relief images. The invention also relates to a variant of the process according to the invention for the production of coated materials or relief images on carrier materials, in which a composition according to the invention and, if desired, a solvent are applied as a layer to a carrier, for example by dipping, brushing, pouring, rolling, knife-coating or whirler coating processes, the solvent is removed, if desired, and the layer is irradiated or heated for polymerization, or the layer is irradiated through a photomask and the non-irradiated portions are then removed with a solvent. This can then also be followed by heat treatment. Using this process, surfaces of substrates can be modified or protected, or, for example, printed circuits, printing plates or printing rolls can be produced. In the production of printed circuits, the compositions according to the invention can also be employed as solder resists. Other possible uses are the production of screen printing masks and the use as radiation-curable printing inks for offset, screen and flexographic printing. Because of the high adhesion and the low absorption of water, the protective coatings on carrier materials are especially suitable for corrosion protection.

The present invention furthermore relates to a coated carrier material, which is characterized in that a layer of a composition according to the invention is applied to a substrate.

The present invention also relates to a coated substrate with a cured layer of a composition according to the invention. The exceptionally high adhesive strength of the layers, even on metal surfaces, is to be singled out in particular, even when the products are pure hydrocarbon polymers.

Suitable substrates (carrier materials) are, for example, those of glass, minerals, ceramics, plastics, wood, semimetals, metals, metal oxides and metal nitrides. The layer thicknesses essentially depend on the desired use, and can be, for example, 0.1 to 1000 $\mu$m, preferably 0.5 to 500 $\mu$m, particularly preferably 1 to 100 $\mu$m. The coated materials are distinguished by a high adhesive strength and good thermal and mechanical properties.

The coated materials according to the invention can be prepared by known methods, for example brushing, knife-coating or casting processes, such as curtain pouring or spin coating.

The compositions according to the invention can also be used as adhesives which cure by means of heat or by means of radiation, for firmly bonding the most diverse materials, it being possible for outstanding peel strengths to be achieved.

In addition to the high adhesive strengths, the outstanding processability, the good surface properties (smoothness, gloss), the high crosslinking density and the resistance to solvents and other liquids, the polymers according to the invention are also distinguished in particular by very good physico-mechanical properties, for example high heat resistance, breaking and flexural strength and impact strength, and outstanding electrical properties, for example low surface tensions and charges (very low $\epsilon$ and tan $\delta$ values). The high permeability to oxygen and the low absorption of water are furthermore to be mentioned. Polymers built up only from carbon and hydrogen are particularly valuable ecologically, since, for example, they can be incinerated by pyrrolysis or without the formation of harmful by-products. Because of their outstanding electrical properties, these polymers are particularly suitable for applications in the field of electrical engineering and electronics, in particular as insulating materials (for example coil encapsulation).

The following examples illustrate the invention in more detail.

A) Preparation of Polymers with Strained Cycloolefin Rings on the Polymer Backbone

EXAMPLE A1

Preparation of Polymers Having Structural Elements

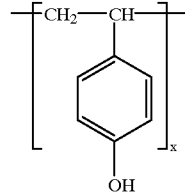

and

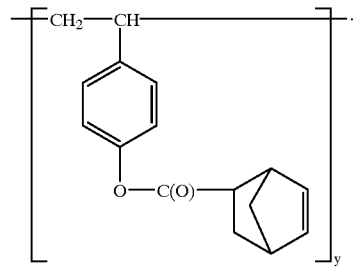

5.0 g (41.6 mmol) of poly-p-hydroxystyrene (Resin® M) are dissolved in 10 ml of water and 45.8 ml of 1 M NaOH. Then 6.5 g ((41.6 mmol) of 2-norbornene-4-carbonyl chloride are added dropwise. The precipitate formed is then filtered off, washed with water and ethanol, and subsequently dried overnight in vacuo at 50° C. Yield: 7.38 g of polymer (74%).

According to $^1$H-NMR, 60% of the phenolic groups have reacted (x=0.4 and y=0.6). Molecular weight by gel permeation chromatography (tetrahydrofuran, polystyrene standards): $M_n$=3800 g/mol; $M_w$=5700 g/mol.

EXAMPLE A2

Preparation of Polymers Having Structural Elements

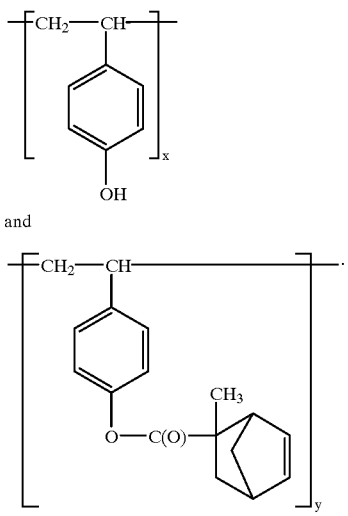

and 5.0 g (41.6 mmol) of poly-p-hydroxystyrene (Resin® M) are dissolved in 10 ml of water and 45.8 ml of 1 M NaOH. Then 7.1 g ((41.6 mmol) of 2-norbornene-4-methyl-4-carbonyl chloride are added dropwise. The precipitate formed is then filtered off, washed with water and ethanol, and subsequently dried overnight in vacuo at 50° C. Yield: 7.35 g of polymer (69.5%).

According to $^1$H-NMR, 90% of the phenolic groups have reacted (x=0.1 and y=0.9). Molecular weight by gel permeation chromatography (tetrahydrofuran, polystyrene standards): $M_n$=3700 g/mol; $M_w$=5500 g/mol.

EXAMPLE A3

Preparation of a Polymer Having Structural Elements

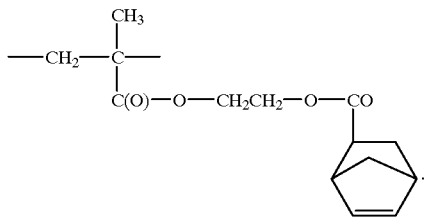

5.0 g (20 mmol) of 2-norbornene-4-ethyloxycarbonyl methacrylate are dissolved in 50 ml of dioxane, and 75 mg of azobisisobutyronitrile are added. Polymerization is then carried out under a nitrogen atmosphere at 80° C. for 24 h. The reaction mixture is allowed to cool to room temperature and then added dropwise to 500 ml of water/methanol (1:3). The precipitate is filtered off and washed first with water and then with methanol, and then dried overnight in vacuo at 50° C. Yield: 2.57 g (51.4%). $M_n$=5200 g/mol; $M_w$=10,300 g/mol.

EXAMPLE A4

Preparation of a Polymer Having Structural Elements

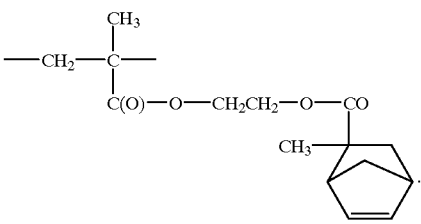

5.0 g (18.9 mmol) of 2-norbornene-4-methyl-4-ethyloxycarbonyl methacrylate are dissolved in 50 ml of dioxane, and 75 mg of azobisisobutyronitrile are added. Polymerization is then carried out under a nitrogen atmosphere at 80° C. for 24 h. The reaction mixture is allowed to cool to room temperature and then added dropwise to 500 ml of water/methanol (1:3). The precipitate is filtered off and washed first with water and then with methanol, and then dried overnight in vacuo at 50° C. Yield: 3.55 g (71%). $M_n$=8100 g/mol; $M_w$=25,100 g/mol.

EXAMPLE A5

Preparation of a Polymer Having Structural Elements

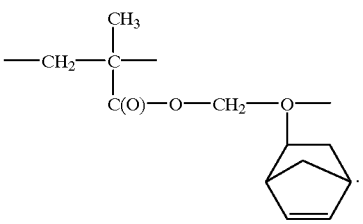

2.0 g (10.4 mmol) of 2-norbornene-4-methyl methacrylate are dissolved in 10 ml of dioxane, and 200 mg of azobisisobutyronitrile are added. Polymerization is then carried out under a nitrogen atmosphere at 80° C. for 24 h. The reaction mixture is allowed to cool to room temperature and then added dropwise to 70 ml of water/methanol (1:3). The precipitate is filtered off and washed first with water and then with methanol, and then dried overnight in vacuo at 50° C. Yield: 0.7 g (35%). $M_n$=1070 g/mol; $M_w$=2580 g/mol.

EXAMPLE A6 a) Preparation of

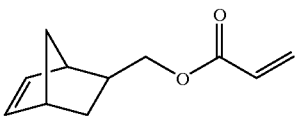

10.0 g (0.08 mol of norbornene-methanol and 5.77 g (0.08 mol) of acrylic acid are dissolved in 100 ml of methylene chloride. Then 15.51 g (0.08 mol) of dicyclohexylcarbodiamide are added, under nitrogen and with stirring, and the mixture is dried for 14 h. Cooling, filtration and concentration of filtrate in a rotary evaporator give 14.74 g of crude product which is distilled under a high vacuum. Yield: 8.46 g (59.3%). b.p.: 82° C. (7.2 mbar); $n_D^{20}$:1.4939; IR (film): v (C=O): 1730 cm$^{-1}$ and 1710 cm$^{-1}$ (acrylate); elemental analysis ($C_{11}H_{14}O_2$): calculated: C 74.13, H 7.92; found: C 73.84, H 9.04.

b) 2.0 g of the acrylate of norbornene-5-methanol obtained in (a) are dissolved in 10 ml of dioxane, and 200 mg of azobisisobutyronitrile are added. Polymerization is carried out under nitrogen at 80° C. for 24 h, the mixture is cooled, and the polymer is precipitated by dropwise addition of the reaction mixture to 70 ml of water/methanol (3:1). The precipitate is filtered off, washed with water and methanol and dried overnight under a high vacuum at 50° C. Yield: 1.1g (55%). GPC (THF, PS standards): $M_n$=10,700 g/mol; $M_w$=25,800 g/mol.

EXAMPLE A7

Preparation of a Polymer Having Structural Elements

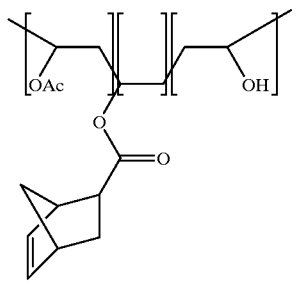

9.0 g (70 mmol) of norbornenecarboxylic acid (prepared from the corresponding acid chloride by hydrolysis with NaOH) are suspended in a mixture of 10 ml of water and 2.1 ml of conc. HCl and the suspension is heated to 60° C. 9.0 g of Mowiol 4-88 (polyvinyl alcohol with 12 mol % of acetate groups from Hoechst AG, Frankfurt, $M_w$=31,000 g/mol) are added in portions. The components are reacted at 60° C. for 24 h, then the solid is dissolved in DMSO and precipitated from acetone. Drying (4 days at 40° C. under a high vacuum) gives 10.14 g of polymer. $^1$H-NMR (DMSO-d$_6$): 8 mol % acetate, 3 mol % norbornene, 89 mol % free OH.

B) USE EXAMPLES

EXAMPLE B1

Photopolymerization

A layer about 1 μm thick is applied to an Si semiconductor plate (wafer) by means of spin coating with a 10% solution of the polymer according to Example A4 and and 1% by weight (based on the polymer) of Ru(CH$_3$CN)$_6$(Tos)$_2$ as the the catalyst, in dioxane. The layer is exposed to an Oriel 350 W UV lamp under a resist mask for 200 seconds, subsequently heated at 80° C. for 1 minute and then developed with dioxane. A relief image with a high resolution is obtained. The polymers of Examples A1 to A3 and A5, processed in the same way, produce the same results.

EXAMPLE B2

Photopolymerization

A layer about 1 μm thick is applied to an Si semiconductor plate (wafer) by means of spin coating with a 10% solution of the polymer according to Example A6 and and 1% by weight (based on the polymer) of TaCl$_2$(CH$_2$Si(CH$_3$)$_3$)$_3$ as the catalyst, in dioxane. The layer is exposed to an Oriel 350 W UV lamp under a resist mask for 100 seconds, and then developed with dioxane. A relief image with a high resolution is obtained.

EXAMPLE B3

Photopolymerization 0.5 g of the polymer obtained in Example A7 is dissolved in 5 ml of water together with 5 mg of (Ru(C$_6$H$_6$)$_2$](tos)$_2$. Films about 30 μm thick are produced by pouring this solution onto a glass plate and using a doctor blade. These films are exposed for 3 minutes under a UV lamp, after which the clear, transparent films are insoluble either in DMSO or in water. $T_g$(DSC, 10° C./minute): 80° C.

EXAMPLE B4

Photopolymerization 0.5 g of the polymer obtained in Example A7 is dissolved in 5 ml of water together with 5 mg of [Ru(CH$_3$CN)$_6$](tos)$_2$. Films about 30 μm thick are produced by pouring this solution onto a glass plate and using a doctor blade. These films are exposed for 3 minutes under a UV lamp, after which the clear, transparent films are insoluble either in DMSO or in water. $T_g$(DSC, 10° C./minute): 80° C.

EXAMPLE B5

Photopolymerization 0.5 g of the polymer obtained in Example A7 is dissolved in 5 ml of water together with 5 mg of [Ru(CH$_3$CH$_2$CN)$_6$](tos)$_2$. Films about 30 μm thick are produced by pouring this solution onto a glass plate and using a doctor blade. These films are exposed for 3 minutes under a UV lamp, after which the clear, transparent films are insoluble either in DMSO or in water. $T_g$(DSC, 10° C./minute): 80° C.

EXAMPLE B6

Thermal Polymerization

Polymer films with a thickness of from 20 to 60 μm are produced on a glass plate using a doctor blade from a 10% strength solution of the polymer of Example A6 in dioxane together with in each case 1% (based on the polymer) of the catalyst (C$_6$H$_{11}$)$_3$PRu(p-cumene)Cl$_2$ and subsequent evaporation of the solvent at 80° C. These films are crosslinked by heating at 120° C. for 1 h. Following removal from the glass plate, tear-resistant films are obtained which are insoluble in dioxane.

What is claimed is:

1. A composition comprising catalytic amounts of a one-component catalyst for metathesis polymerization and homo- and copolymers containing recurring structural embodiments with strained cycloalkenyl radicals bonded to the monomer units via bivalent bridge groups, alone or mixed with structural embodiments of strained cycloolefins, wherein the composition comprises as the one-component catalyst (a) a ruthenium or osmium catalyst of the formula:

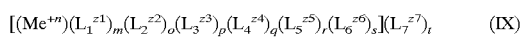

in which

Me is ruthenium or osmium;
n is 2,
$L_1$, $L_2$ and $L_3$ together are monocyclic, polycyclic or fused arenes having 6–24 C atoms which are unsubstituted or substituted by $C_1$–$C_4$alkyl, $C_1$–$C_4$alkoxy, $C_6$–$C_{12}$aryl or halogen; or are monocyclic heteroarenes, fused heteroarenes or fused arene-heteroarenes having 4 to 22 C atoms and 1 to 3 heteroatoms selected from the group consisting of O, S and N, which are unsubstituted or substituted by OH, $C_1$–$C_4$alkyl, $C_1$–$C_4$alkoxy or halogen, and
$L_4$, $L_5$ and $L_6$ represent $H_2O$, $NH_3$, $C_1$–$C_4$alkanol or alkanethiol which are unsubstituted or substituted by fluorine, aliphatic ethers, thioethers, sulfoxides, or sulfones having 2 to 8 C atoms, dimethylformamide or N-methylpyrrolidone;
m, o, p, q, r and s represent 1 and t represents 2;
z1–z6 represent 0,
z7 represents –1; and
$L_7$ represents a non-coordinating anion; or
a ruthenium or osmium catalyst of the formula:

 (X)

wherein
Me is Ru or Os;
$L_1$ is $N_2$, $C_1$–$C_4$alkylnitrile, benzonitrile or benzylnitrile;
$L_8$ is $NH_3$ or an amine having 1–12 C atoms;
$Y_1$ represents a non-coordinating anion, and
x is the number 1 or 2;
(b) comprises a molybdenum(VI) or tungsten(VI) compound which has at least two methyl groups or two monosubstituted methyl groups attached to the metal, the substituent not containing a hydrogen atom in the α-position; or
(c) comprises a titanium(IV), niobium(V), tantalum(V), molybdenum(VI) or tungsten(VI) compound in which a silylmethyl group and at least one halogen are attached to the metal; or
(d) comprises a niobium(V) or tantalum(V) compound which has at least two methyl groups or two monosubstituted methyl groups attached to the metal, the monosubstituted methyl groups containing no hydrogen atom in the α-position; or
(e) comprises a titanium(IV) compound which has at least two methyl groups or two monosubstituted methyl groups attached to the metal, the monosubstituted methyl groups containing no hydrogen atom in the α-position; or
(f) comprises a ruthenium or osmium compound which has at least one phosphine group, at least one photolabile ligand and neutral ligands attached to the metal atom, a total of from 2 to 5 ligands being attached, and comprises acid anions for charge compensation; or
(g) a ruthenium or osmium catalyst of the formulae XXV to XXVb:

 (XXV)

 (XXVa)

 (XXVb)

in which
Me is Ru or Os;
Z in formulae XXV to XXVb is $H^-$, cyclopentadienyl, $Cl^-$, $Br^-$, $BF_4^-$, $PF_6^-$, $SbF_6^-$, $AsF_6^-$, $CF_3SO_3^-$, $C_6H_5$—$SO_3^-$, 4-methyl-$C_6H_5$—$SO_3^-$, 3,5-dimethyl-$C_6H_5$—$SO_3^-$, 2,4,6-trimethyl-$C_6H_5$—$SO_3^-$ or 4-$CF_3$—$C_6H_5$—$SO_3^-$,
$R_{94}$, $R_{95}$ and $R_{96}$ independently of one another are $C_1$–$C_6$alkyl, cyclopentyl, cyclohexyl or cyclopentyloxy or cyclohexyloxy which are unsubstituted or substituted by 1 to 3 $C_1$–$C_4$alkyl, phenyl, benzyl or phenyloxy or benzyloxy which are unsubstituted or substituted by 1 to 3 $C_1$–$C_4$alkyl;
$L_8$ is $C_6$–$C_{16}$arene or $C_5$–$C_{16}$heteroarene which are unsubstituted or substituted by 1 to 3 $C_1$–$C_4$alkyl, $C_1$–$C_4$alkoxy, OH, F or Cl;
$L_9$ is $C_1$–$C_6$alkyl-CN, benzonitrile or benzylnitrile; and
$L_{10}$ is $H_2O$ or $C_1$–$C_6$alkanol.

2. A composition according to claim 1, wherein the strained cycloolefin comprises monocyclic or polycyclic condensed or bridged ring systems.

3. A composition according to claim 2, wherein the polycyclic condensed and/or bridged ring systems contain two to 6 rings.

4. A composition according to claim 2, wherein the individual rings contain 3 to 16 ring members.

5. A composition according to claim 2, wherein the individual rings contain 4 to 12 ring members.

6. A composition according to claim 2, wherein the individual rings contain 5 to 8 ring members.

7. A composition according to claim 1, wherein the cycloalkenyl radicals correspond to the formula A:

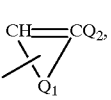 (A)

in which
$Q_1$ is a radical having at least one carbon atom which, together with the —CH=$CQ_2$— group, forms an at least 3-membered alicyclic ring which may contain one or more heteroatoms selected from the group consisting of silicon, phosphorus, oxygen, nitrogen and sulfur; and which is unsubstituted or substituted by halogen, =O, —CN, —$NO_2$, $R_1R_2R_3$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$hydroxyalkyl $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—$NR_5$—CO—; or in which an alicyclic, aromatic or heteroaromatic ring which is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$— may be fused onto adjacent carbon atoms of the alicyclic ring;
X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;
$R_1$, $R_2$ and $R_3$ independently of one another are $C_1$–$C_{12}$alkyl, $C_1$–$C_{12}$perfluoroalkyl, phenyl or benzyl;
$R_4$ and $R_{13}$ independently of one another are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$R_5$ and $R_{10}$ independently of one another are hydrogen, $C_1$–$C_{12}$alkyl, phenyl or benzyl, where the alkyl groups are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclic ring formed with $Q_1$ may contain further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen and where the heteroatoms of the abovementioned heterocycloalkyl, heteroaryl and heteroaralkyl groups are selected from the group consisting of —O—, —S—, —$NR_9$— and —N=; and $R_9$ is hydrogen, $C_1$–$C_{12}$alkyl, phenyl or benzyl.

8. A composition according to claim 7, wherein the radical of the formula A is an alicyclic ring which $Q_1$ forms together with the —CH=$CQ_2$— group and which contains 3 to 8 ring atoms, it being possible for this to be a monocyclic, or a bicyclic, tricyclic or tetracyclic condensed ring system.

9. A composition according to claim 7, wherein, in the radical of the formula A, $Q_1$ is a radical having at least one carbon atom which, together with the —CH=$CQ_2$— group, forms a 3- to 20-membered alicyclic ring which may contain one or more heteroatoms selected from the group consisting of silicon, oxygen, nitrogen and sulfur; and which is unsubstituted or substituted by halogen, =O, —CN, —$NO_2$, $R_1R_2R_3$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$hetero-cycloalkyl, $C_3$–$C_{12}$heteroaryl, $C_4$–$C_{12}$heteroaralkyl or $R_4$—X—; or in which two adjacent C atoms in this radical $Q_1$ are substituted by —CO—O—CO— or —CO—$NR_5$—CO—; or in which an alicyclic, aromatic or heteroaromatic ring which is unsubstituted or substituted by halogen, —CN, —$NO_2$, $R_6R_7R_8$Si—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$hetero-cycloalkyl, $C_3$–$C_{12}$heteroaryl, $C_4$–$C_{12}$heteroaralkyl or $R_{13}$—$X_1$— may be fused onto adjacent carbon atoms;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perflubroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl, or $C_7$–$C_{12}$aralkyl;

$R_5$ and $R_{10}$ independently of one another are hydrogen, $C_1$–$C_6$alkyl, phenyl or benzyl, where the alkyl groups are unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

where the alicyclic ring formed with $Q_1$ may contain further non-aromatic double bonds;

$Q_2$ is hydrogen, $C_1$–$C_{12}$alkyl, $C_1$–$C_{12}$haloalkyl, $C_1$–$C_6$alkoxy, halogen, —CN, or $R_{11}$—$X_2$—;

$R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

where the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and where the heteroatoms of the heterocycloalkyl, heteroaryl and heteroaralkyl groups are selected from the group consisting of —O—, —S—, —$NR_9$— and —N=; and $R_9$ is hydrogen, $C_1$–$C_6$alkyl, phenyl or benzyl.

10. A composition according to claim 7, wherein, in the radical of the formula A, $Q_1$ is a radical having at least one carbon atom which, together with the —CH=$CQ_2$— group, forms a 3- to 10-membered alicyclic ring which may contain a heteroatom selected from the group consisting of silicon, oxygen, nitrogen and sulfur and is unsubstituted or substituted by halogen, —CN, —$NO_2$, $R_1R_2R_3$Si—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an alicyclic, aromatic or heteroaromatic ring which is unsubstituted or substituted by halogen, —CN, —$NO_2$, $R_6R_7R_8$Si—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$— may be fused onto adjacent carbon atoms;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —$SO_2$—;

$R_6$, $R_7$ and $R_8$ independently of one another are $C_1$–$C_4$alkyl, $C_1$–$C_4$perfluoroalkyl, phenyl or benzyl;

and $Q_2$ is hydrogen.

11. A composition according to claim 1, wherein the cycloalkenyl radical is unsubstituted or $C_1$–$C_4$alkyl-substituted cyclopropenyl, cyclobutenyl, cyclopentenyl, cycloheptenyl, cyclooctenyl, cyclopentadienyl, cyclohexadienyl, cycloheptadienyl, cyclooctadienyl, norbornenyl or norbornenyl derivatives.

12. A composition according to claim 11, wherein the norbornenyl derivative corresponds to the formula B:

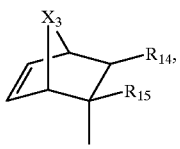

(B)

in which

X$_3$ is —CHR$_{16}$—, oxygen or sulfur;

R$_{14}$ and R$_{15}$ independently of one another are hydrogen, —CN, trifluoromethyl, (CH$_3$)$_3$Si—O—, (CH$_3$)$_3$Si— or —COOR$_{17}$; and R$_{16}$ and R$_{17}$ independently of one another are hydrogen, C$_1$–C$_{12}$alkyl, phenyl or benzyl;

or corresponds to the formula C:

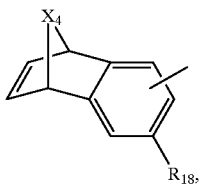

(C)

in which

X$_4$ is —CHR$_{19}$—, oxygen or sulfur;

R$_{19}$ is hydrogen, C$_1$–C$_{12}$alkyl, phenyl or benzyl; and

R$_{18}$ is hydrogen, C$_1$–C$_6$alkyl or halogen.

13. A composition according to claim 1, wherein the cycloalkenyl radical is norbornenyl of the formula D or methyinorbornenyl of the formula E:

(D)

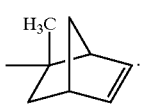

(E)

14. A composition according to claim 1, wherein the bivalent bridge group is a divalent hydrocarbon radical, uninterrupted or interrupted by —O—, having 1 to 100 C atoms, which is attached directly or by way of an ether, thioether, amine, ester, amide, urethane or urea group to the polymer backbone and which is attached directly or by way of an ether, thioether, amine, ester, amide, urethane or urea group to the cycloolefin; or wherein the bridge group is an ether, thioether, amine, ester, amide, urethane or urea group.

15. A composition according to claim 1, wherein the bivalent bridge group corresponds to the formula F:

(F), in which g, h and i independently of one another are 0 or 1, and g and i are not simultaneously 0;

X$_{100}$ and X$_{101}$ independently of one another are —O—, —S—, —NH—, —N(C$_1$–C$_4$alkyl)—, —C(O)O—, —O(O)C—, —NH(O)C—, —C(O)NH—, —N(C$_1$–C$_4$alkyl)—(O)C—, —C(O)—N(C$_1$–C$_4$alkyl)—, —O—C(O)—O—, —NH—C(O)—O—, —O—C(O)—NH—, —N(C$_1$–C$_4$alkyl)—(O)C—O or —O—C(O)—N(C$_1$–C$_4$alkyl)—; and R$_{01}$ is a direct bond, C$_1$–C$_{18}$alkylene, polyoxaalkylene having 2 to 12 oxaalkylene units and 2 to 6 C atoms in the oxaalkylene, unsubstituted or C$_1$–C$_4$— or C$_1$–C$_4$alkoxy-substituted C$_5$–C$_8$cycloalkylene, unsubstituted or C$_1$–C$_4$— or C$_1$–C$_4$alkoxy-substituted C$_5$–C$_8$cycloalkylene-CH$_2$—, unsubstituted or C$_1$–C$_4$— or C$_1$–C$_4$alkoxy-substituted —CH$_2$—(C$_5$–C$_8$cycloalkylene)-CH$_2$—, unsubstituted or C$_1$–C$_4$— or C$_1$–C$_4$alkoxy-substituted heterocycloalkylene having 5 or 6 ring members and heteroatoms selected from the group consisting of —O—, —S— and N, unsubstituted or C$_1$–C$_4$— or C$_1$–C$_4$alkoxy-substituted phenylene, benzylene or xylylene, or unsubstituted or C$_1$–C$_4$— or C$_1$–C$_4$alkoxy-substituted heteroarylene having 5 or 6 ring members and heteroatoms selected from the group consisting of —O—, —S— and N.

16. A composition according to claim 15, wherein R$_{01}$ as alkylene is C$_1$–C$_{12}$alkylene.

17. A composition according to claim 15, wherein R$_{01}$ as polyoxaalkylene contains 2 to 6 oxaalkylene units and 2 or 3 C atoms in the oxaalkylene.

18. A composition according to claim 15, wherein R$_{01}$ as cycloalkylene in the cycloalkylene-containing radicals is C$_5$- or C$_6$cycloalkylene.

19. A composition according to claim 15, wherein R$_{01}$ as heterocycloalkylene and heteroarylene is a 5- or 6-membered cycloalkylene having a heteroatom selected from the group N and O.

20. A composition according to claim 15, wherein R$_{01}$ is C$_1$–C$_{12}$alkylene, polyoxaalkylene having 2 to 6 oxaalkylene units and 2 C atoms in the oxaalkylene, unsubstituted or C$_1$–C$_4$ or C$_1$–C$_4$alkoxy-substituted cyclopentylene, cyclohexylene, cyclohexylene-CH$_2$—, —CH$_2$-cyclohexylene-CH$_2$—, phenylene, benzylene or xylylene.

21. A composition according to claim 1, wherein the bridge group is 1,4-C$_6$H$_4$—[O—(O)C]$_2$—, —C(O)—O—C$_2$–C$_6$alkylene—O—(O)C— or —C(O)—O—CH$_2$—.

22. A composition according to claim 1, wherein the homo- or copolymers are functionalized with —OH, —NH$_2$, —NH(C$_1$–C$_4$alkyl), —C(O)OH, —C(O)—NH$_2$ or —C(O)—NH(C$_1$–C$_4$alkyl).

23. A composition according to claim 1, wherein the homo- or copolymers are selected from the group consisting of olefinically unsaturated alcohols, homo- and copolymers of unsaturated carboxylic acids, homo- and copolymers of hydroxystyrene or aminostyrene or styrene-sulfonic or carboxylic acids, homo- and copolymers of hydroxylated butadiene, homo- and copolymers of vinylpyrrolidone, polysiloxanes having hydroxy- or aminoalkyl side chains, and homo- and copolymers of diglycidyl ethers and diols, and polysaccharides.

24. A composition according to claim 7 wherein the homo- or copolymer contains from 1 to 100 mol-%, based on the polymer, of structural elements of the formula G, from 99 to 0 mol-% of structural elements of the formula H, and from 100 to 0 mol-% of structural elements of the formula I:

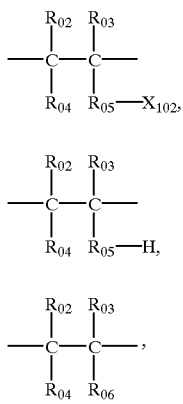

(G), (H), (I)

in which
  the $R_{02}$s independently of one another are H, F or $C_1-C_{12}$alkyl;
  the $R_{03}$s independently of one another are H, F, Cl, CN or $C_1-C_{12}$alkyl;
  the $R_{04}$s independently of one another are H, F, $C_1-C_{12}$alkyl, —COOH, —C(O)O—$C_1-C_{12}$alkyl, —C(O)—NH$_2$ or —C(O)—NH—$C_1-C_{12}$alkyl;
  $R_{05}$ is a bivalent bridge group;
  $R_{06}$ is H, F, Cl, CN, $C_1-C_{12}$alkyl, $C_1-C_{12}$alkoxy, unsubstituted phenyl or phenyl which is substituted by Cl, Br, $C_1-C_4$alkyl, $C_1-C_4$alkoxy, —C(O)O$C_1-C_{12}$alkyl, —C(O)—NH$_2$, —C(O)—NH—$C_1-C_{12}$alkyl, —SO$_3$H or —SO$_3$—$C_1-C_{12}$alkyl, or is —C(O)OH, —C(O)O—$C_2-C_{12}$hydroxyalkyl, C(O)O$C_1-C_{12}$alkyl, —C(O)—NH$_2$, —C(O)—NH—$C_1-C_{12}$alkyl;
  or $R_{04}$ and $R_{06}$ together are —O—CH$_2$—O— or —O—$C_2-C_4$alkylidene-O—; and
  $X_{102}$ is a radical of formula A.

25. A composition according to claim 24, wherein $X_{102}$ is norbornenyl which is unsubstituted or substituted by $C_1-C_4$alkyl.

26. A composition according to claim 24, wherein in the formulae G, H and I the $R_{02}$s are H, the $R_{03}$s are independently of one another H or methyl, $R_{04}$ is H, —C(O)—OH or —C(O)—O—$C_1-C_4$alkyl, $R_{05}$ is p—$C_6H_4$—O—, —C(O)—O—$C_2-C_6$alkylene—O—C(O)— or —C(O)—O—CH$_2$—, and $X_{102}$ is a radical of the formula A.

27. A composition according to claim 25, wherein in the formulae G, H and I the $R_{02}$s are H, the $R_{03}$s are H or methyl, $R_{04}$ is H, $R_{05}$ is —(CH$_2$)$_d$—O—C(O)— with d equal to an integer from 1 to 12, —(CH$_2$)$_d$—O—(C$_e$H$_{2e}$—O—)$_f$C(O)— with e equal to an integer from 2 to 6, and f equal to an integer from 1 to 12, and $X_{102}$ is a radical of the formula A.

28. A composition according to claim 1, wherein the homo- and copolymers comprise polyepoxides with recurring structural elements selected from the group consisting of structural elements of the formulae J, K, L and M:

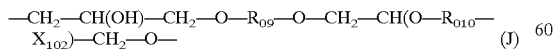
—CH$_2$—CH(OH)—CH$_2$—O—R$_{09}$—O—CH$_2$—CH(O—R$_{010}$—X$_{102}$)—CH$_2$—O— (J)

—R$_{06}$—O— (K)

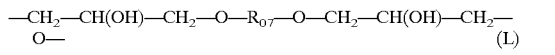
—CH$_2$—CH(OH)—CH$_2$—O—R$_{07}$—O—CH$_2$—CH(OH)—CH$_2$—O— (L)

—R$_{08}$—O— (M)

wherein $R_{06}$ and $R_{08}$ independently of one another are $C_2-C_{18}$alkylene, polyoxyalkylene having 2 to 50 oxyalkylene units and 2 to 6 carbon atoms in the oxyalkylene, $C_3-C_{12}$cycloalkylene, $C_5-C_8$cycloalkylene-CH$_2$—, —CH$_2$—($C_5-C_8$cycloalkylene)-CH$_2$—, $C_6-C_{14}$arylene, bisphenylene, benzylene, xylylene or —C$_6$H$_4$—X$_{01}$—C$_6$H$_4$—, where X$_0$ is O, S, SO, SO$_2$, CO, CO$_2$, NH, N($C_1-C_4$alkyl), alkylidene having 1 to 18 carbon atoms or $C_5-C_7$cycloalkylidene;

$R_{07}$ and $R_{09}$ independently of one another are $C_2-C_{18}$alkylene, polyoxyalkylene having 2 to 50 oxyalkylene units and 2 to 6 carbon atoms in the oxyalkylene, $C_3-C_{12}$cycloalkylene, $C_5-C_8$cycloalkylene-CH$_2$—, —CH$_2$—($C_5-C_8$cycloalkylene)-CH$_2$—, $C_6-C_{14}$arylene, bisphenylene, benzylene, xylylene or —C$_6$H$_4$—X$_{01}$—C$_6$H$_4$—, where X$_{01}$ is O, S, SO, SO$_2$, CO, CO$_2$, NH, N($C_1-C_4$alkyl), alkylidene having 1 to 18 carbon atoms or $C_5-C_7$cycloalkylidene;

$X_{102}$ is a norbornenyl or 1-methyl-norbonen-1-yl radical; and the divalent bridge group $R_{010}$ is a radical of the formula —(C$_e$H$_{2e}$—O—)$_f$C(O)— with e equal to 0 or an integer from 2 to 6, and f is equal to a number from 1 to 12.

29. A composition according to claim 1, wherein the strained cycloolefins correspond to the formula I:

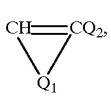

(I')

in which
  $Q_1$ is a radical having at least one carbon atom which, together with the —CH=CQ$_2$— group, forms an at least 3-membered alicyclic ring which may contain one or more heteroatoms selected from the group consisting of silicon, phosphorus, oxygen, nitrogen and sulfur; and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1-C_{20}$alkyl, $C_1-C_{20}$hydroxyalkyl $C_1-C_{20}$haloalkyl, $C_1-C_6$cyanoalkyl, $C_3-C_8$cycloalkyl, $C_6-C_{16}$aryl, $C_7-C_{16}$aralkyl, $C_3-C_6$heterocycloalkyl, $C_3-C_{16}$heteroaryl, $C_4-C_{16}$heteroaralkyl or R$_4$—X—; or in which two adjacent C atoms are substituted by —CO—O—CO— or —CO—NR$_5$—CO—; or in which an alicyclic, aromatic or heteroaromatic ring which is unsubstituted or substituted by halogen, —CN, —NO$_2$, R$_6$R$_7$R$_8$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1-C_{20}$alkyl, $C_1-C_{20}$haloalkyl, $C_1-C_{20}$hydroxyalkyl, $C_1-C_6$cyanoalkyl, $C_3-C_8$cycloalkyl, $C_6-C_{16}$aryl, $C_7-C_{16}$aralkyl, $C_3-C_6$heterocycloalkyl, $C_3-C_{16}$heteroaryl, $C_4-C_{16}$heteroaralkyl or R$_{13}$—X$_1$— may be fused onto adjacent carbon atoms of the alicyclic ring;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are $C_1-C_{12}$alkyl, $C_1-C_{12}$perfluoroalkyl, phenyl or benzyl;

R$_4$ and R$_{13}$ independently of one another are $C_1-C_{20}$alkyl, $C_1-C_{20}$haloalkyl, $C_1-C_{20}$hydroxyalkyl, $C_3-C_8$cycloalkyl, $C_6-C_{16}$aryl, or $C_7-C_{16}$aralkyl;

$R_5$ and $R_{10}$ independently of one another are hydrogen, $C_1$–$C_{12}$alkyl, phenyl or benzyl, where the alkyl groups are unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclic ring formed with $Q_1$ may contain further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN, or $R_{11}$—$X_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—$NR_{12}$—;

$R_{12}$ is hydrogen, $C_1$–$C_{12}$alkyl, phenyl or benzyl;

where the abovementioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —$NO_2$, —CN or halogen and where the heteroatoms of the abovementioned heterocycloalkyl, heteroaryl and heteroaralkyl groups are selected from the groups consisting of —O—, —S—, —$NR_9$— and —N=; and $R_9$ is hydrogen, $C_1$–$C_{12}$alkyl, phenyl or benzyl.

30. A composition according to claim 1, which comprises comonomeric polyfunctional strained cycloolefins which are those of the formula (f1):

$$(T)_n\text{-}U \qquad (f1),$$

in which T is the radical of a strained cycloolefin, U is a direct bond or an n-valent bridge group and n is an integer from 2 to 8.

31. A composition according to claim 30, wherein T is norbornenyl of the formula ($nr_4$):

(nr₄)

32. A composition according to claim 30, wherein U is (a) a divalent bridge group of the formula (f5):

$$-X_5-R_{028}-X_6- \qquad (f5),$$

in which $X_5$ and $X_6$ independently of one another are a direct bond, —O—, —$CH_2$—O—, —C(O)O—, —O(O)C—, —$CH_2$—O(O)C—, —C(O)—$NR_{029}$—, —$R_{029}$N—(O)C—, —NH—C(O)—$NR_{029}$—, —O—C(O)—NH—, —$CH_2$—O—C(O)—NH— or —NH—C(O)—O—, and $R_{028}$ is $C_2$–$C_{18}$alkylene, $C_5$–$C_8$cycloalkylene which is unsubstituted or substituted by $C_1$–$C_4$alkyl or $C_1$–$C_4$alkoxy, $C_6$–$C_{18}$arylene or $C_7$–$C_{19}$aralkylene which are unsubstituted or substituted by $C_1$–$C_4$alkyl or $C_1$–$C_4$alkoxy, or polyoxyalkylene having 2 to 12 oxyalkylene units and 2 to 6 C atoms in the alkylene, and $R_{029}$ is H or $C_1$–$C_6$alkyl; or (b) a trivalent bridge group of the formula (f6):

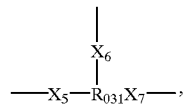

(f6)

in which $X_5$, $X_6$ and $X_7$ are —O—, —$CH_2$—O—, —C(O)O—, —O(O)C—, —$CH_2$—O(O)C—, —C(O)—$NR_{029}$—, —$R_{029}$N—(O)C—, —NH—C(O)—$NR_{029}$—, —O—C(O)—NH—, —$CH_2$—O—C(O)—NH— or —NH—C(O)—O—, and $R_{031}$ is a trivalent aliphatic hydrocarbon radical having 3 to 20 C atoms, a trivalent cycloaliphatic radical which has 3 to 8 ring C atoms and is unsubstituted or substituted by $C_1$–$C_4$alkyl or $C_1$–$C_4$alkoxy, or a trivalent aromatic radical having 6 to 18 C atoms, which is unsubstituted or substituted by $C_1$–$C_4$alkyl or $C_1$–$C_4$alkoxy, a trivalent araliphatic radical having 7 to 19 C atoms, which is unsubstituted or substituted by $C_1$–$C_4$alkyl or $C_1$–$C_4$alkoxy, or a trivalent heteroaromatic radical having 3 to 13 C atoms and 1 to 3 heteroatoms selected from the group consisting of —O—, —N— and —S—, which is unsubstituted or substituted by $C_1$–$C_4$alkyl or $C_1$–$C_4$alkoxy, and $R_{029}$ is H or $C_1$–$C_6$alkyl; or (c) a tetravalent bridge group of the formula (f7):

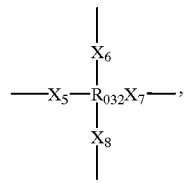

(f7)

in which $X_5$, $X_6$, $X_7$ and $X_8$ are —C(O)O—, —$CH_2$—O(O)C— or —C(O)—$NR_{029}$—, and $R_{032}$ is a tetravalent aliphatic hydrocarbon radical having 4 to 20 C atoms, a tetravalent cycloaliphatic radical having 4 to 8 C atoms, which is unsubstituted or substituted by $C_1$–$C_4$alkyl or $C_1$–$C_4$alkoxy, or a tetravalent aromatic radical having 6 to 18 C atoms, which is unsubstituted or substituted by $C_1$–$C_4$alkyl or $C_1$–$C_4$alkoxy, a tetravalent araliphatic radical having 7 to 19 C atoms, which is unsubstituted or substituted by $C_1$–$C_4$alkyl or $C_1$–$C_4$alkoxy, or a tetravalent heteroaromatic radical having 3 to 13 C atoms and 1 to three heteroatoms selected from the group consisting of —O—, —N— and —S—, which is unsubstituted or substituted by $C_1$–$C_4$alkyl or $C_1$–$C_4$alkoxy, and $R_{029}$ is H or $C_1$–$C_6$alkyl.

33. A composition according to claim 1, wherein the unsubstituted or monosubstituted methyl groups are those of the formula XI:

$$-CH_2-R \qquad (XI),$$

in which R is H, —$CF_3$, —$SiR_{38}R_{39}R_{40}$, —$CR_{41}R_{42}R_{43}$ or $C_6$–$C_{16}$aryl or $C_4$–$C_{15}$heteroaryl having 1 to 3 heteroatoms selected from the group consisting of O, S and N, which are unsubstituted or substituted by $C_1$–$C_6$alkyl or $C_1$–$C_6$alkoxy;

$R_{38}$, $R_{39}$ and $R_{40}$ independently of one another are $C_1$–$C_{12}$alkyl, $C_5$- or $C_6$cycloalkyl, or phenyl or benzyl which are unsubstituted or substituted by $C_1$–$C_6$alkyl or $C_1$–$C_6$alkoxy; and $R_{41}$, $R_{42}$ and $R_{43}$ independently of one another are $C_1$–$C_{10}$alkyl, which is unsubstituted or substituted by $C_1$–$C_{10}$alkoxy, or $R_{41}$ and $R_{42}$ have this meaning and $R_{43}$ is $C_6$–$C_{10}$aryl or $C_4$–$C_9$heteroaryl, which is unsubstituted or substituted by $C_1$–$C_6$alkyl or $C_1$–$C_6$alkoxy.

34. A composition according to claim 1, wherein the silylmethyl group is that of the formula XIV:

$$—CH_2—SiR_{38}T_{39}R_{40} \qquad (XIV),$$

in which $R_{38}$, $R_{39}$ and $R_{40}$ independently of one another are $C_1$–$C_{18}$alkyl, $C_5$- or $C_6$cycloalkyl or phenyl or benzyl which are unsubstituted or substituted by $C_1$–$C_6$alkyl or $C_1$–$C_6$alkoxy.

35. A composition according to claim 1, wherein the homo- or copolymers containing structural embodiments with strained cycloalkenyl radicals bonded to the monomer units by way of a bivalent bridge group are present in an amount of at least 1 mol-%, based on the homo- or copolymer.

36. A composition according to claim 35, wherein the strained cycloalkenyl radicals are present in an amount of at least 5 mol-%, based on the homo- or copolymer.

37. A composition according to claim 35, wherein from 5 to 100 mol-% of structural embodiments based on the homo- or copolymer are present.

38. A composition according to claim 1, wherein the number of recurring structural embodiments with strained cycloalkenyl radicals in the homo- or copolymer is from 2 to 10,000.

39. A composition according to claim 28 wherein the homo- or copolymer contains in each case up to 50 mol-% of the structural elements of the formulae J and K per mole of the homo- or copolymer.

40. A composition according to claim 1, wherein the molybdenum(VI) or tungsten(VI) compound according to (b) is that of one of the formulae XII to XIIc:

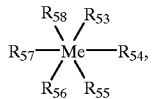

(XII)

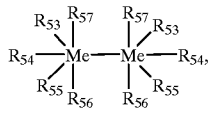

(XIIa)

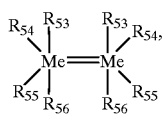

(XIIb)

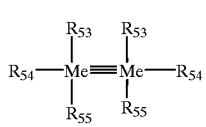

(XIIc)

in which

Me is Mo(VI) or W(VI);

at least two of the radicals $R_{53}$ to $R_{58}$ are the radical —CH$_2$—R;

wherein

R is H, CF$_3$, —SiR$_{38}$R$_{39}$R$_{40}$, —CR$_{41}$R$_{42}$R$_{43}$ or $C_6$–$C_{16}$aryl or $C_4$–$C_{15}$heteroaryl having 1 to 3 heteroatoms selected from the group consisting of O, S and N, which are unsubstituted or substituted by $C_1$–$C_6$alkyl or $C_1$–$C_6$alkoxy;

$R_{38}$, $R_{39}$ and $R_{40}$ independently of one another are $C_1$–$C_{12}$alkyl, $C_5$–$C_6$cycloalkyl, or phenyl or benzyl which are unsubstituted or substituted by $C_1$–$C_6$alkyl or $C_1$–$C_6$alkoxy; and $R_{41}$, $R_{42}$ and $R_{43}$ independently of one another are $C_1$–$C_{10}$alkyl, which is unsubstituted or substituted by $C_1$–$C_{10}$alkoxy, or $R_{41}$ and $R_{42}$ have this meaning and $R_{43}$ is $C_6$–$C_{10}$aryl or $C_4$–$C_9$heteroaryl, which is unsubstituted or substituted by $C_1$–$C_6$ alkyl or $C_1$–$C_6$alkoxy;

in each case two of the other radicals $R_{53}$ to $R_{58}$ are =O or =N—$R_{44}$, and $R_{44}$ is linear or branched $C_1$–$C_{18}$alkyl which is unsubstituted or substituted by $C_1$–$C_6$alkoxy, $C_5$–$C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl or halogen; and the other radicals of $R_{53}$ to $R_{58}$ are secondary amino having 2 to 18 carbon atoms, $R_{45}$O— or $R_{45}$S—, halogen, cyclopentadienyl or bridged biscyclopentadienyl or a neutral ligand, in which $R_{45}$ is linear or branched $C_1$–$C_{18}$alkyl which is unsubstituted or substituted by $C_1$–$C_6$alkoxy or halogen, $C_5$–$C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl or halogen.

41. A composition according to claim 1, wherein the titanium(IV), niobium(V), tantalum(V), molybdenum(VI) or tungsten(VI) compounds according to (c) are those of one of the formulae XV, XVa or XVb:

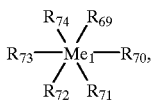

(XV)

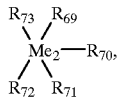

(XVa)

-continued (XVb)

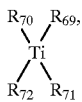

in which

Me$_1$ is Mo(VI) or W(VI);

Me$_2$ is Nb(V) or Ta(V);

R$_{69}$ is a radical —CH$_2$—SiR$_{38}$R$_{39}$R$_{40}$ of the formula XIV, wherein R$_{38}$, R$_{39}$ and R$_{40}$ independently of one another are C$_1$–C$_6$alkyl, C$_5$–C$_6$cycloalkyl, or phenyl or benzyl which are unsubstituted or substituted by C$_1$–C$_6$alkyl or C$_1$–C$_6$alkoxy;

R$_{70}$ is F, Cl or Br; and (a) in formula XV, R$_{71}$ and R$_{72}$, and R$_{73}$ and R$_{74}$ in each case together are the radical =N—R$_{44}$, or R$_{71}$ and R$_{72}$ together are the radical =N—R$_{44}$, and R$_{73}$ and R$_{74}$ independently of one another are unsubstituted or substituted cyclopentadienyl, R$_{45}$—O— or halogen, or (b) in formula XVa, R$_{71}$ and R$_{72}$ together are the radical =N—R$_{44}$, and R$_{73}$ is unsubstituted or substituted cyclopentadienyl, R$_{45}$—O— or halogen, or in formula XVa, R$_{71}$, R$_{72}$ and R$_{73}$ independently of one another are unsubstituted or substituted cyclopentadienyl, R$_{45}$—O— or halogen, or (c) in formula XVb, R$_{71}$ and R$_{72}$ independently of one another are unsubstituted or substituted cyclopentadienyl, R$_{45}$—O— or halogen, wherein R$_{44}$ and R$_{45}$ are linear or branched C$_1$–C$_{18}$alkyl which is unsubstituted or substituted by C$_1$–C$_6$alkoxy, C$_5$–C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen.

42. A composition according to claim 1, wherein the niobium(V) or tantalum(V) compound according to (d) is that of formula XVIII:

(XVIII)

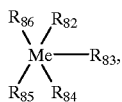

in which

Me is Nb(V) or Ta(V), at least two of the radicals R$_{82}$ to R$_{86}$ are the radical —CH$_2$—R wherein R is H, CF$_3$, —SiR$_{38}$R$_{39}$R$_{40}$, —CR$_{41}$R$_{42}$R$_{43}$ or C$_6$–C$_{16}$aryl or C$_4$–C$_{15}$heteroaryl having 1 to 3 heteroatoms selected from the group consisting of O, S and N, which are unsubstituted or substituted by C$_1$–C$_6$alkyl or C$_1$–C$_6$alkoxy;

R$_{38}$, R$_{39}$ and R$_{40}$ independently of one another are C$_1$–C$_{12}$alkyl, C$_5$–C$_6$cycloalkyl, or phenyl or benzyl which are unsubstituted or substituted by C$_1$–C$_6$alkyl or C$_1$–C$_6$alkoxy; and R$_{41}$, R$_{42}$ and R$_{43}$ independently of one another are C$_1$–C$_{10}$alkyl, which is unsubstituted or substituted by C$_1$–C$_{10}$alkoxy, or R$_{41}$ and R$_{42}$ have this meaning and R$_{43}$ is C$_6$–C$_{10}$aryl or C$_4$–C$_9$heteroaryl, which is unsubstituted or substituted by C$_1$–C$_6$ alkyl or C$_1$–C$_6$alkoxy;

two of the other radicals R$_{82}$ to R$_{86}$ are =O or =N—R$_{44}$, and R$_{44}$ is linear or branched C$_1$–C$_{18}$alkyl which is unsubstituted or substituted by C$_1$–C$_6$alkoxy, C$_5$–C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen; and the other radicals of R$_{82}$ to R$_{86}$ are secondary amino having 2 to 18 carbon atoms, R$_{45}$O— or R$_{45}$S, halogen, cyclopentadienyl or bridged biscyclopentadienyl or a neutral ligand, in which R$_{45}$ is linear or branched C$_1$–C$_{18}$alkyl which is unsubstituted or substituted by C$_1$–C$_6$alkoxy or halogen, C$_5$–C$_6$cycloalkyl which is unsubstituted or substituted by C$_1$–C$_6$alkyl, C$_1$–C$_6$alkoxy or halogen, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or benzyl or phenylethyl which are unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen.

43. A composition according to claim 1, wherein the titanium(IV) compound according to (e) is that of formula XX:

(XX)

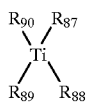

in which at least two of the radicals R$_{87}$ to R$_{90}$ are the radical —CH$_2$—R wherein R is H, CF$_3$, —SiR$_{38}$R$_{39}$R$_{40}$, —CR$_{41}$R$_{42}$R$_{43}$ or C$_6$–C$_{16}$aryl or C$_4$–C$_{15}$heteroaryl having 1 to 3 heteroatoms selected from the group consisting of O, S and N, which are unsubstituted or substituted by C$_1$–C$_6$alkyl or C$_1$–C$_6$alkoxy;

R$_{38}$, R$_{39}$ and R$_{40}$ independently of one another are C$_1$–C$_{12}$alkyl, C$_5$–C$_6$cycloalkyl, or phenyl or benzyl which are unsubstituted or substituted by C$_1$–C$_6$alkyl or C$_1$–C$_6$alkoxy; and $R_{41}$, $R_{42}$ and $R_{43}$ independently of one another are $C_1$–$C_{10}$alkyl, which is unsubstituted or substituted by $C_1$–$C_{10}$alkoxy, or $R_{41}$ and $R_{42}$ have this meaning and $R_{43}$ is $C_6$–$C_{10}$aryl or $C_4$–$C_9$heteroaryl, which is unsubstituted or substituted by $C_1$–$C_6$ alkyl or $C_1$–$C_6$alkoxy;

the other radicals of $R_{87}$ to $R_{90}$ are secondary amino having 2 to 18 carbon atoms, $R_{45}$O— or $R_{45}$S—, halogen, cyclopentadienyl or bridged biscyclopentadienyl or a neutral ligand, in which $R_{45}$ is linear or branched $C_1$–$C_{18}$alkyl which is unsubstituted or substituted by $C_1$–$C_6$alkoxy or halogen, $C_5$–$C_6$cycloalkyl which is unsubstituted or substituted by $C_1$–$C_6$alkyl, $C_1$–$C_6$alkoxy or halogen, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or benzyl or phenylethyl which are unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

44. A composition according to claim 1 wherein the ruthenium or osmium compound which has at least one phosphine group, at least one photolabile ligand and neutral ligands attached to the metal atom, a total of from 2 to 5 ligands being attached, and comprises acid anions for charge compensation, is one of the formulae XXVI, XXVIa, XXVIb, XXVIc or XXVId:

$$Me^{2\oplus}(L_{11})_2(L_{12})(Y_1^-)_2 \quad (XXVI),$$

$$Me^{2\oplus}(L_{11})_3(Y_1^-)_2 \quad (XXVIa),$$

$$Me^{2\oplus}(L_{11})_2L_{13}(Y_1^-) \quad (XXVIb),$$

$$Me^{2\oplus}(L_{11})_3L_{14}(Y_1^-)_2 \quad (XXVIc),$$

$$Me^{2\oplus}L_{11}(L_{12})_3(L_1^-)_2 \quad (XXVId),$$

in which

Me is Ru or Os, $Y_1$ is the anion of a monobasic acid, $L_{11}$ is a phosphine of the formula XXIII or XXIIIa:

$$PR_{91}R_{92}R_{93} \quad (XXIII)$$

$$R_{91}R_{92}P\text{—}Z_1\text{—}PR_{91}R_{92} \quad (XXIIIa)$$

$R_{91}$, $R_{92}$ and $R_{93}$ independently of one another are H, $C_1$–$C_{20}$alkyl, $C_1$–$C_{20}$alkoxy, $C_4$–$C_{12}$cycloalkyl or cycloalkoxy which are unsubstituted or substituted by $C_1$–$C_6$alkyl, $C_1$–$C_6$haloalkyl or $C_1$–$C_6$alkoxy; or $C_6$–$C_{16}$aryl or $C_6$–$C_{16}$aryloxy which are unsubstituted or substituted by $C_1$–$C_6$alkyl, $C_1$–$C_6$haloalkyl or $C_1$–$C_6$alkoxy; or $C_7$–$C_{16}$aralkyl or $C_7$–$C_{16}$aralkoxy which are unsubstituted or substituted by $C_1$–$C_6$alkyl, $C_1$–$C_6$haloalkyl or $C_1$–$C_6$alkoxy;

or the radicals $R_{91}$ and $R_{92}$ together are tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy; ir tetra- or pentamethylene or tetra- or pentamethylenedioxyl which are unsubstituted or substituted by $C_1$–$C_6$alkyl, $C_1$–$C_6$haloalkyl or $C_1$–$C_6$alkoxy and fused with 1 or 2 o-phenylene; or tetra- or pentamethylenedioxyl which are unsubstituted or substituted by $C_1$–$C_6$alkyl, $C_1$–$C_6$haloalkyl or $C_1$–$C_6$alkoxy and is fused in the 1,2 and 3,4-positions with o-phenylene, and $R_{93}$ has the abovementioned meaning; and $Z_1$ is linear or branched $C_2$–$C_{12}$alkylene which is unsubslituted or substituted by $C_1$–$C_4$alkoxy, 1,2- or 1,3-cycloalkylene having 4 to 8 carbon atoms which is unsubstituted or substituted by $C_1$–$C_4$alkyl or $C_1$–$C_4$alkoxy, or 1,2- or 1,3-heterocycloalkylene having 5 or 6 ring members and one heteroatom selected from the group consisting of O or N, which is unsubstituted or substituted by $C_1$–$C_4$alkyl or $C_1$–$C_4$alkoxy;

$L_{12}$ is a neutral ligand;

$L_{13}$ is cyclopentadienyl which is unsubstituted or substituted by $C_1$–$C_4$alkyl; and $L_{14}$ is CO.

* * * * *